(12) United States Patent
Inoue

(10) Patent No.: US 7,644,417 B2
(45) Date of Patent: Jan. 5, 2010

(54) DISC APPARATUS

(75) Inventor: Satoru Inoue, Musashino (JP)

(73) Assignee: Teac Corporation, Tokyo (JP)

( * ) Notice: Subject to any disclaimer, the term of this patent is extended or adjusted under 35 U.S.C. 154(b) by 521 days.

(21) Appl. No.: 11/669,428

(22) Filed: Jan. 31, 2007

(65) Prior Publication Data

US 2007/0186222 A1 Aug. 9, 2007

(30) Foreign Application Priority Data

Jan. 31, 2006 (JP) ............... 2006-023378

(51) Int. Cl.
*G11B 17/04* (2006.01)
(52) U.S. Cl. .................................. 720/622
(58) Field of Classification Search ............. 720/623, 720/622, 619, 617
See application file for complete search history.

(56) References Cited

U.S. PATENT DOCUMENTS 6,028,831 A * 2/2000 Scholz et al. ............. 720/621
7,380,251 B2 5/2008 Fujisawa et al.
7,401,341 B2 * 7/2008 Fujimura .................. 720/622
7,467,395 B2 * 12/2008 Omori et al. .............. 720/622
7,576,946 B2 * 8/2009 Fujisawa ................ 360/99.06

FOREIGN PATENT DOCUMENTS

JP 2002-117604 4/2002

* cited by examiner

*Primary Examiner*—Angel A. Castro
(74) *Attorney, Agent, or Firm*—Ditthavong Mori & Steiner, P.C.

(57) ABSTRACT

A disc apparatus is provided in which a disc inserted by automatic loading by a plurality of arms supporting outer peripheral edges of two kinds of discs with different diameters can be loaded into the disc apparatus or a disc accommodated within the disc apparatus can be unloaded from the disc apparatus. This disc apparatus includes an elevation frame for swinging a turntable on which the disc is fixed and rotated in the upper and lower direction, wherein a rotary base plate of a disc supporting arm is slightly distorted in the initial state in which the elevation frame is lowered, whereby a tip end of a holder provided at a tip end of the disc supporting arm approaches or contacts the surface of the elevation frame to prevent a rear end side of a large-diameter disc or a small-diameter disc from entering the lower surface of the holder.

3 Claims, 50 Drawing Sheets

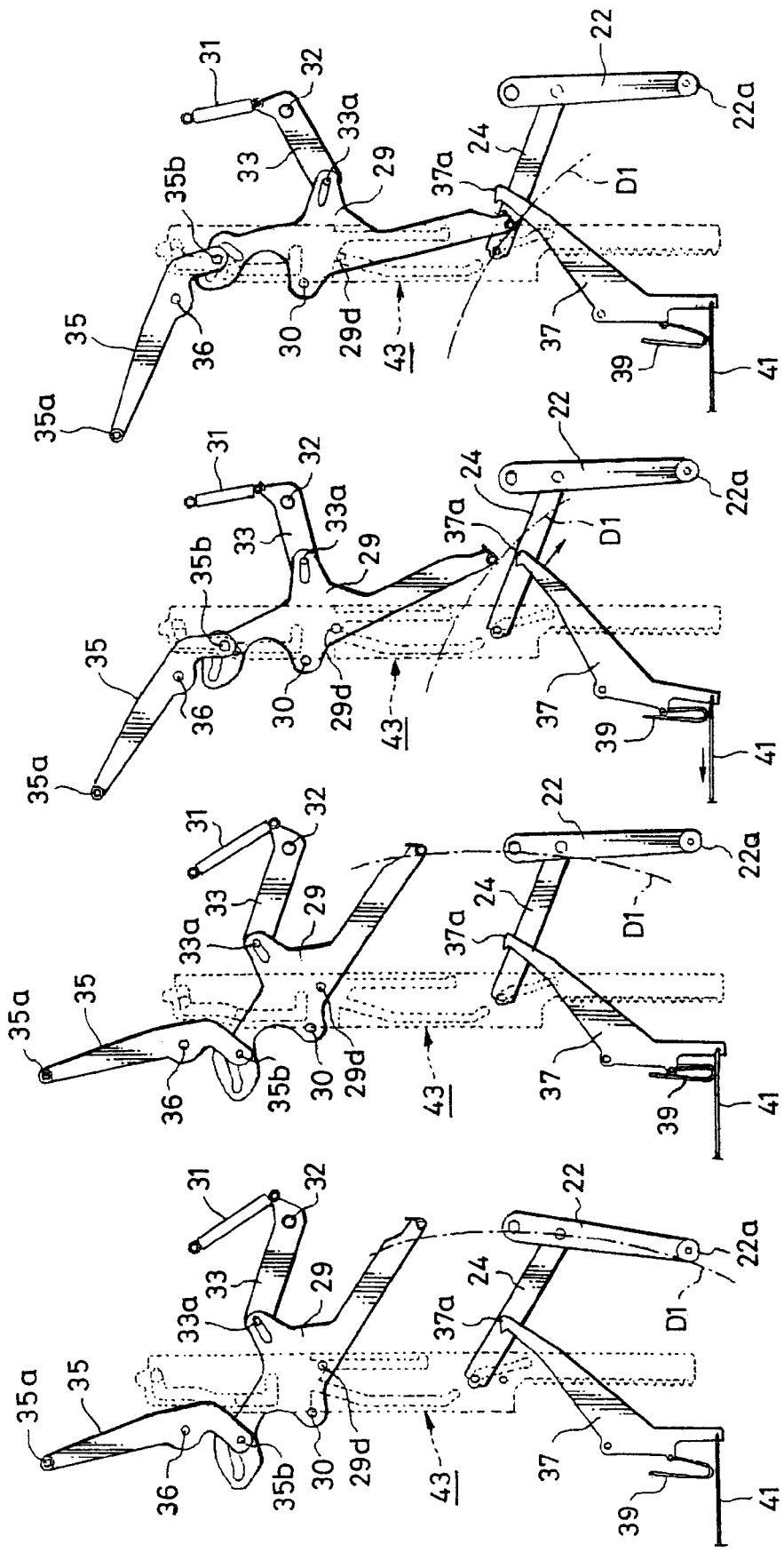

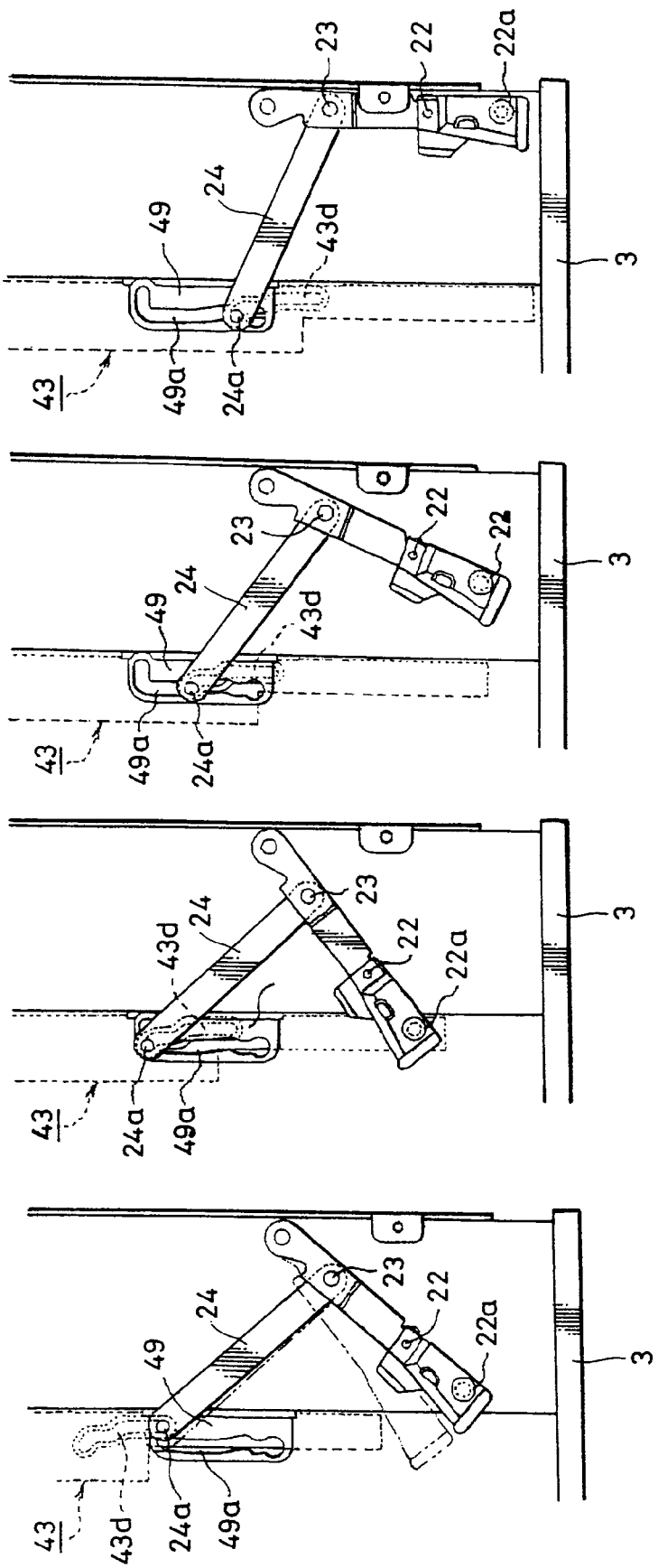

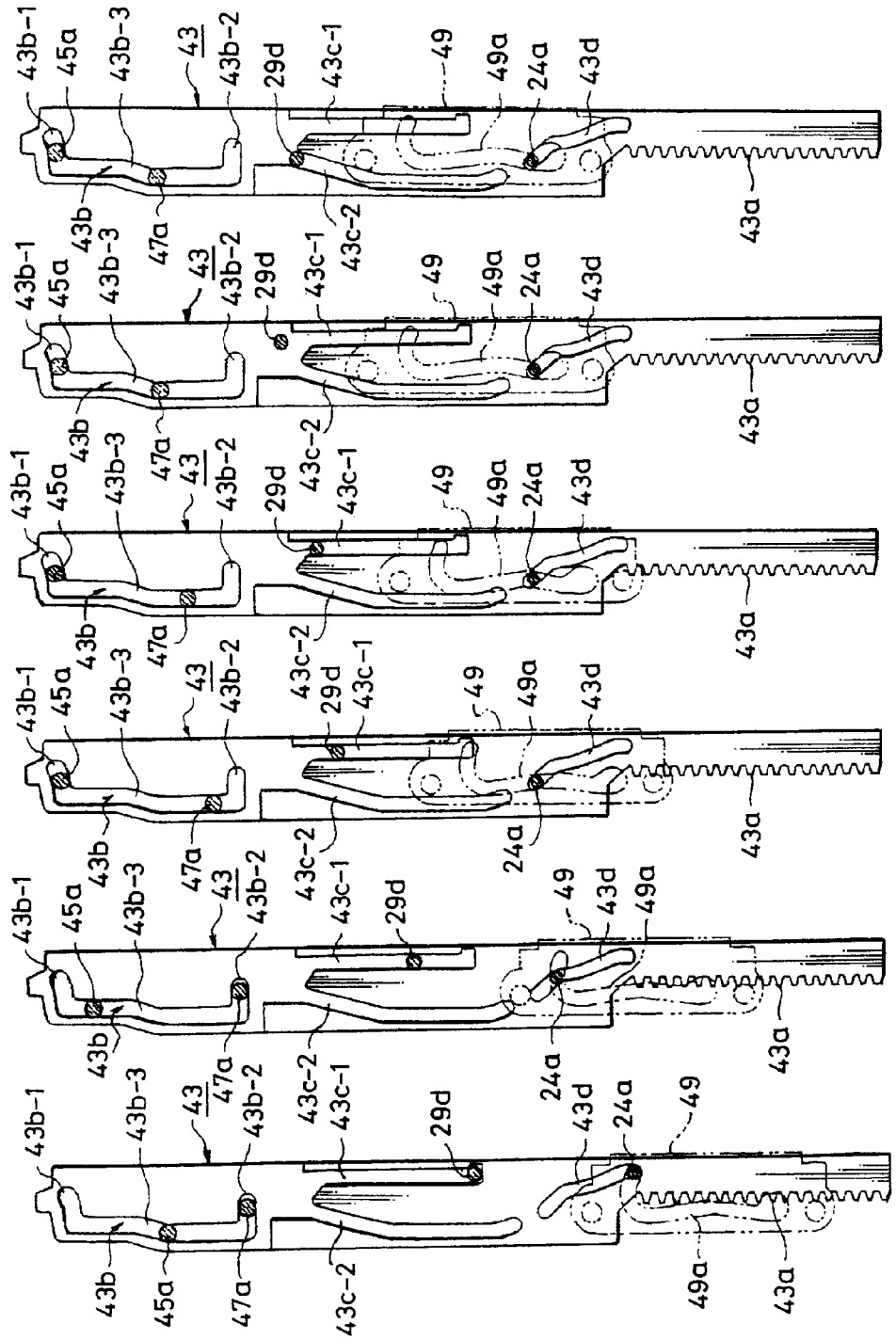

DISC APPARATUS

CROSS REFERENCES TO RELATED APPLICATIONS

The present application claims priority to Japanese Application No. P2006-23378 filed on Jan. 31, 2006, which application is incorporated herein by reference to the extent permitted by law.

BACKGROUND OF THE INVENTION

1. Field of the Invention

The present invention relates to a drive apparatus for driving optical discs (for example, CD-R/RW, DVD-R/-RW/RAM/+R/RW, etc.) serving as recording mediums to record a large amount of information in information equipment such as various kinds of computer system.

2. Description of the Related Art

It is customary that a disc apparatus housed within a personal computer generally includes a disc tray to load therein discs, this disc tray being configured so that it can be moved in the forward and backward directions.

On the other hand, there is a tendency that many slot-in system disc apparatus are used as a system without disc tray and these slot-in system disc apparatus are suitable for making a personal computer become thin and small. Since this slot-in system disc apparatus does not use a disc tray to carry a disc into the apparatus main body (load)/carry out a disc from the apparatus main body (unload), when an operator inserts the greater part of the disc into the slot, a loading mechanism of the apparatus main body can be operated so that discs can be automatically loaded onto the disc apparatus.

FIGS. 1 and 2 of the accompanying drawings are plan views showing an arrangement and operation modes of a loading mechanism in a slot-in system disc apparatus according to the related art. In the arrangement shown in FIGS. 1 and 2, when an operator inserts a disc D into the disc apparatus, the disc D reaches the position shown in FIG. 1 while its height direction and its right and left positions are being restricted by a pin 100a provided at a tip end of a first swing body 100 and right and left guide bodies 101 and 102 and they are also being restricted by a pin 103a provided at a tip end of a second swing body 103 in somewhere of the movement of the disc D.

At that time, the first swing body 100 is pushed at its pin 100a provided at the tip end by the disc D and thereby rotated in the direction shown by an arrow 100A. Also, the second swing body 103 also is pushed at its pin 103a provided at the tip end by the disc D and thereby rotated in the direction shown by an arrow 103A. Then, a switch lever 104 is pushed by the end portion of the second swing body 103 and thereby rotated in the direction shown by an arrow 104A to energize a detection switch 105.

When the above-described detection switch 105 is energized, a driving device 106 starts to operate to start moving a first slide member 107 in the direction shown by an arrow 107A. In the first and second slide members 107 and 108, respective tip ends thereof are joined together by a slide joint member 109 and this slide joint member 109 is pivotally supported so as to swing so that the second slide member 108 is moved forwardly in the direction shown by an arrow 108A in synchronism with the backward movement of the first slide member 107.

As described above, when the first slide member 107 starts moving in the backward direction, in the first swing body 100, which is supported to this slide member 107 in a cantilever fashion, since its follower pin 100b is guided by a cam groove 107a of the first slide member 107, the first swing member 100 is rotated at a supporting point 100c in the direction shown by an arrow 100B, whereby a pin 100a provided at the tip end of the first swing body 100 is able to transport the disc D in the direction shown by an arrow 107A until it comes in contact with pins 111a and 111b of a disc positioning member 111.

At that time, since the pin 103a of the second swing body 103 is rotated in the direction shown by an arrow 103A, the pin 103a of the second swing body 103 is moved in the direction shown by the arrow 103A in synchronism with the pin 100a at the tip end of the first swing body 100 while supporting the disc D. Then, after the disc D was brought in contact with the pins 111a and 111b of the disc positioning member 111, the pin 103a of the second swing body 103 is rotated up to the position slightly distant from the disc D.

While operation modes in which the loading mechanism is operated when the disc D is loaded to the inside of the disc apparatus have been describe so far, the loading mechanism is operated in operation modes opposite to the aforementioned operation modes when the disc D is unloaded to the outside of the disc apparatus. Specifically, as shown in FIG. 2, when the disc D is placed at a predetermined position within the disc apparatus, if the driving device 106 is started in the reverse direction based on an unloading instruction, then the first slide member 107 starts moving backward in the direction shown by the arrow 107B and the second slide member 108 joined to the slide joint member 109 starts moving in the backward direction in synchronism with the first slide member 107. As a result, since he first swing member 100 is rotated in the direction shown by the arrow 100A and the second swing member 103 is rotated in the direction shown by the arrow 103B, the disc D is unloaded to the outside of the disc apparatus while it is being supported by the pins 100a and 103a provided at the tip ends of the first swing member 100 and the second swing member 103.

It should be noted that the disc D loaded into the disc apparatus is clamped by a clamping head 112 which can be moved up and down at a predetermined position. This clamping head 112 is integrated with a turntable 113 fixed to a drive shaft of a spindle motor 114. Further, the above-described spindle motor 114 is disposed on a frame member (not shown) and this frame member can be moved in the upper and lower direction by an elevation mechanism (for example, Patent Document 1).

[Patent Document 1]: Japanese Unexamined Patent Publication No. 2002-117604

SUMMARY OF THE INVENTION

In the thus configured disc apparatus, in order to operate the first and second swing bodies 100 and 103 in cooperation with each other, the first and second slide members 107 and 108 are joined together by the slide joint member 109 so that they can be moved back and forth in synchronism with each other. Accordingly, the positions in the process in which the pins 100a and 103a at the tip ends of the first and second swing bodies 100 and 103 are transported should be determined based on an outer peripheral edge of a disc with a specific diameter.

Meanwhile, in the aforementioned disc apparatus, when an operator inserts the disc D into the disc apparatus in the inclined state, the rear end side of the disc D is entered into a gap formed between the pin 103a of the second swing body 103 and the bottom plate and held therein. At that time point, it may become impossible to transport the disc D. Then, when the disc D is further forcibly inserted into the disc apparatus, a mechanism within the disc apparatus will be broken and a recording surface of the disc D will be damaged.

In view of the aforesaid aspects, in a disc apparatus in which a disc inserted by a plurality of arms to support outer peripheral edges of two kinds of discs with different diameters so that these discs can be transported is loaded to the inside of the disc apparatus by automatic loading or in which a disc accommodated within the disc apparatus is unloaded to the outside of the disc apparatus, a large-diameter disc and a small-diameter disc can be reliably guided to a holder of a disc supporting arm that plays a central function in the transport of the disc and defects generated when the disc is inserted into the disc apparatus from a slot of a front bezel can be removed.

According to an aspect of the present invention, there is provided a disc apparatus in which a disc inserted by automatic loading by a plurality of arms supporting outer peripheral edges of two kinds of discs with different diameters so that the disc can be loaded into the disc apparatus is loaded into the inside of the disc apparatus or a disc accommodated within the disc apparatus is unloaded from the disc apparatus to the outside. This disc apparatus includes an elevation frame for swinging a turntable on which the disc is fixed to and rotated in the upper and lower direction, in which a rotary base plate of a disc supporting arm is slightly distorted in the initial state in which the elevation frame is lowered, whereby a tip end of a holder provided at a tip end of the disc supporting arm approaches or contacts the surface of the elevation frame to prevent a rear end side of a large-diameter disc or a small-diameter disc from entering the lower surface of the holder.

In the disc apparatus according to the present invention, this disc apparatus further includes a slide piece of a gear disc integrated with the rotary base plate of the disc and wherein the slide piece is urged against a protruded portion formed on a base panel to cause the rotary base plate to be distorted.

In the disc apparatus according to the present invention, this disc apparatus further includes a thick portion formed on a top cover of a chassis case near a tip end of the holder of the disc supporting arm and wherein the thick portion causes the rear end side of a disc inserted from a front bezel to be directed in the lower direction.

According to the present invention, in a disc apparatus in which two kinds of discs with different diameters are automatically loaded and can be driven, the rear end sides of the large-diameter disc and the small-diameter disc inserted from the slot of the front bezel are reliably guided to a holder of a disc supporting arm so that defects encountered with the disc apparatus when the disc is inserted into the disc apparatus can be prevented. Thus, the disc apparatus can be avoided from being broken and a recording surface of the disc can be avoided from being damaged.

BRIEF DESCRIPTION OF THE DRAWINGS

FIGS. 42A to 42D are process diagrams used to explain a mode in which an arm is operated when a large-diameter disc is transported;

FIGS. 43A to 43D are process diagrams used to explain a mode in which a loading arm is operated;

FIGS. 44A to 44F are process diagrams used to explain a mode in which a loading slider and a follower pin are operated;

DESCRIPTION OF THE PREFERRED EMBODIMENTS

Hereinafter, preferred embodiments of the present invention will be described below with reference to the drawings. It should be noted that the present invention will be described together with arrangements relating to the gist of the present invention in order to facilitate understanding of the present invention.

Figure 1:
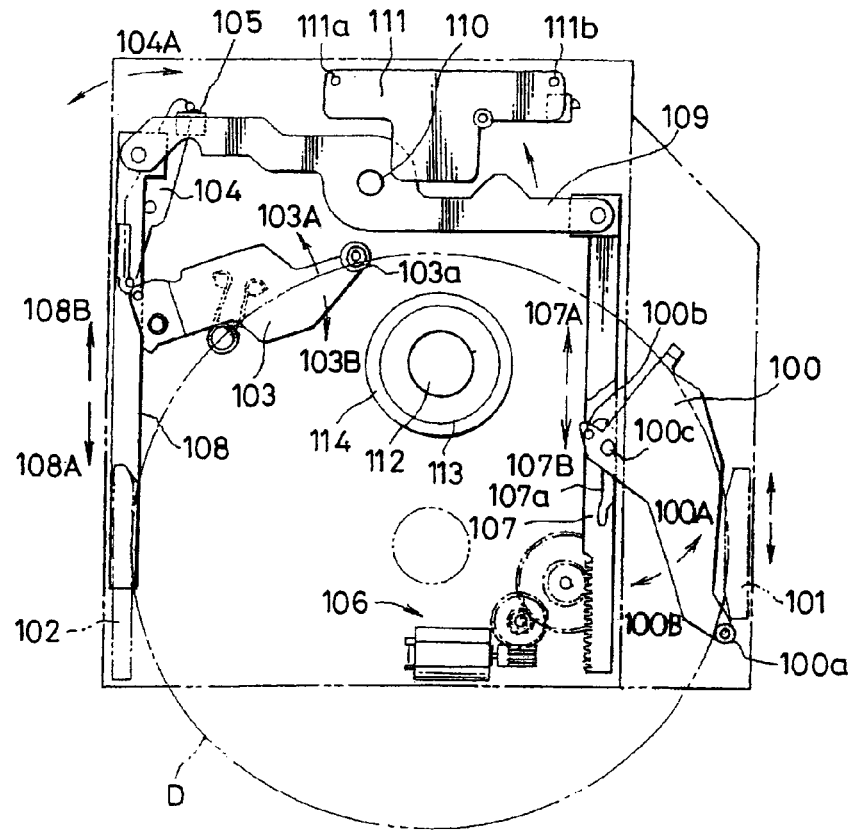
FIG. 1 is a plan view showing a disc apparatus according to the related art.
Figure 2:
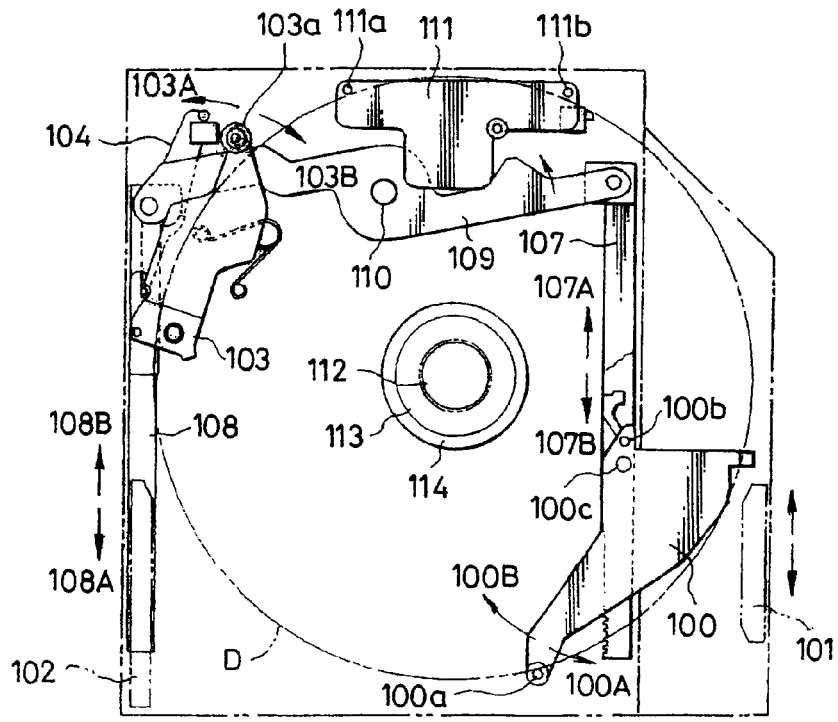
FIG. 2 is a plan view showing a disc apparatus according to the related art.
Figure 3:
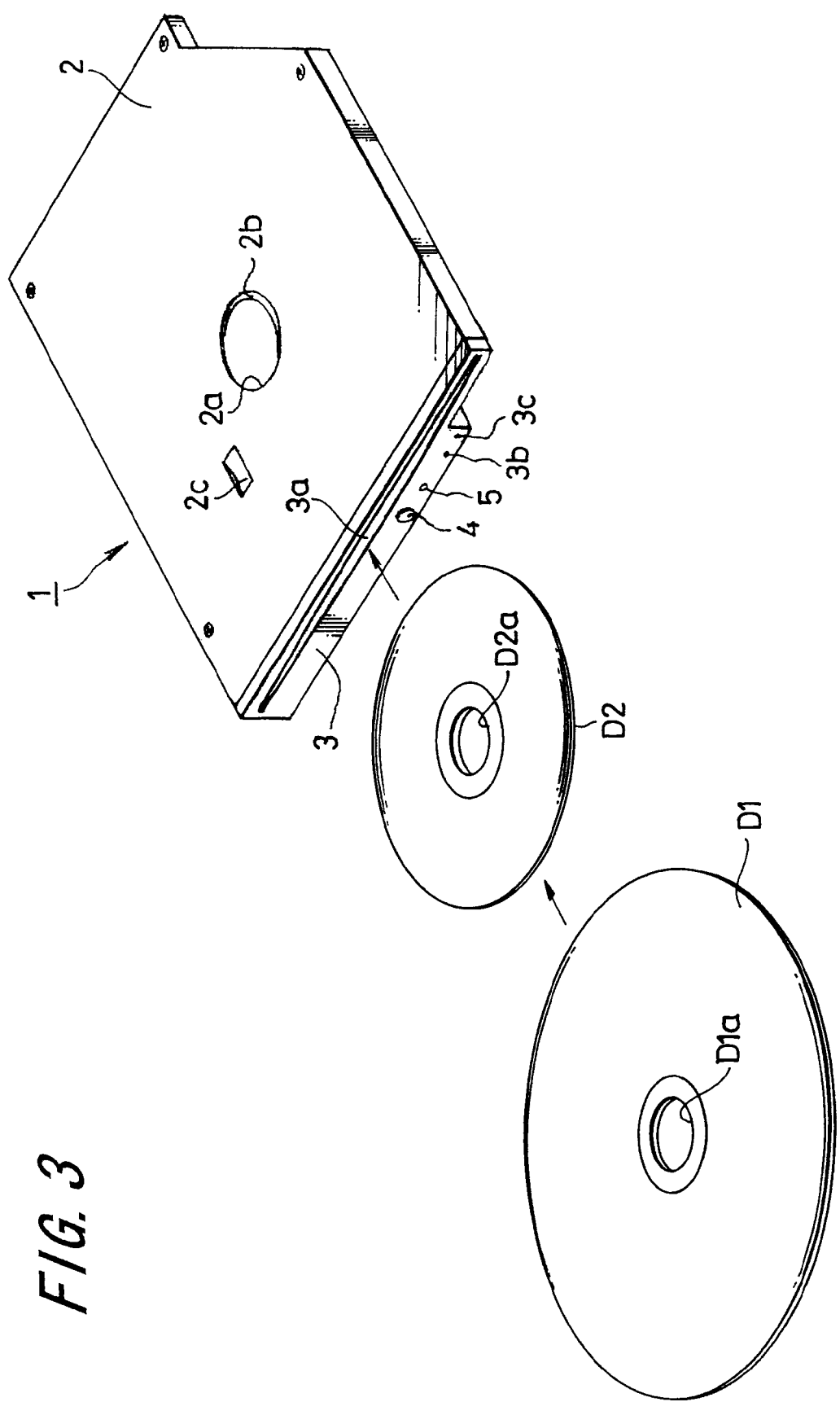
FIG. 3 is a perspective view of a slot-in system disc apparatus according to the present invention.

FIG. 3 is a perspective view showing an outward appearance of a slot-in system disc apparatus according to the present invention. As shown in FIG. 3, an opening 2a is defined at the center of a top cover of a chassis case 2 which is configured in the shield state. A protruded portion 2b that is protruded to the inside is formed at the peripheral edge portion of this opening 2a. A front bezel 3 is fixed to the front end of the chassis case 2, and this front bezel 3 has a slot 3a to insert a 12 cm-disc (hereinafter referred to as a "large-diameter disc") D1 and a 8 cm-disc (hereinafter referred to as a "small-diameter disc) D2 and through-holes 3b and 3c to release emergency. Also, the bezel 3 includes a push-button 4 to convey the accommodated large-diameter disc D1 or small-diameter disc D2 to the outside of the disc apparatus 1 and an indicator 5 to indicate the operating state of the disc apparatus 1.

Figure 4:
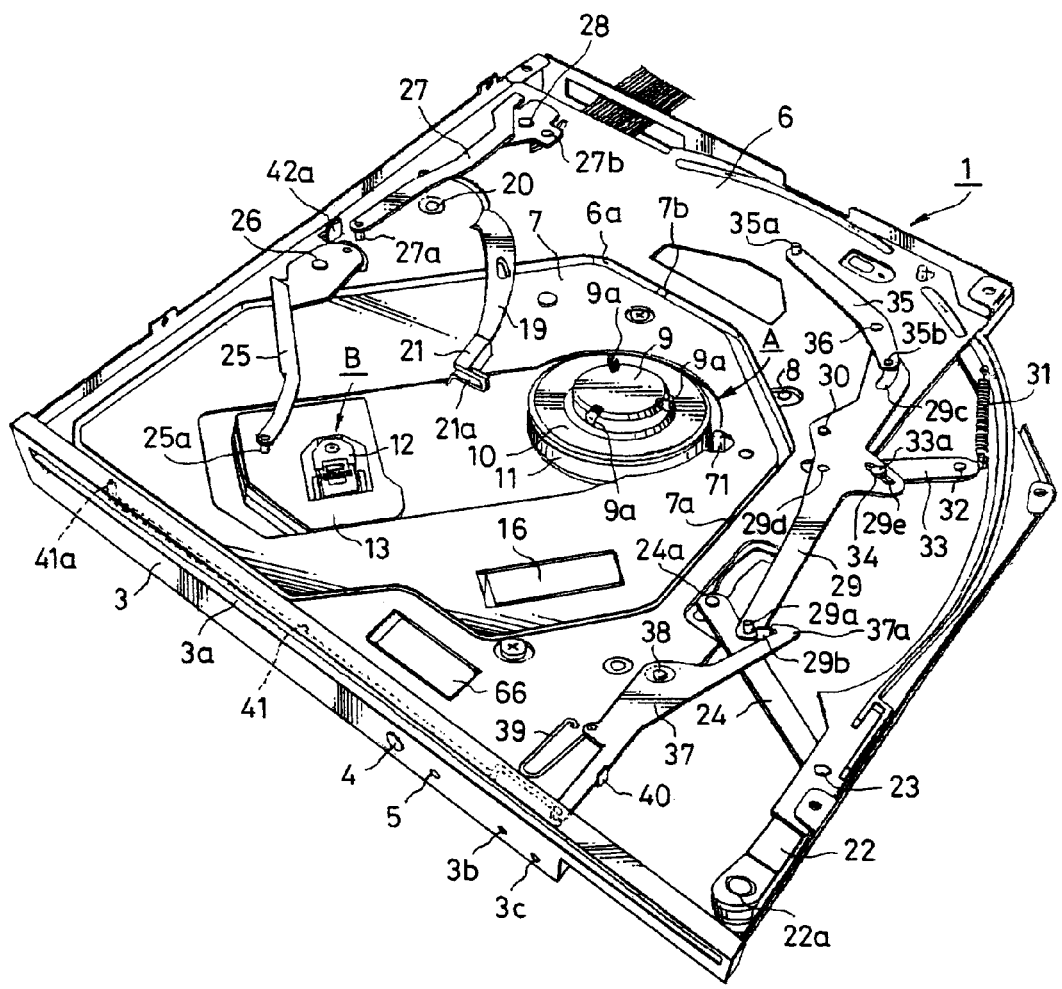
FIG. 4 is a perspective view showing an arrangement of the inside of the disc apparatus shown in FIG. 3.

FIG. 4 is a perspective view showing a state in which the top cover portion was removed from the above-described chassis case 2. As shown in FIG. 4, a base panel 2 is located within the chassis case 2 and a driving unit A for driving the large-diameter disc D1 and the small-diameter disc D2 is provided on the base panel 6 such that it is located from the center to the oblique lower direction. In this driving unit A, an elevation frame 7 using the side of the front bezel 3 as a supporting axis and of which rear end portion located at the center of the disc apparatus 1 can swing in the upper and lower direction is joined to the base panel 6 at a plurality of places by a known shock-absorbing support structure 8 in order to clamp central holes D1a and D2a of the large-diameter disc D1 and the small-diameter disc D2 or to release the large-diameter disc D1 and the small-diameter disc D2 from the clamped state.

A clamping head 9 is located on the tip end of the above-described elevation frame 7 at its position corresponding to the center of the large-diameter disc D1 or the small-diameter disc D2 which was conveyed and came to an end. This clamping head 9 is integrally formed with a turntable 10 and fixed to a drive shaft (not shown) of a spindle motor 11 located just under the turntable 10. This spindle motor 11 rotates the large-diameter disc D1 or the small-diameter disc D2 clamped by a chucking claw 9a of the clamping head 9 to record or reproduce information.

Reference letter B denotes a head unit supported to the elevation frame 7 and a carrier block 13 for reciprocally moving the large-diameter disc D1 and the small-diameter disc D2 in the diameter direction is supported to guide shafts 14 and 15 of which both ends are fixed to the elevation frame 7. Then, the above-described carrier block 13 is moved forward and backward by driving force transmitted from a gear train 17 to a screw shaft 18 (see FIG. 5).

Next, a plurality of arms for bringing the large-diameter disc D1 and the small-diameter disc D2 in and out of the disc apparatus 1 are provided on the flat surface of the base panel 6 so as to surround the elevation frame 7 and they are configured in such a manner that they may be operated by a driving mechanism provided on the back surface of the base panel 6. Of a plurality of arms, a disc supporting arm 19 performs a central function to bring the large-diameter disc D1 and the small-diameter disc D2 in and out of the disc apparatus 1. This disc supporting arm 19 is able to swing at a rivet pin 20 to support the rear end sides of the large-diameter disc D1 and the small-diameter disc D2 and it is able to keep the height positions of the large-diameter disc D1 and the small-diameter disc D2 with high accuracy in the transporting process. To this end, the disc supporting arm 19 has a holder 21 provided at its tip end and a concave groove 21a of this holder 21 can hold the rear end sides of the large-diameter disc D1 and the small-diameter disc D2.

Reference numeral 22 denotes a loading arm to bring the large-diameter disc D1 into the disc apparatus 1. This loading arm 22 is pulled by a link lever 24 joined by a pivot pin 23 and thereby swung. Thus, the loading arm 22 functions such that it starts pressing the large-diameter disc D1 inserted by its loading roller 22a from the front side portion of the center to pull the large-diameter disc D1 into the disc apparatus 1.

A guide arm 25 is swung at a pivot pin 26 rotatably attached to the base panel 5 and functions to support the side portion of the small-diameter disc D2 transported by a supporting member 25a fixed to the tip end of the guide arm 25 in a hanging-down fashion to guide the small-diameter disc D2 to a predetermined position. Also, a guide arm 27 is swung at a rivet pin 28 and functions to support the side portion of the large-diameter disc D1 transported by a supporting member 27a fixed to the tip end of the guide arm 27 in a hanging-down fashion to guide the large-diameter disc D1 to a predetermined position. The guide arm 27 functions also to support the side portion of the small-diameter disc D2 to guide the small-diameter disc D2 to a predetermined position. This guide arm 27 has a pivot pin 27b provided at its base end portion. An end portion of a third swing member 51 and an end portion of a tension coil spring 53 are attached to the pivot pin 27b at the back surface of the base panel 6.

A guide arm 29 is able to swing at a rivet pin 30 and functions to support the side portion of the small-diameter disc D2 transported by a supporting member 29a fixed to the tip end of the guide arm 29 in an erecting fashion to thereby guide the small-diameter disc D2 to a predetermined position. Also, the guide arm 29 functions to support the large-diameter disc D1 to properly position the large-diameter disc D1 to a predetermined position. It should be noted that, since an action pin 33a of a link lever 33 that swings at the rivet pin 32 under spring force of the tension coil spring 31 is engaged with a slit 29e of the above-described guide arm 29, the tip end of the guide arm 29 is constantly spring-biased in the centripetal direction. A guide arm 35 joined to a guide groove 29c at the rear end portion of the above-described guide arm 29 by a follower pin 35b is able to swing at a rivet pin 36 so that it functions to support the rear end side of the small-diameter disc D2 by a supporting member 35a fixed to the tip end of the guide arm 35 in an erected state to thereby guide the small-diameter disc D2 and that it also functions to support the side portion of the small-diameter disc D2 to thereby properly position the small-diameter disc D2 at a predetermined position.

Reference numeral 37 denotes a lock lever 37 and this lock lever 37 is able to swing at a rivet pin 38 such that an angle 37a formed at the tip end of the lock lever 37 can lock a strip piece provided at the tip end of the above-described guide arm 29. Although this lock lever 37 is constantly spring-biased at its angle 37a provided at its tip end in the centripetal direction by a wire spring 39, it is usually placed in the static state at a predetermined position owing to a function of a stopper 40.

Reference numeral 41 denotes a lead wire extended along the lower side of the front bezel 3. An end portion of the lead wire 41 is joined to the rear end portion of the above-described lock lever 37 and an engagement end portion 41 thereof is bent in an erected fashion so as to face to the slot 3a of the front bezel 3. Accordingly, when the large-diameter disc D1 is inserted into the disc apparatus 1 from the slot 3a, since the above-described engagement end portion 41a is pressed by the side portion of the large-diameter disc D1, this lead wire 41 is moved in the lateral direction in parallel to the front bezel 3. As a result, the lock lever 37 is pulled and the angle 37a at the tip end of the lock lever 37 is swung in the centrifugal direction so that the strip piece 29b of the guide arm 29 can be prevented from being locked.

Figure 5:
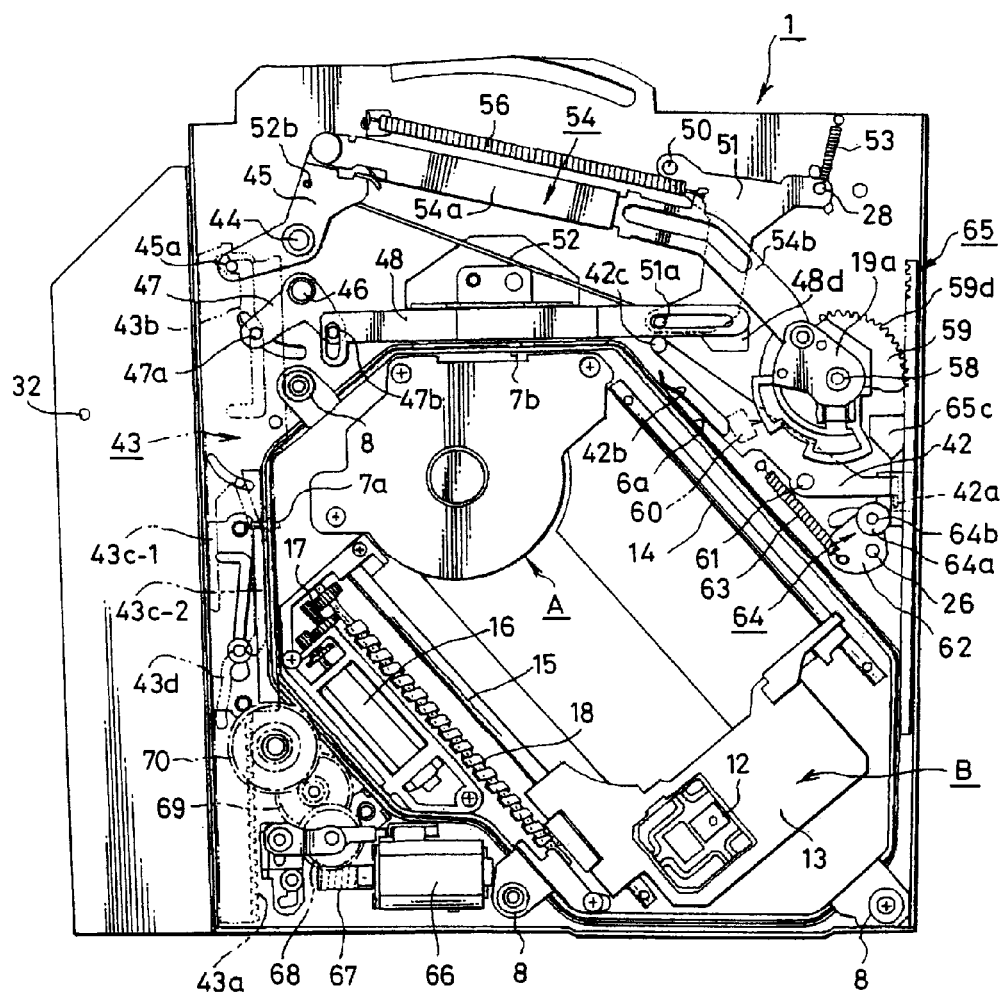
FIG. 5 is a perspective view showing an arrangement of a drive mechanism of the disc apparatus shown in FIG. 3.

It should be noted that, in the mechanism elements exposed on the flat surface of the base panel 6, reference numeral 42a denotes a locking strip piece of a lever arm (see FIGS. 4 and 5). While this locking strip piece 42a may function to control the position of the guide arm 27, operation modes thereof will be described in detail later on. Also, reference numeral 71 denotes a clamp releasing pin to release the large-diameter disc D1 and the small-diameter disc D2 from being clamped by the clamping head 9.

Mechanism elements configured on the back surface of the base panel 6 in order to operate various mechanism elements such as respective guide arms configured on the flat surface of the base panel 6 as described above will be described below. The disc apparatus 1 according to the present invention is configured in such a manner that all operation controls concerning the transport of the large-diameter disc D1 and the small-diameter disc D2 can be completed by forward and backward movements of a loading slider 43 located within the side portion of the disc apparatus 1 in the front and back direction as shown by an imaginary line in FIG. 5. An arrangement of the loading slider 43 that becomes the center of the mechanism elements and respective mechanism elements of which operations are controlled by this loading slider 43 will be described.

Figure 6:
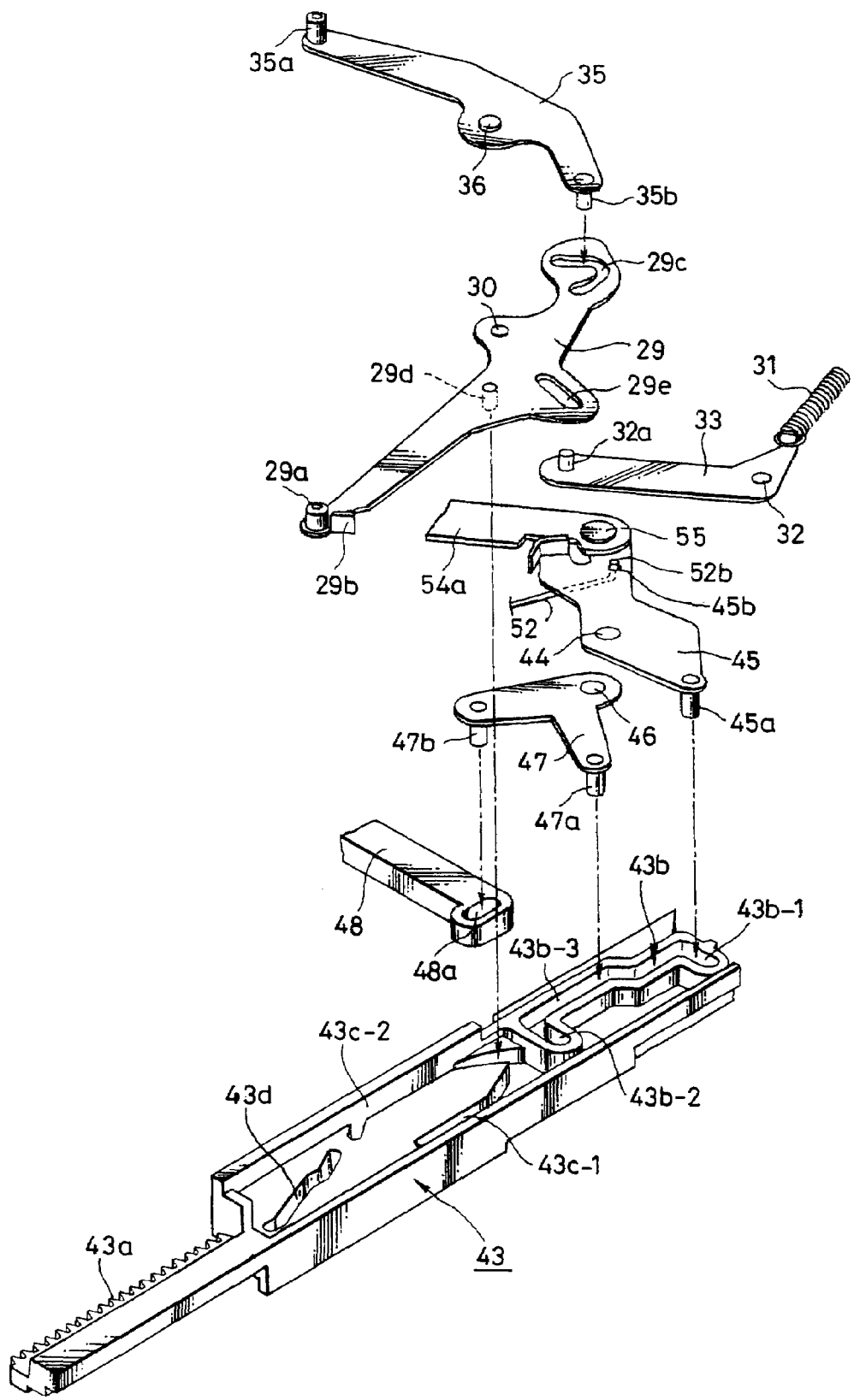
FIG. 6 is an exploded perspective view showing an arrangement of a loading slider.

FIG. 6 is an exploded perspective view showing the states of the above-mentioned mechanism elements from the direction in which the loading slider 43 is opposed to the back surface of the base panel 6. As shown in FIG. 6, the loading slider 43 is shaped like a pillar and a rack gear 43 is formed at its front end portion. On the other hand, the loading slider 43 has at its rear end portion formed a guide groove 43b with which an upper end horizontal portion 43b-1, a lower-end horizontal portion 43b-2 and a vertical portion 43b-3 having a stepped portion at its middle portion are communicated.

A follower pin 45a of a first swing member 45 that can swing at a rivet pin 44 is attached to the above-described upper end horizontal portion 43b-1 and a follower pin 47a of a second swing member 47 that can swing at a rivet pin 46 is attached to the vertical portion 43b-3. Then, an action pin 47a of this second swing member 47 is attached to an end portion through-hole 48a of a follower slider 48.

Guide grooves 43c-1 and 43c-2 are formed at both sides of a middle portion of the loading slider 43. An inclined surface is formed on the rear end portion of the guide groove 43c-1 and the front and rear ends of the guide groove 43c-2 also are inclined. Then, the follower pin 29d of the above-described guide arm 29 is placed at the opening portion of the rear end inclined portion of the above-described guide groove 43c-2 in the state in which the loading slider 43 is moved most in the forward direction.

Figure 7:
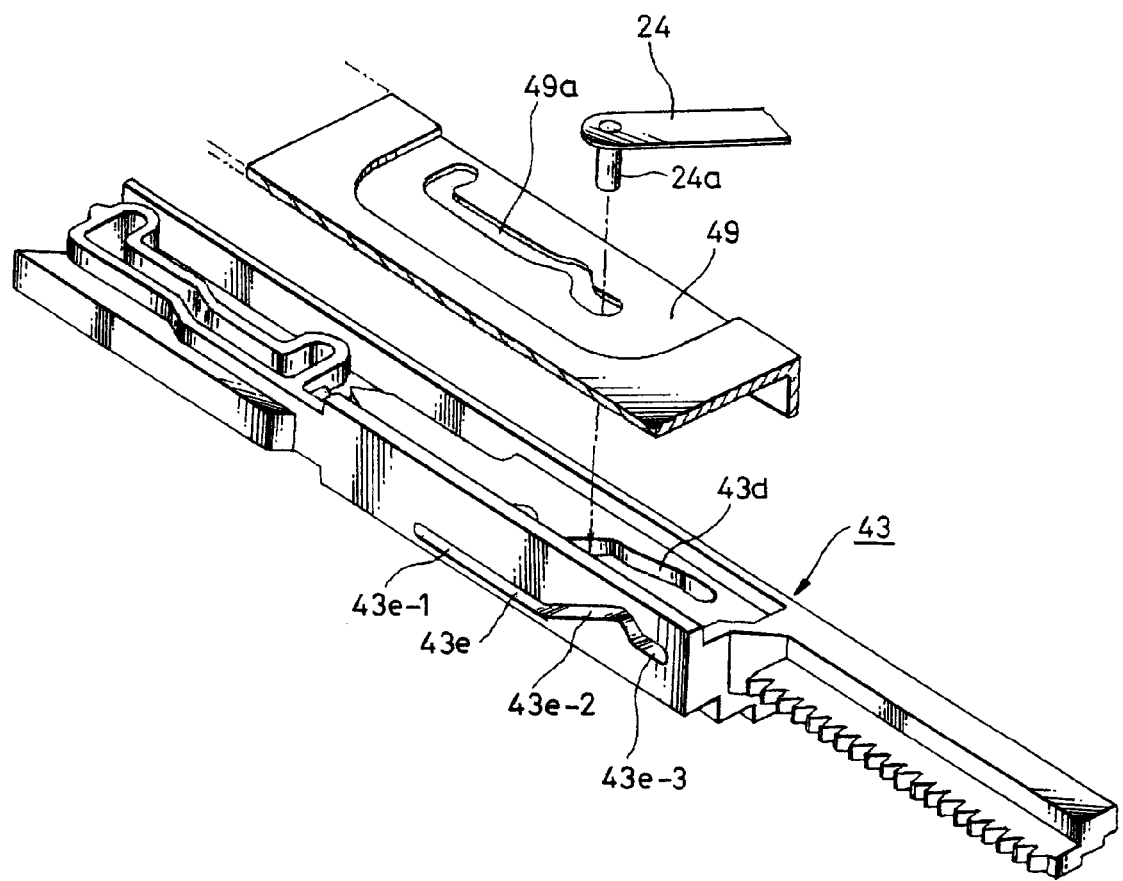
FIG. 7 is an exploded perspective view showing arrangements of the loading slider and a guide plate.

Reference numeral 43d denotes a guiding groove to pull the link lever 24 in such a manner that the loading arm 22 may be operated in synchronism with the transport of the large-diameter disc D1. As shown in FIG. 7, a guide slit 49a is formed on a guide plate 49 fixed to the base panel 6 located at the position in which it is put on this guiding groove 43d and the follower pin 24a fixed to the tip end of the link lever 24 is inserted into the guiding groove 43d and the guide slit 49a. Accordingly, the guide slit 49a placed at a predetermined position act relative to the guiding groove 43d which is moved forward and backward to thereby control operations of the follower pin 24a.

Also, a cam groove 43e to move the follower pin 7a, which can ascend and descend this elevating frame 7, in the upper and lower direction is formed on the side portion which faces the elevating frame 7 of the loading slider 43. This cam groove 43e is composed of a series of a low position portion 43e-1 to keep the elevating frame 7 at the low position, an inclined portion 43e-2 to ascend or descend the elevating frame 7 and a high position portion 43e-3 to keep the elevating frame 7 at the high position.

Figure 8:
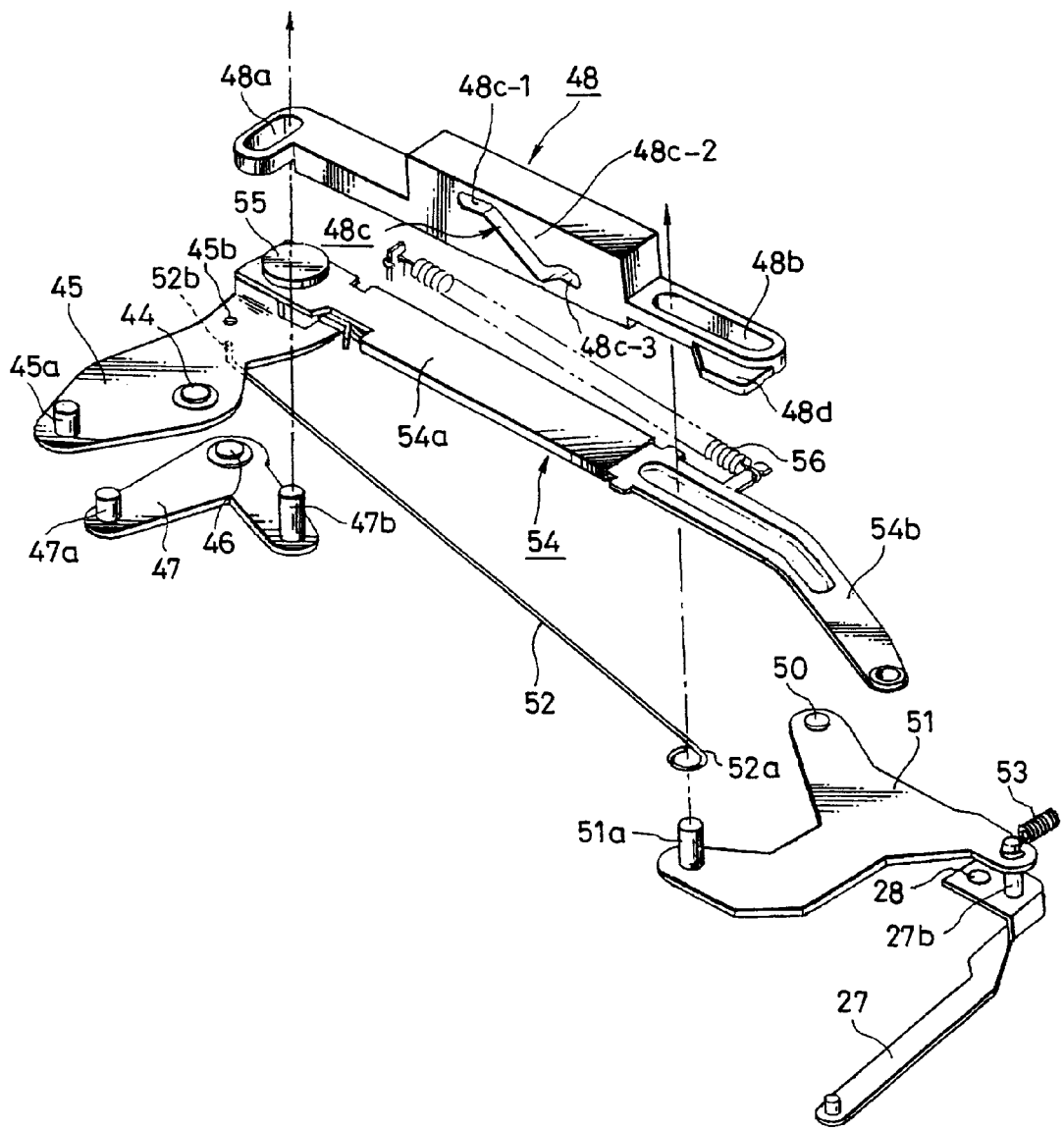
FIG. 8 is an exploded perspective view showing an arrangement of a power transmission mechanism.

FIG. 8 is an exploded perspective view showing a power transmission mechanism configured at the rear portion within the disc apparatus 1 from the back surface. As shown in FIG. 8, this power transmission mechanism includes a cam groove 48c that can move the follower pin 7b, which functions to ascend and descent the elevating frame 7 of the follower slider 48, in the upper and lower direction. This cam groove 48c is composed of a series of a low position portion 48c-1 to keep the elevating frame 7 at the low position, an inclined portion 48c-2 to ascend or descend the elevating frame 7 and a high position portion 48c-3 to keep the elevating frame 7 at the high position.

The above-described follower slider 48 includes an end portion through-hole 48b and an action pin 51a of a third swing member 51 that can be swung at a rivet pin 50 is fitted into the end portion through-hole 48b. Then, an end portion 52a of a link wire 52 is attached to the above-described action pin 51a and the other end portion 52b is engaged with the through-hole 45b of the first swing member 45. While the above-described third swing member 51 is spring-biased in the counter-clockwise direction in FIG. 8 under spring force of the tension coil spring 53, the action pin 51a is limited in action by the link wire 52 so that the third swing member 51 is placed in the static state at a predetermined position in the state in which the disc apparatus 1 is not energized. Also, an action piece 48d to operate the lever arm 42 is formed at the side portion of the above-described end portion through-hole 48b.

Next, a link arm 54 joined between the first swing member 45 and a gear disc 59, which will be described later on, can be configured so as to be contracted and expanded by a combination of a first link arm 54a joined to the first swing member 45 by a joint member 55 and a second link arm 54b spring-biased under spring force of a tension coil spring 56, thereby making it possible to secure safety of the mechanism when the large-diameter disc D1 and the small-diameter disc D2 are transported.

Figure 9:
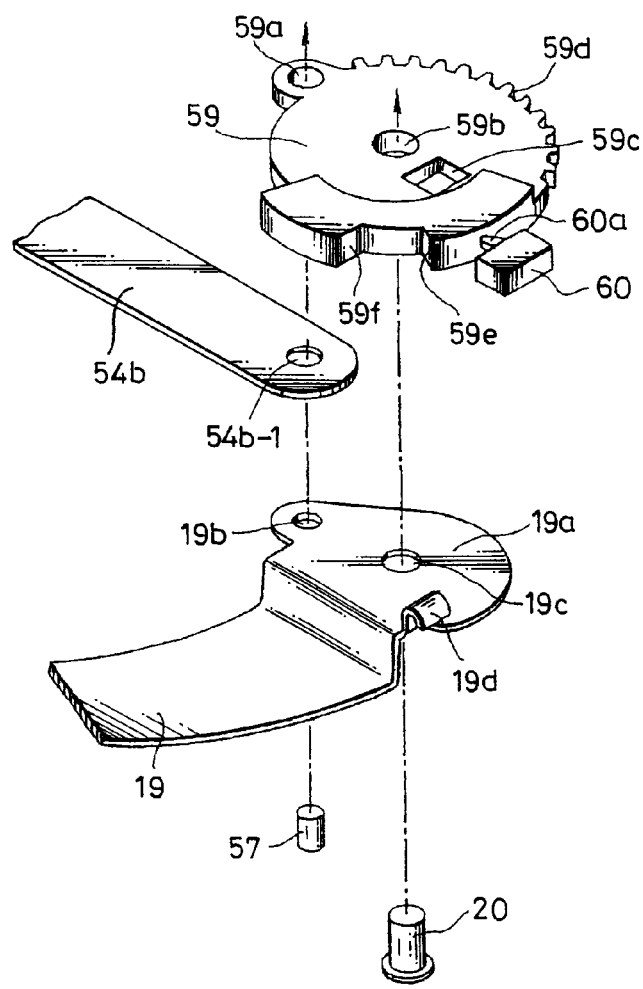
FIG. 9 is an exploded perspective view showing an arrangement of a gear disc.

FIG. 9 is a perspective view showing an arrangement of an end portion of the above-described second link arm 54b from the back surface of the disc apparatus 1, wherein a through-hole 54b-1 of the second link arm 54b, the through-hole 19b of the rotary base plate 19a of the disc supporting arm 19 and a through-hole 59a of a gear disc are pivotally supported by a pivot pin 57 so as to become rotatable at the same time. On the other hand, the central hole 19c of the disc supporting arm 19 and a central hole 59b of the gear disc 59 are pivotally supported at the same time by the rivet pin 20 of which one end is fixed to the base panel 6 and the engagement piece 19d of the above-described rotary base plate 19a is opposed to an engagement window 59c of the gear disc 59, thereby being integrated as one body.

A gear 59d is formed at a part of an outer peripheral edge opposing to the side surface of the chassis case 2 of the above-described gear disc 59 and switch actuating stepped portions 59e and 59f are formed on an outer peripheral edge opposing to the gear 59. A limit switch 60, which are turned on by the above-described switch actuating stepped portions 59e and 59f, is mounted on a wiring board (not shown) disposed on the bottom surface of the chassis case 2 and its switch knob 60a is operated by the above-described switch actuating stepped portions 59e and 59f.

The aforementioned lever arm 42 is fixed so as to swing at a rivet pin 61. Its locking strip piece 42a is opposed to the surface of the base panel 6 from the opening of the base panel 6 and the tip end of the spring piece 42b is brought in contact with the opening wall 6a of the base panel 6, whereby spring-biasing force in the centrifugal direction is generated in the roller 42c of the tip end portion. As a result, although the lever arm 42 is placed in the static state at a predetermined position when the roller 42c is in contact with the side wall of the follower slider 48, if the follower slider 48 is slid, then its action piece 48d is pressed by the roller 42c so that the lever arm 42 is swung at a rivet pin 61, thereby causing the locking strip piece 42d to be moved in the centrifugal direction.

Next, a mechanism to swing the guide arm 25 will be described. In this guide arm 25, the pivot pin 26 provided at the base end of the guide arm 25 so as to serve as its swing supporting point is extended on the rear surface of the base panel 6 and a roller supporting plate 62 is fixed to the end portion of the pivot pin 26. Since this roller supporting plate 61 has a tension coil spring 63 extended therein as shown in FIG. 5, it is spring-biased in the clockwise direction in FIG. 5 under spring force of the tension coil spring 63, whereby the guide arm 25 is inclined in the centripetal direction. A double roller 64 disposed on the above-described roller supporting plate 62 is composed of a large-diameter portion 64a and a small-diameter portion 64b which are configured on the same axis as shown in FIG. 10.

Figure 10:
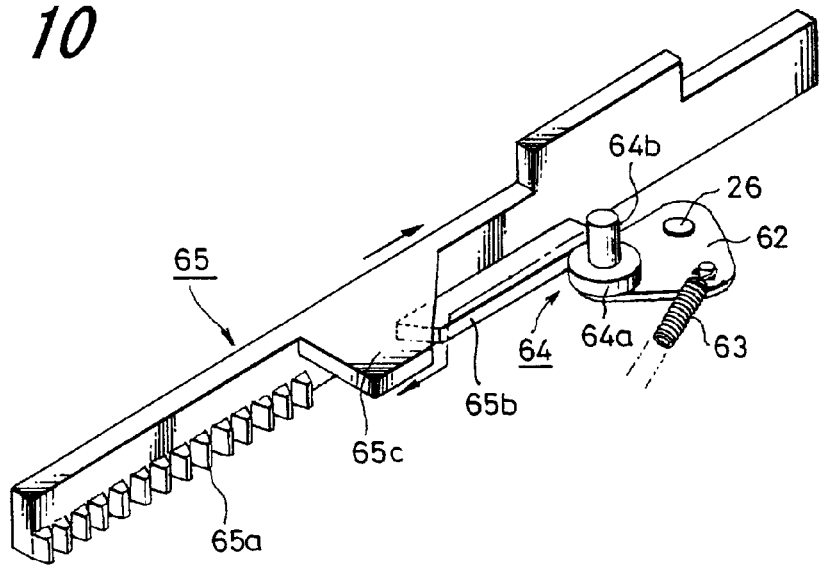
FIG. 10 is a perspective view showing an arrangement of a rack slider.

In FIG. 10, a rack slider 65 provided along the inner surface of the side wall of the chassis case 2 includes a rack gear 65a meshed with the gear 59d of the gear disc 59 so that the rack slider 65 may be moved forward and backward in synchronism with rotation of the gear disc 59. A low position guide piece 65b is formed on a lower side of the intermediate portion of the rack slider 65 and a high position guide piece 65c is formed on a high side of the intermediate portion of the rack slider 65. The low guide piece 65b guides the large-diameter portion 64a of the above-described double roller 64 and the high position guide piece 65c guides the small-diameter portion 64b.

While the thus configured mechanism elements are operated as the loading slider 43 is slid forward and backward, the drive mechanism is provided at the corner portion of the back surface of the disc apparatus 1 as shown in FIG. 5. Rotational force of a worm gear 67 of an output shaft of a loading motor 66 that serves as a power source of the drive mechanism is decelerated and transmitted to small-diameter gears to large-diameter gears, in that order, by a gear train composed of double gears 68, 69 and 70. Then, driving force is transmitted to the loading slider 43 from a small-diameter gear of the double gear 70 meshed with the rack gear 43a of the loading slider 43 and thereby the loading slider 43 is slid in the forward and backward direction.

Next, operation modes of the disc apparatus 1 according to the present invention having the above-mentioned arrangement will be described. As described above, the disc apparatus 1 is configured such that the large-diameter disc D1 and the small-diameter disc D2 can be transported. First, transport modes of the large-diameter disc D1 will be described with reference to FIGS. 11 to 24 and transport modes of the small-diameter disc D2 will be described with reference to FIGS. 25 to 38.

FIGS. 11 to 17 are plan views showing main portions of the arrangements exposed on the surface of the base panel 6 by solid lines. Main portions of the arrangements exposed on the back surface of the base panel 6 at that time are shown by broken lines in FIGS. 11 to 17. Also, FIGS. 18 to 24 are bottom views showing main portions of the arrangements exposed on the back surface of the base panel 6 by solid lines. Arrangements exposed on the surface of the base panel 6 at that time are shown by broken lines in FIGS. 18 to 24. It should be noted that, although the cam grooves 43e, 48c and the follower pins 7a, 7b are inherently not shown in FIGS. 11 to 17, they are shown in FIGS. 11 to 17 in order to understand the present invention more easily.

Figure 11:
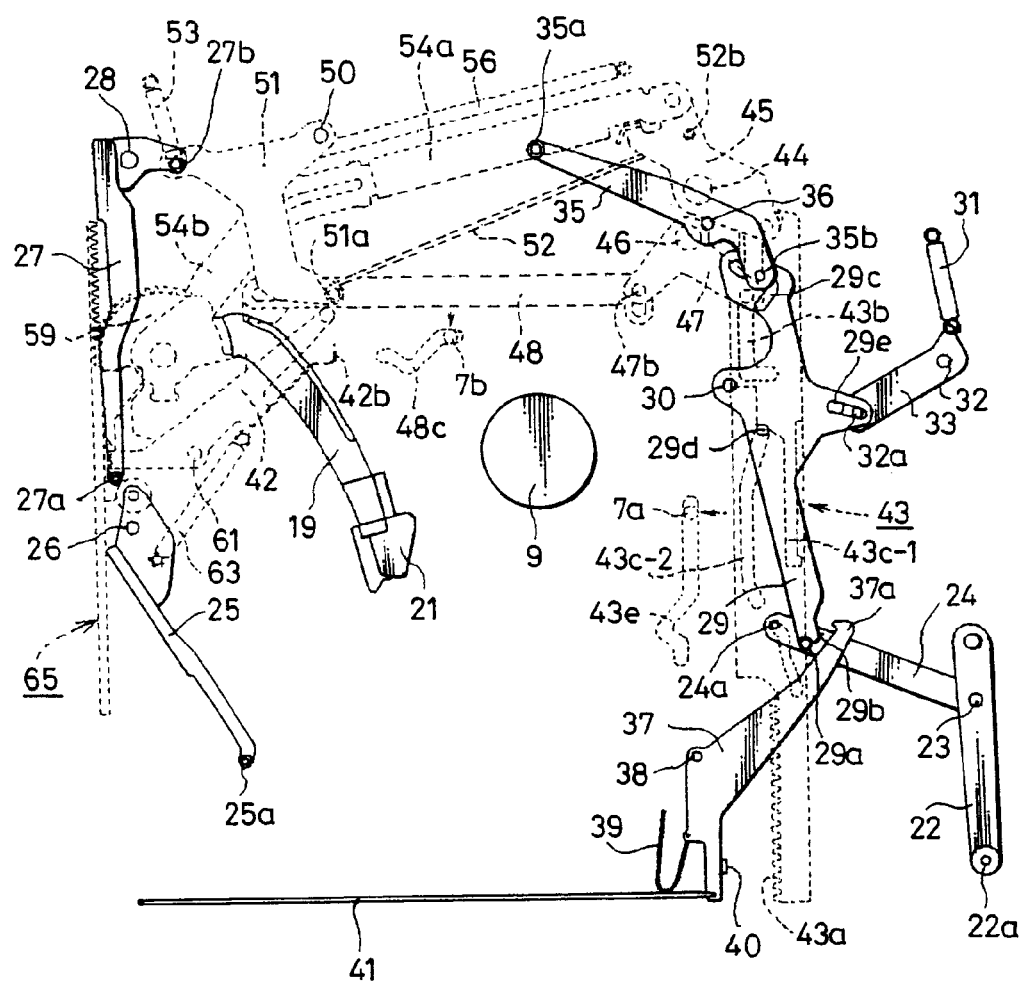
FIG. 11 is a first process diagram useful for explaining a state in which a large-diameter disc is being transported.
Figure 18:
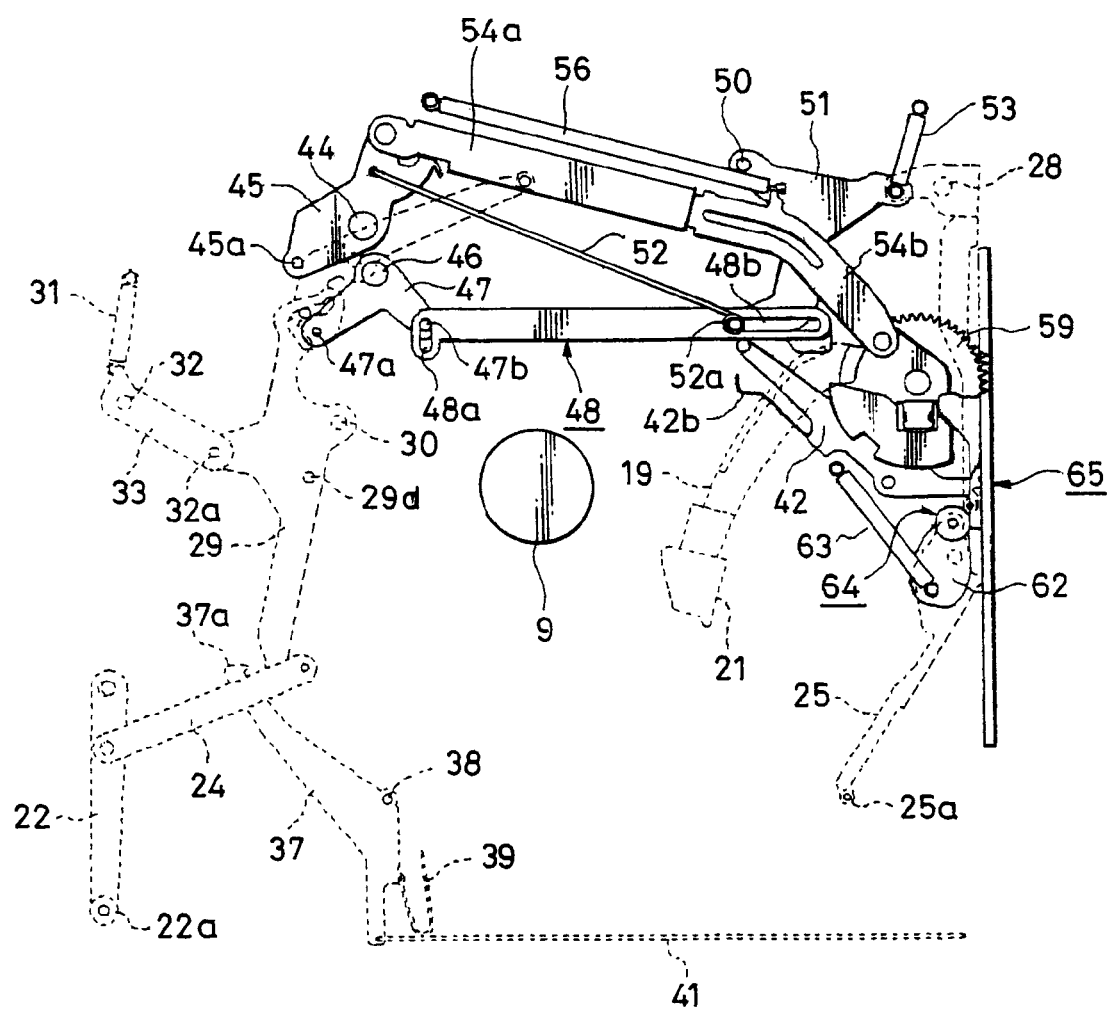
FIG. 18 is a first process diagram useful for explaining a state in which a large-diameter disc is being transported.

FIGS. 11 and 18 show states in which the disc apparatus 1 is placed in the standby state to await the insertion of the large-diameter disc D1 from the slot 3a of the front bezel 3 and in which respective arms are placed in the static state in the initial state. At that time, in the guide arm 25, the large-diameter portion 64a of the double roller 64 of the roller supporting plate 62 fixed to the above-described pivot pin 26 at the back surface of the base panel 6 is brought in contact with the low position guide piece 65b of the rack slider 65 as shown in FIGS. 10 and 18 so that the guide arm 25 is stopped at the position swung in the centrifugal direction by a predetermined amount from the position at which it is swung most in the centripetal direction.

The reason for this will be described below. If the disc apparatus 1 is configured such that it awaits the insertion of the disc when the guide arm 25 is stopped at the position in which it is swung most in the centrifugal direction, then when the small-diameter disc D2 is displaced to the left-hand side and inserted into the disc apparatus 1, the small-diameter disc D2 is entered into the left-hand side of the supporting member 25a so that it may become impossible to transport the small-diameter disc D2. In order to prevent this disadvantage, the guide arm 25 is stopped at the position in which it is swung by a predetermined amount in the centrifugal direction from the position at which it is swung most in the centripetal direction.

Next, since the guide arm 25 is spring-biased at its base end portion under spring force of the tension coil spring 53, it is constantly applied with force to swing the supporting member 27 provided at the tip end of the guide arm 25 in the centripetal direction. However, the third swing member 41 joined to the pivot pin 27b is placed in the static state at a predetermined position and hence this guide arm 27 is placed in the static state in the state shown in FIG. 11. This is because the link wire 52 attached between the first swing member 45 in the stationary state and the action pin 51a of the third swing member 51 functions as a stopper to prevent the third swing member 51 from being swung.

Figure 39A:
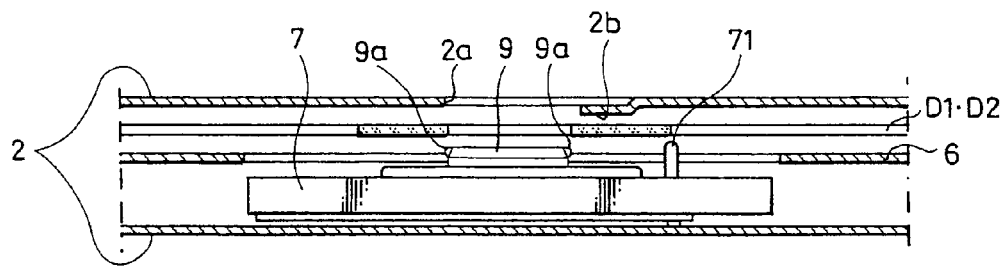
FIGS. 39A to 39E are process diagrams useful for explaining a process in which an elevation-frame is being ascended.

Similarly, the disc supporting arm 19, the guide arm 29, the guide arm 35 and the loading arm 22 to which power is transmitted as the loading slider 43 is slid also are placed in the static state in the states shown in FIG. 11. Also, the follower pin 7a of the elevation frame 7 guided by the cam groove 43e of the loading slider 43 is placed at the low position portion 43e-1 of this cam groove 43. On the other hand, the follower pin 7b of the elevation frame 7 guided by the cam groove 48c of the follower slider 48 is placed at the low position portion 48c-1 of this cam groove 48c so that the elevation frame 7 is lowered most as shown in FIG. 39A.

Figure 12:
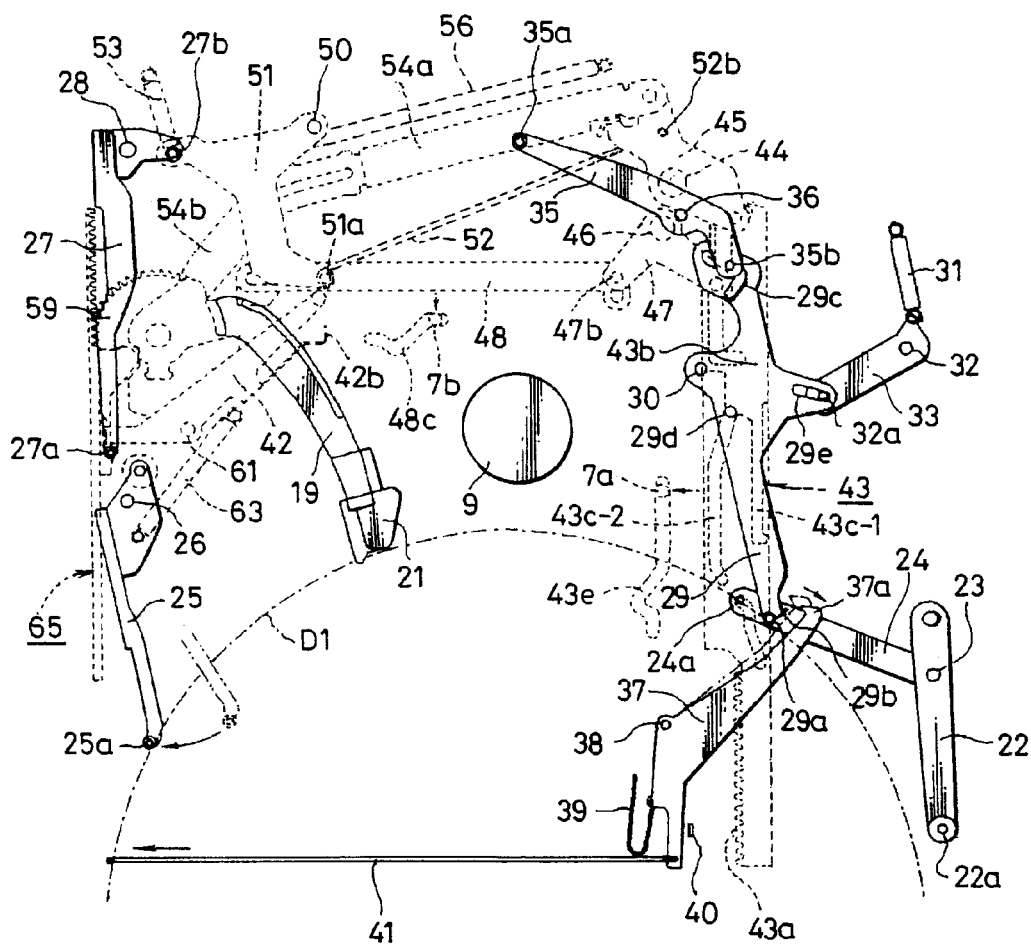
FIG. 12 is a second process diagram useful for explaining a state in which a large-diameter disc is being transported.
Figure 19:
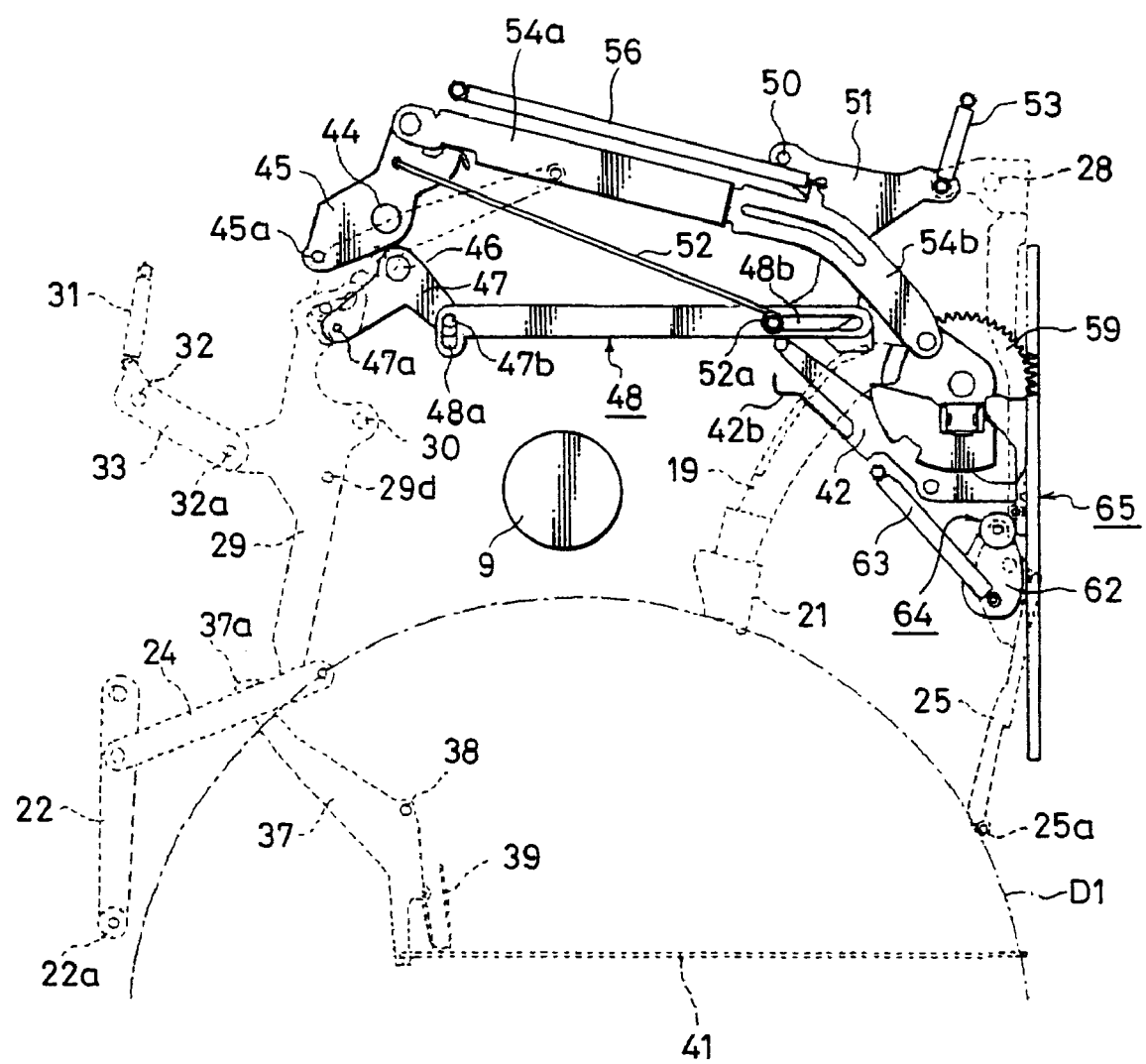
FIG. 19 is a second process diagram useful for explaining a state in which a large-diameter disc is being transported.

FIGS. 12 and 19 show states in which the large-diameter disc D1 is inserted from the slot 3a of the front bezel 3 by an operator so that the rear end side of this large-diameter disc D1 is brought in contact with the holder 21 of the disc supporting arm 19 and the supporting member 29a of the guide arm 29. At that time, the large-diameter disc D1 presses the supporting member 25a provided at the tip end of the guide arm 25 and hence the guide arm 25 is swung to the centrifugal direction from the position shown by an imaginary line in FIG. 12. At that time, the side portion of the large-diameter disc D1 presses the engagement end portion 41a of the lead wire 41 and the lead wire 41 is slid in the direction shown by an arrow in FIG. 12. As a consequence, the lock lever 37 is pulled by the lead wire 41 and the angle 37a provided at the tip end of the lock lever 37 is swung in the direction shown by an arrow in FIG. 12 so that the lock lever 37 is released from a range to lock the strip piece 29b formed at the tip end of the guide arm 29.

Figure 13:
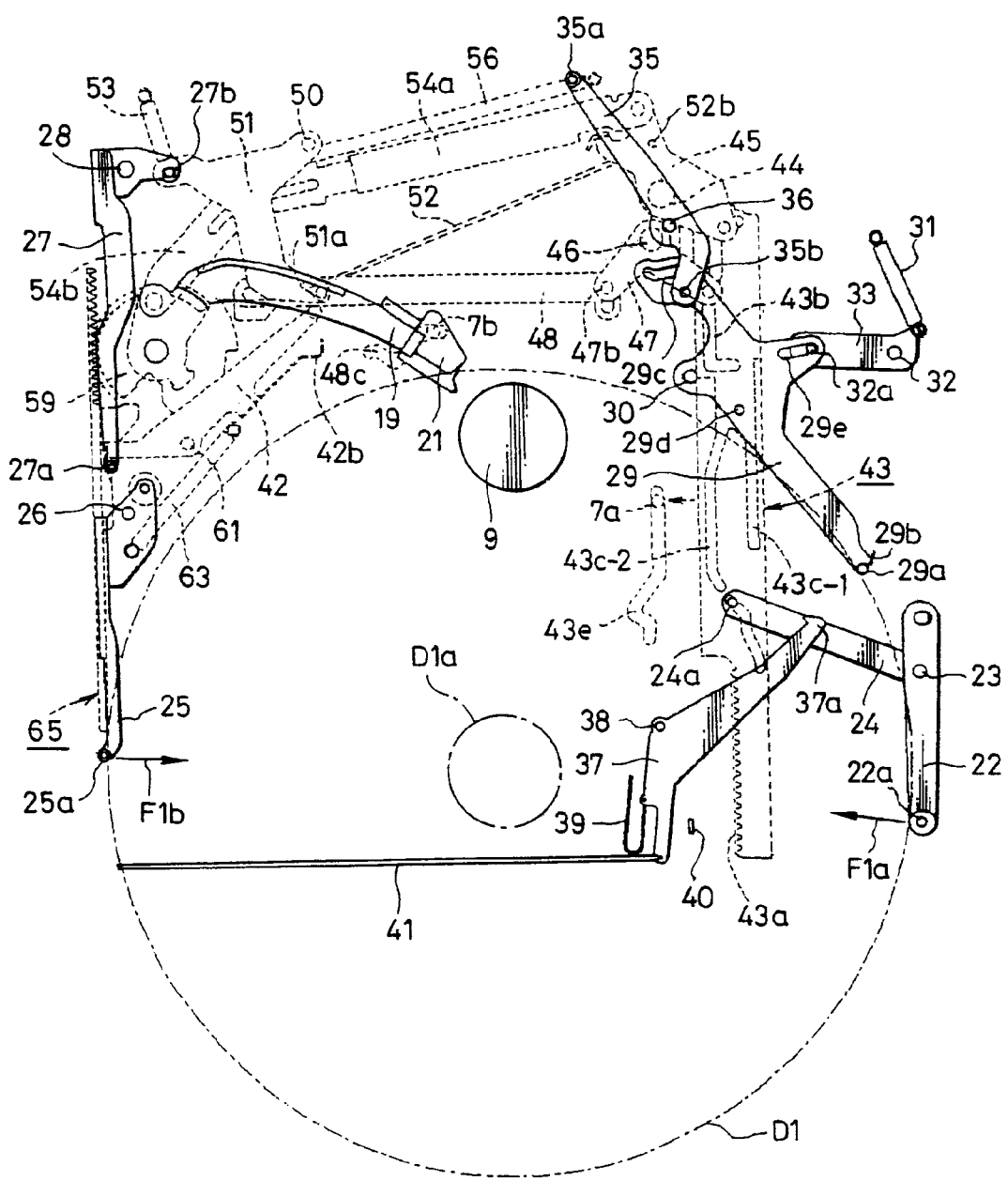
FIG. 13 is a third process diagram useful for explaining a state in which a large-diameter disc is being transported.
Figure 20:
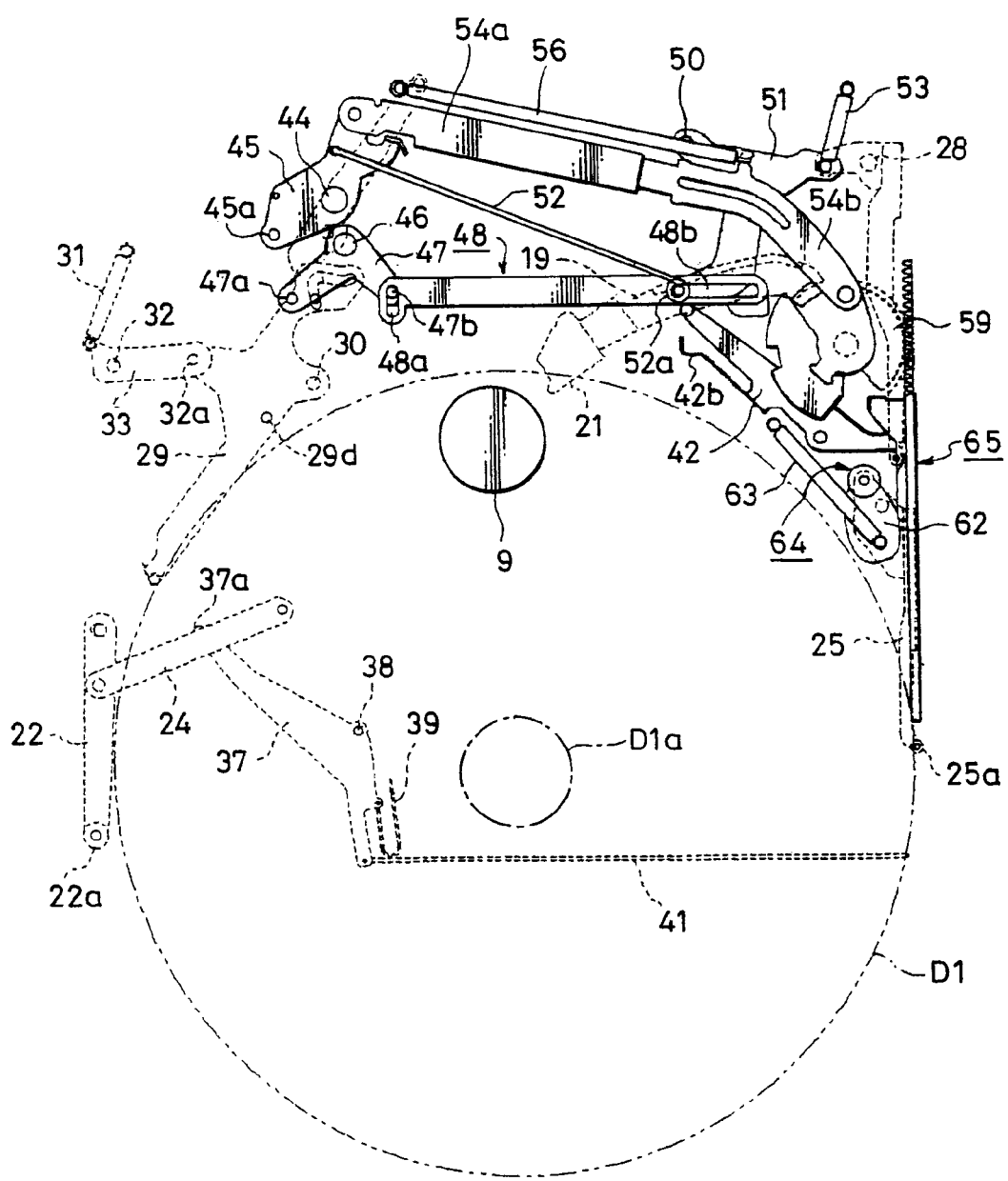
FIG. 20 is a third process diagram useful for explaining a state in which a large-diameter disc is being transported.

FIGS. 13 and 20 show states in which the large-diameter disc D1 is further inserted from the above-described state by the operator. When pressed by the large-diameter disc D1, the disc supporting arm 19, the guide arm 25 and the guide arm 29 are swung in the centrifugal direction. Accordingly, the base portion of the disc supporting arm 19 is rotated at the rivet pin 20 from the position shown in FIG. 41A to the position shown in FIG. 41B, whereby the limit switch 60 is operated by the switch actuating stepped portion 59e of the gear disc 59. It should be noted that the rack slider 65 meshed with the gear disc 59 is slightly moved forward.

Based on a signal from the limit switch 60 operated by the above-described switch actuating stepped portion 59e, at this time, a current of a low potential voltage flows through the loading motor 66. In consequence, the loading slider 41 is moved backward to pull the link lever 24 so that the loading arm 22 is swung up to the position shown by an imaginary line shown in FIG. 22. As a result, the loading roller 22a provided at the loading arm 22 is brought in contact with the large-diameter disc D1 and stopped.

Herein, potential of a current of the above-described low potential is set based on potential necessary for transporting the small-diameter disc D2 which will be described later on. At this time point, when a current of high potential to generate a torque large enough to transport the large-diameter disc D1 flows, there is a risk that defects will occur in the transporting mechanism. More specifically, in FIG. 13, since a component of a force F1a generated by pressing of the loading arm 22 and a component of a force F1b generated by pressing of the supporting member 25a of the guide arm 25 are existing substantially near the center of the large-diameter disc D1, its resultant force is extremely small so that propulsive force to move the large-diameter disc D1 in the transporting direction is not generated. In addition, in the state shown in FIG. 13, the supporting member 29a provided at the tip end of the guide arm 29 and which is spring-biased in the centripetal direction is pushing the rear side portion of the large-diameter disc D1.

In such situation, when a current of high potential necessary for transporting the large-diameter disc D1 is supplied to the loading motor 66, the loading arm 22 is stopped while it is holding the large-diameter disc D1 and the transporting operation is stopped. If this condition is continued, then there is a risk that the gear train of the transporting mechanism will be broken or that the loading motor 66 will be burned and broken. In order to avoid the above-mentioned disadvantages, at this time point, a current of low potential necessary for transporting the small-diameter disc D2 is supplied to the loading motor 66.

It should be noted that, in the state in which the current of low potential is supplied to the loading motor 66, since the large-diameter disc D1 becomes a load so that the loading arm 22 may not be rotated by only driving force of the loading motor 66, the transporting operation of the large-diameter disc D1 is not carried out. Thus, when the operator presses the large-diameter disc D1, the driving force of the loading motor 66 and insertion force given by the operator are applied to the loading arm 22 so that the transporting operation of the large-diameter disc D1 can be carried out.

Figure 14:
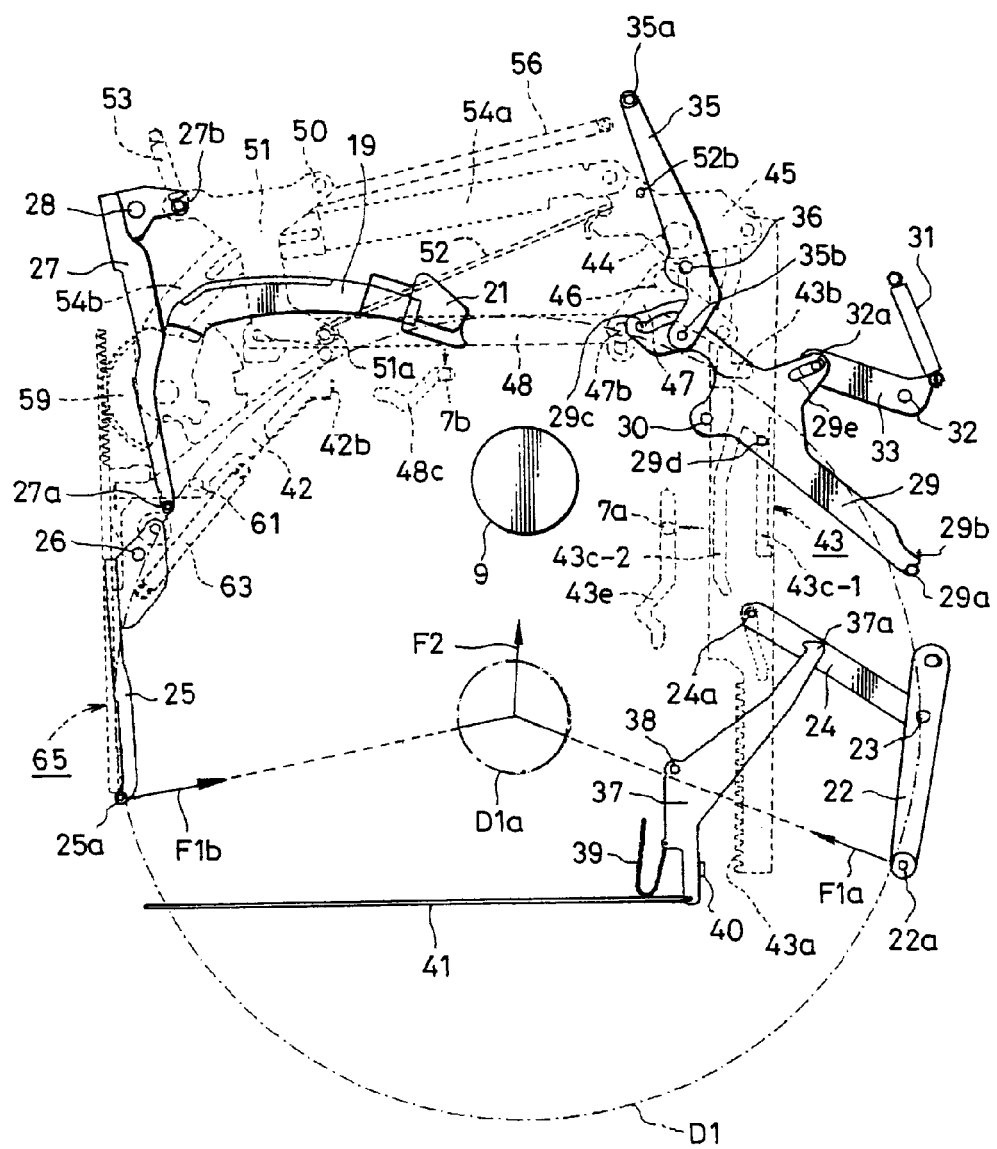
FIG. 14 is a fourth process diagram useful for explaining a state in which a large-diameter disc is being transported.
Figure 21:
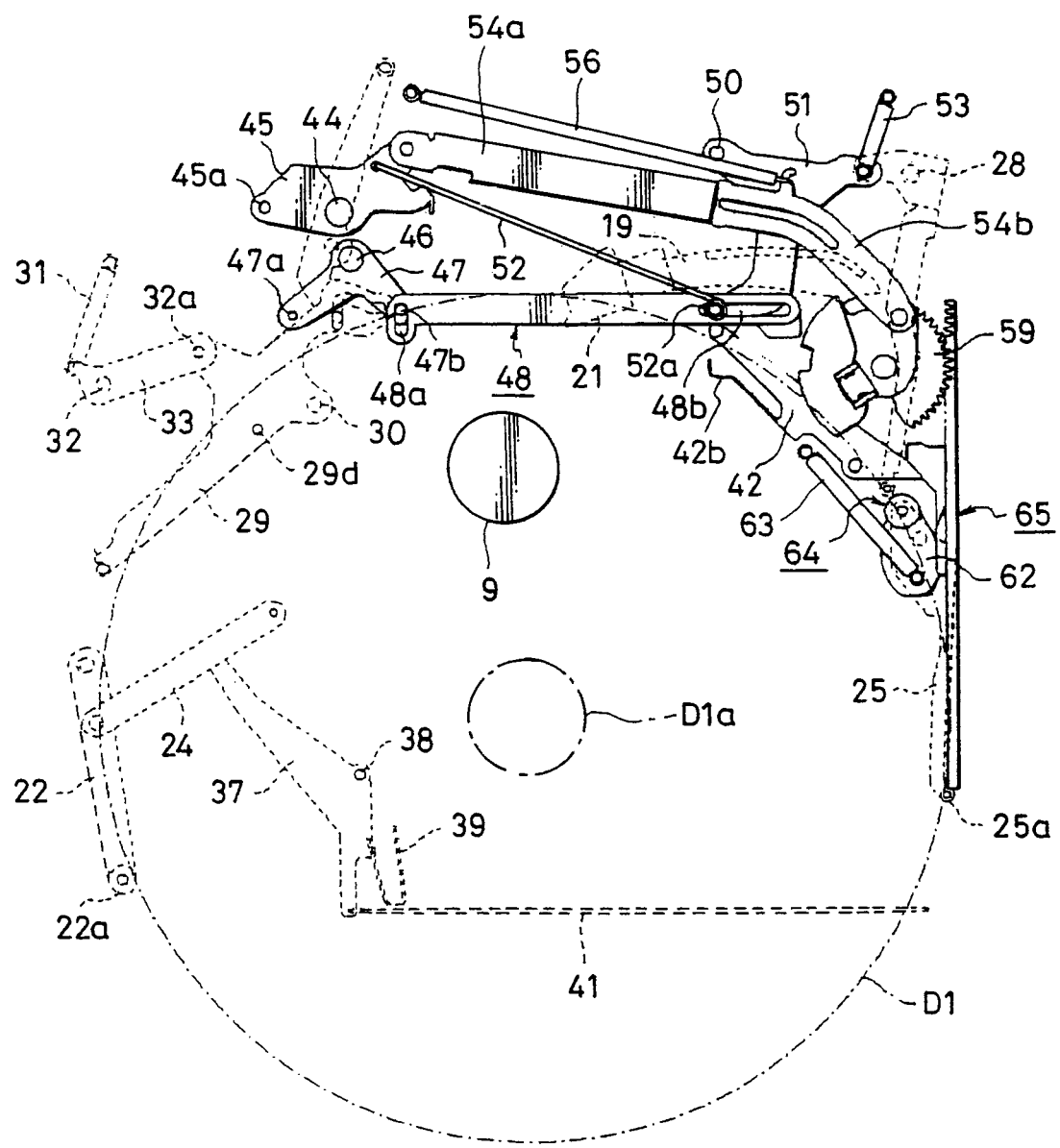
FIG. 21 is a fourth process diagram useful for explaining a state in which a large-diameter disc is being transported.

FIGS. 14 and 21 show states in which the large-diameter disc D1 was further inserted by the operator from the above-described state and in which the gear disc 59 of the base portion of the disc supporting arm 19 is further rotated. As a result, since the link arm 54 is pulled and the first swing member 45 is swung at the rivet pin 44 to cause the follower pin 45a to be moved in the backward, the loading slider 43 spring-biased by the driving force of the loading motor 66 through which a current of low potential is flowing also is moved in the backward direction.

In such operation, the guide arm 29 is swung in the centrifugal direction to release the large-diameter disc D1 from being supported by the supporting member 29a. This is because the follower pin 29d of the guide arm 29 located on the inclined surface of the rear end portion of the guide groove 43c-1 of the loading slider 43 is affected by the action of the inclined surface as the loading slider 43 is moved backward.

As the first swing member 45 is swung as described above, the third swing member 51 of which swinging is restricted by the link wire 52 may be swung at the rivet pin 50 due to the action of the tension coil spring 53. Consequently, the guide arm 27 is swung in the centripetal direction and the rear side portion of the large-diameter disc D1 is supported by the supporting member 27a provided at the tip end of the guide arm 27. At that time, since the loading slider 43 is moved in the backward direction to pull the link lever 24, the loading arm 22 is swung in the centripetal direction and the loading roller 22a provided at the tip end of the loading arm 22 contacts with the front side portion of the large-diameter disc D1 to support the large-diameter disc D1. It should be noted that, since the follower pin 7a of the elevating frame 7 is placed in the state in which it is moved horizontally in the low position portion 43e-1 of the cam groove 43e, this elevation frame 7 remains at the position shown in FIG. 39A.

Figure 41A:
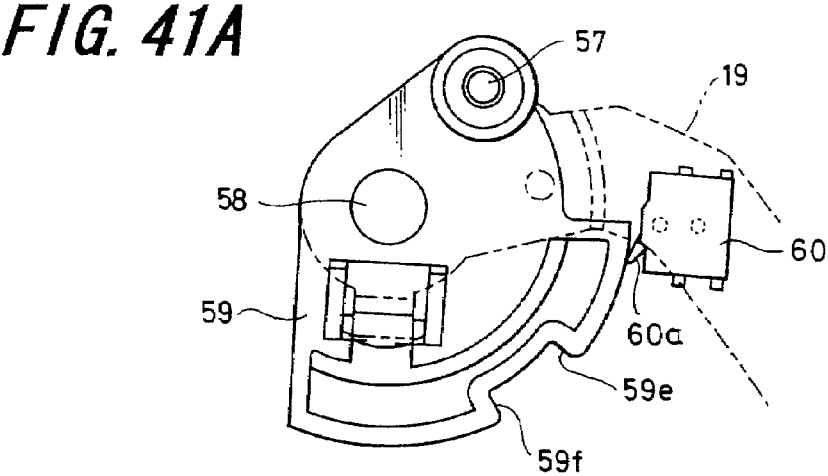
FIGS. 41A to 41C are diagrams used to explain a mode in which a gear disc is operated.
Figure 41B:
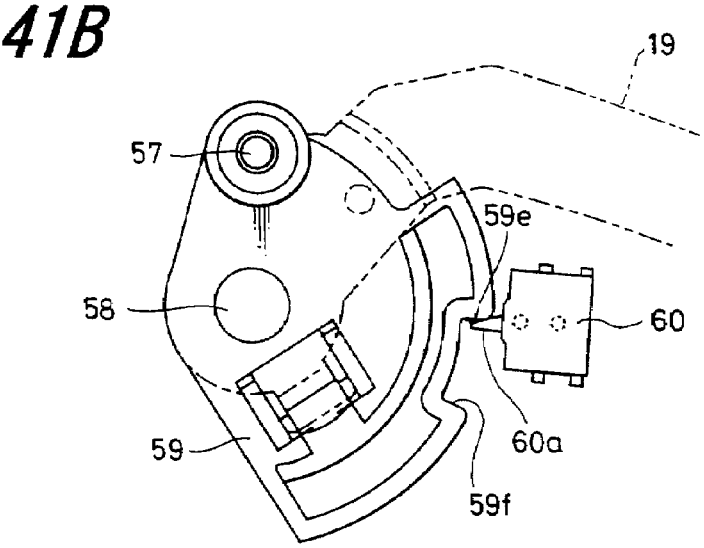
Figure 41C:
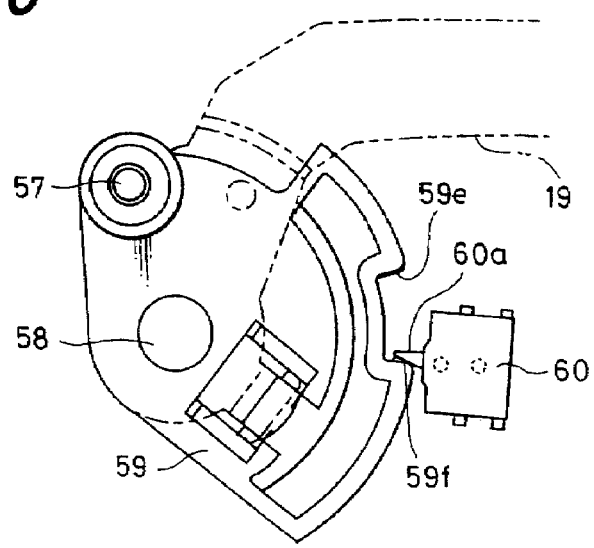

On the other hand, the gear disc 59 at the base portion of the disc supporting arm 19 is rotated up to the position shown in FIG. 41C and the switch actuating stepped portion 59f inverts the switch knob 60a of the limit switch 60. A torque necessary for transporting the large-diameter disc D1 is generated by switching the current supplied to the loading motor 66 to the high potential based on a signal from the limit switch 60 at this time. Then, since the component of a force F1a generated by pressing of the loading roller 22a and the component of a force F1b generated by pressing of the supporting member 25a of the guide arm 25 are increased, resultant force F2 which pushes the large-diameter disc D1 in the transporting direction is generated and automatic loading of the large-diameter disc D1 by the loading motor 66 is started.

Figure 15:
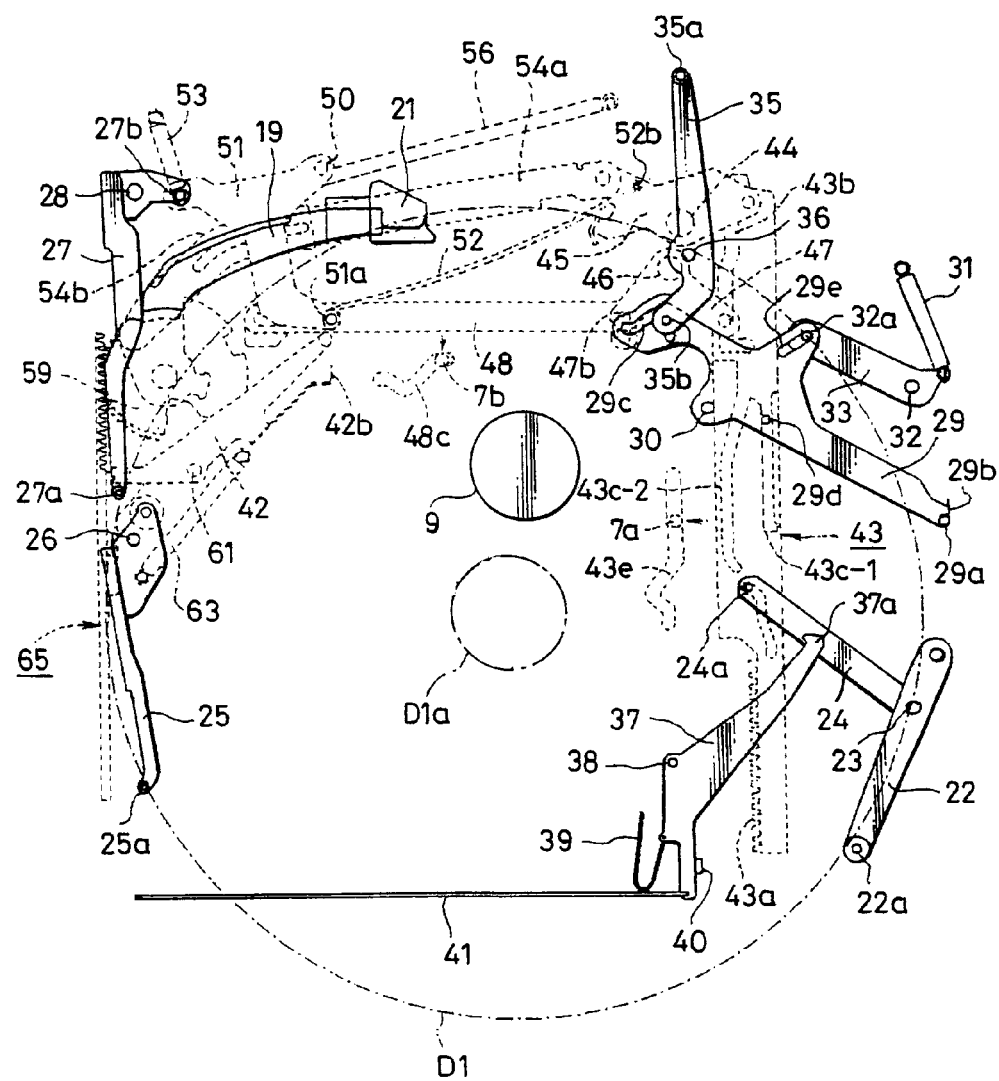
FIG. 15 is a fifth process diagram useful for explaining a state in which a large-diameter disc is being transported.
Figure 22:
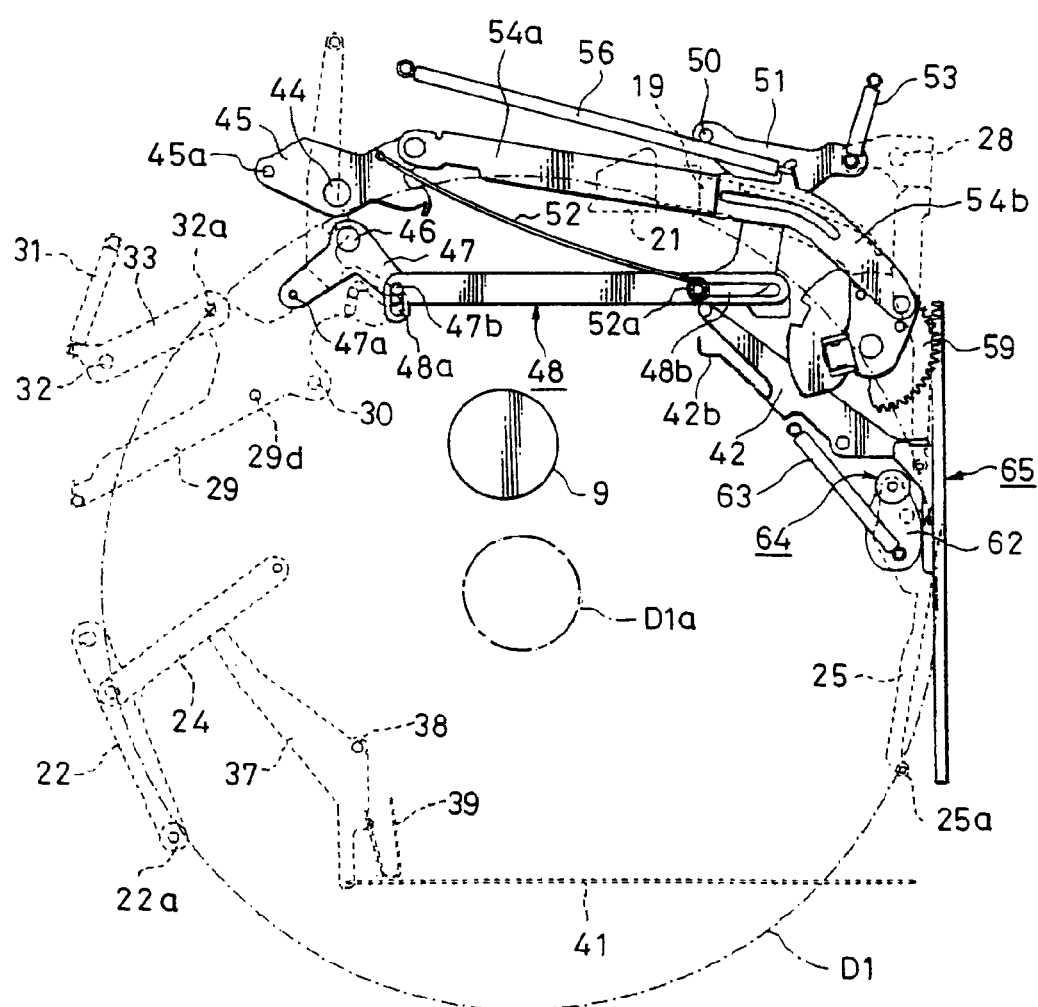
FIG. 22 is a fifth process diagram useful for explaining a state in which a large-diameter disc is being transported.

FIGS. 15 and 22 show states in which automatic loading of the large-diameter disc D1 by the loading motor 66 is started and in which the large-diameter disc D1 is being transported. When the loading slider 43 is further moved backward from the state shown in FIG. 14, the follower pin 29d of the guide arm 29 is entered from the inclined portion of the loading slider 43 into the guide groove 43c-1. As a consequence, the guide arm 29 is further swung in the centrifugal direction, whereby the supporting member 29a provided at the tip end of the guide arm 29 is placed in the state in which it may not contact with the side portion of the large-diameter disc D1. It should be noted that FIGS. 42A to 42D show operation modes of the guide arm 29 continuously.

Also, when the loading slider 43 is moved in the backward direction, the link lever 24 is pulled to start swinging the loading arm 22 in the centripetal direction. FIGS. 43A to 43D show the swinging states of the loading arm 22 continuously. The state of the loading arm 22 shown in FIG. 14 corresponds to the state in which the loading arm 22 is moved from the initial state shown in FIG. 43A to the state shown in FIG. 43B.

In the link lever 24 which may administer swinging of the loading arm 2, since the follower pin 24a provided at the tip end of the link lever 24 is fitted into the guiding groove 43d of the loading slider 43 and the guide slit 49a of the guide plate 49, when the loading slider 43 is moved in the backward direction, the follower pin 24a is sandwiched between the inclined surface of the rear end of the guiding groove 43d and the side wall of the guide slit 49a. Therefore, as the loading slider 43 is moved in the backward direction, the follower pin 24a also is moved in the backward direction to pull the link lever 24 so that the loading arm 22 may be swung.

When the loading slider 43 is moved backward to the position shown in FIG. 15, concurrently therewith, the upper end horizontal portion 43b-1 of the guide groove 43b elevates the follower pin 45a of the first swing member 45 so that the first swing member 45 may be swung at the rivet pin 44 to rotate the gear disc 59 through the link arm 54. As a result, the disc supporting arm 19 is swung to the centrifugal direction, that is, the holder 21 which supports the rear end side of the large-diameter disc D1 is moved in the backward direction in synchronism with the transporting of the large-diameter disc D1. It should be noted that, at this time point, since the follower pin 47a of the second swing member 47 slides the vertical portion of the guide groove 43b, second swing member 47 is placed in the static state and the follower slider 48 also is placed in the static state.

In the process in which the state is moved from FIGS. 14 to 15, in the guide arm 27 spring-biased under spring force of the tension coil spring 53, the supporting member 28a provided at the tip end of the guide arm 27 is returned in accordance with the transport of the large-diameter disc D1 and it is brought in contact with the locking strip piece 42a of the lever arm 42, thereby being stopped. At that time, since the third swing member 51 is swung slightly, its action pin 51a is moved within the end portion through-hole 48b of the follower slider 48, which is placed in the static state, in the centripetal direction and therefore the link wire 52 is flexed slightly.

On the other hand, the supporting member 25a of the guide arm 25 supports the front side portion of the large-diameter disc D1 and the high position guide piece 65c of the rack slider 65 moved forward by rotation of the above-described gear disc 59. It should be noted that, at that time, since the follower pin 7a of the elevation frame 7 is placed in the state in which it is moved horizontally in the low position portion 43e-1 of the cam groove 43e and the follower slider 48 is placed in the static state, the elevation frame 7 is suddenly stopped at the position shown in FIG. 39A.

Figure 16:
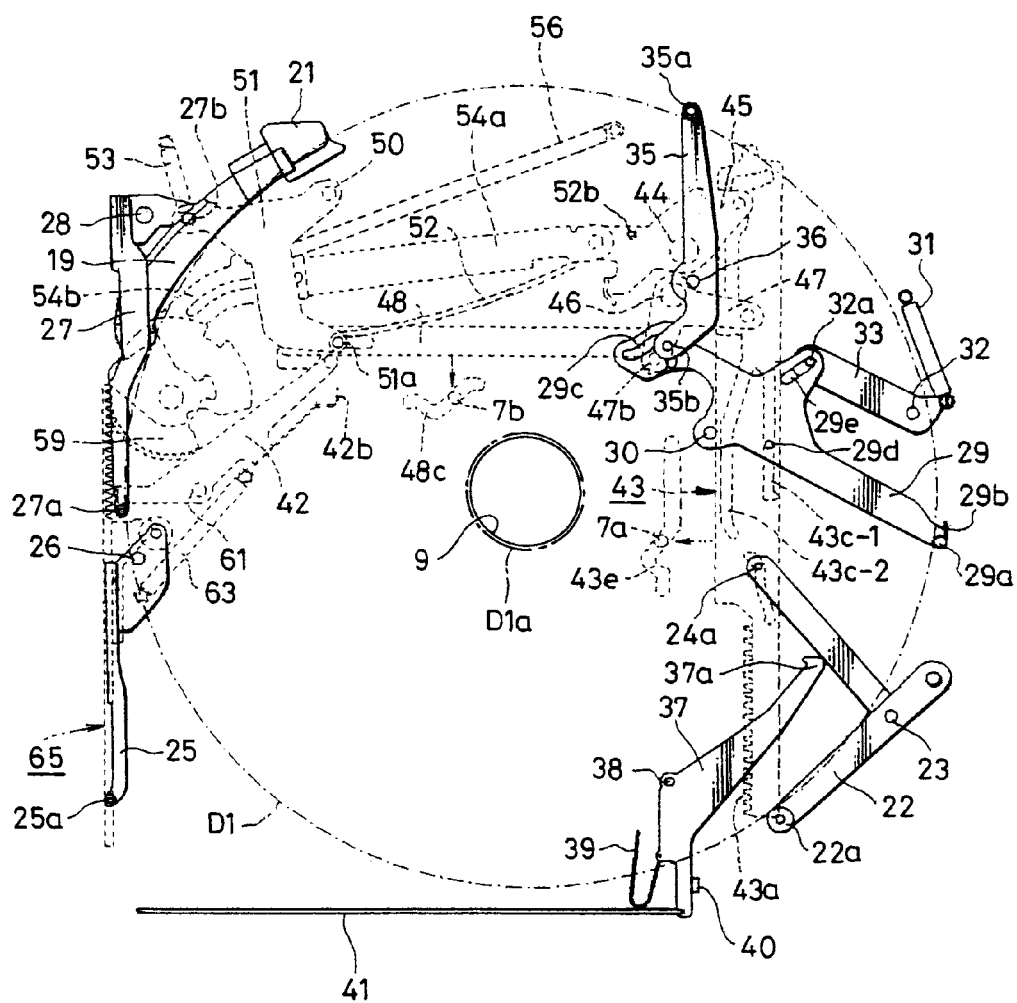
FIG. 16 is a sixth process diagram useful for explaining a state in which a large-diameter disc is being transported.
Figure 23:
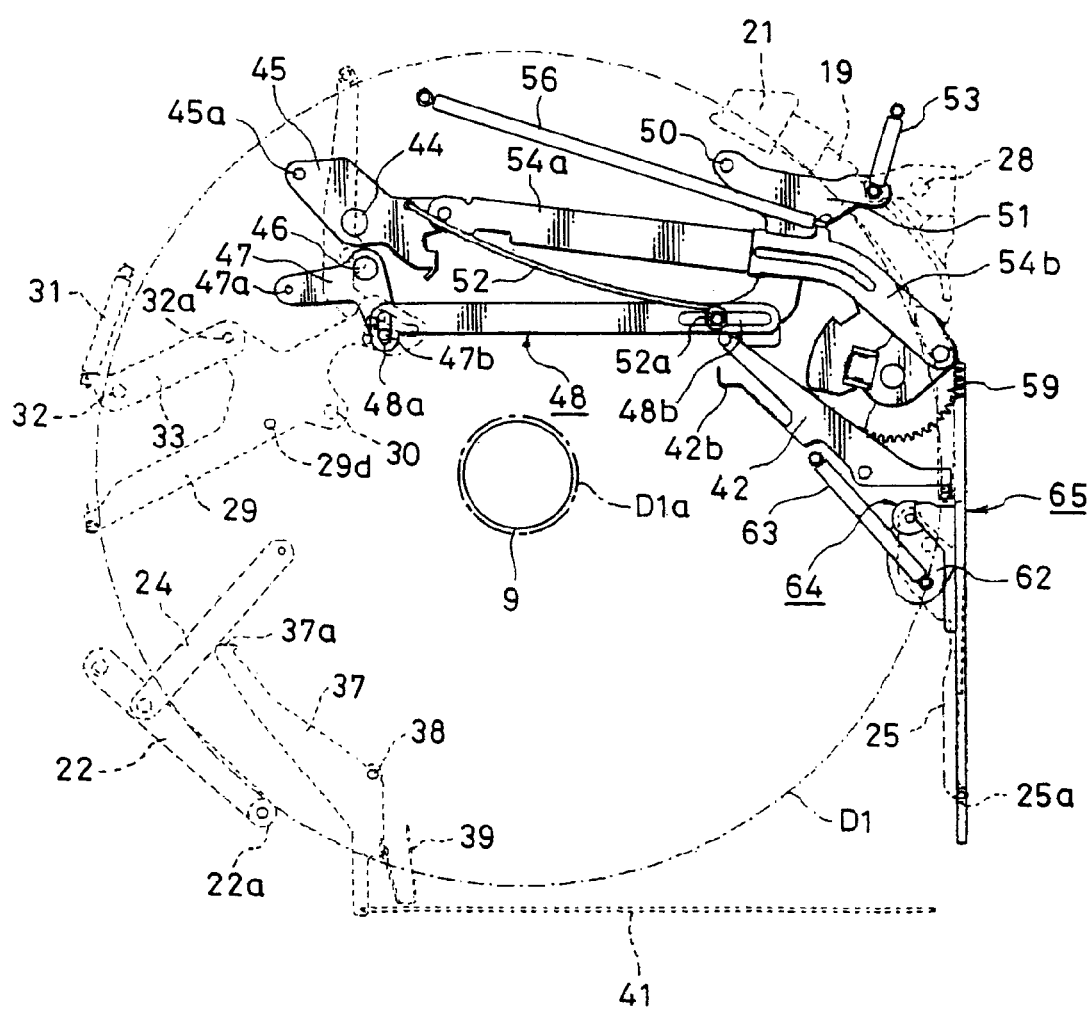
FIG. 23 is a sixth process diagram useful for explaining a state in which a large-diameter disc is being transported.

FIGS. 16 and 23 show states in which the loading slider 43 is further moved backward from the states shown in FIGS. 15 and 22 to pull the link lever 24 so that the loading arm 22 is swung up to the position shown in FIG. 43C, thereby resulting in the central hole D1a of the transported large-diameter disc D1 and the center of the clamping head 9 being made coincident with each other. On the other hand, since the follower pin 29d of the guide arm 29 moved linearly through the guide groove 43c-1 of the loading slider 43, the guide arms 29 and 35 are placed in the static state at the positions shown in FIG. 16. At that time, the supporting members 29a and 35a are brought in contact with the outer peripheral edge of the large-diameter disc D1 and thereby the large-diameter disc D1 is properly positioned so that the central hole D1a of the large-diameter disc D1 and the position of the clamping head 9 can agree with each other accurately.

Since the follower pin 45a of the first swing member 45 is urged against the upper end horizontal portion 43b-1 and moved to the vertical portion 43b-3 as the loading slider 43 is moved backward, this first swing member 45 is swung up to the position shown in FIG. 16 and the disc supporting arm 19 also is swung in the centrifugal direction as the gear disc 59 is rotated by the link arm 54. When the above-described gear disc 59 is rotated, since the rack slider 65 is further moved forward so that the small-diameter portion 64b of the double roller 64 is urged against the high position guide piece 65c, the guide arm 25 is considerably swung in the centrifugal direction and the operation to support the outer peripheral edge of the large-diameter disc D1 by the supporting member 25a is ended. As a consequence, the guide arm 25 is escaped to the lateral side of the elevation frame 7 and it is not extended on the elevation frame 7. Therefore, there is no risk that the ascending elevation frame 7 and the guide arm 25 will contact with each other.

At that time, although the large-diameter disc D1 presses the supporting member 27a of the guide arm 27, this supporting member 27 is brought in contact with the locking strip piece 42a of the lever arm 42 and its stopped position is determined. Therefore, at this time point, the center of the large-diameter disc D1 may coincide with the clamping head 9 in the horizontal direction. On the other hand, the center of the large-diameter disc D1 relative to the clamping head 9 in the vertical direction is determined by the holder 21 of the disc supporting arm 19 and the loading roller 22a of the loading arm 22 which were placed in the state shown in FIG. 16.

As described above, according to the disc apparatus of the present invention, until the state reaches the state shown in FIG. 16 since the automatic loading of the large-diameter disc D1 was started, at least three portions of the outer peripheral edge of this large-diameter disc D1 are supported by a plurality of aforementioned arms and the large-diameter disc D1 is transported into the disc apparatus 1 in which it is placed in the static state at the position in which the central hole D1a of the large-diameter disc 1 can be clamped by the clamping head 9.

Figure 39B:
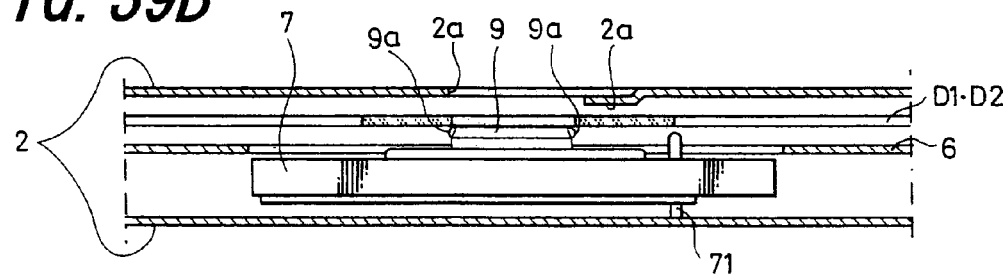

Also, in the process from FIGS. 15 to 16, the cam groove 43e of the loading slider 43 is moved backward, whereby the follower pin 7a of the elevation frame 7 is moved from the low position portion 43e-1 to the inclined portion 43e-2 and is placed in the state in which it will ascend. On the other hand, since the follower pin 47a of the second swing member 47 reaches from the vertical portion 43b-3 of the loading slider 43 to the lower end horizontal portion 43b-2 and this second swing member 47 is swung in the centrifugal direction, the can groove 48c is moved in the horizontal direction as the follower slider 48 is moved in the horizontal direction by the action pin 47b. As a result, the follower pin 7b of the elevation frame 7 is moved from the low position portion 48c-1 to the inclined portion 48c-2 and is placed in the state in which it will ascend and the elevation frame 7 starts ascending as shown in FIG. 39B.

Figure 17:
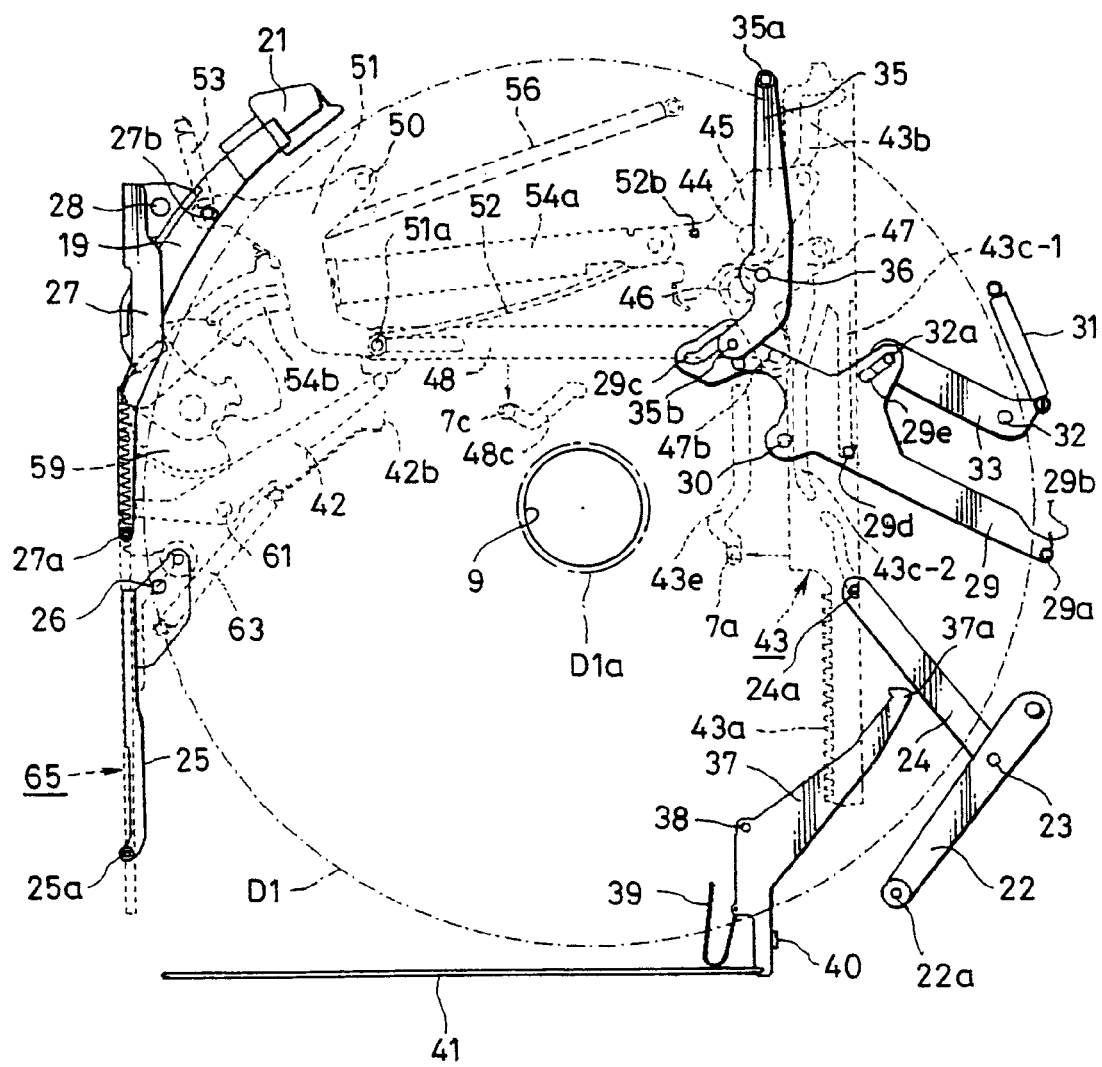
FIG. 17 is a seventh process diagram useful for explaining a state in which a large-diameter disc is being transported.
Figure 24:
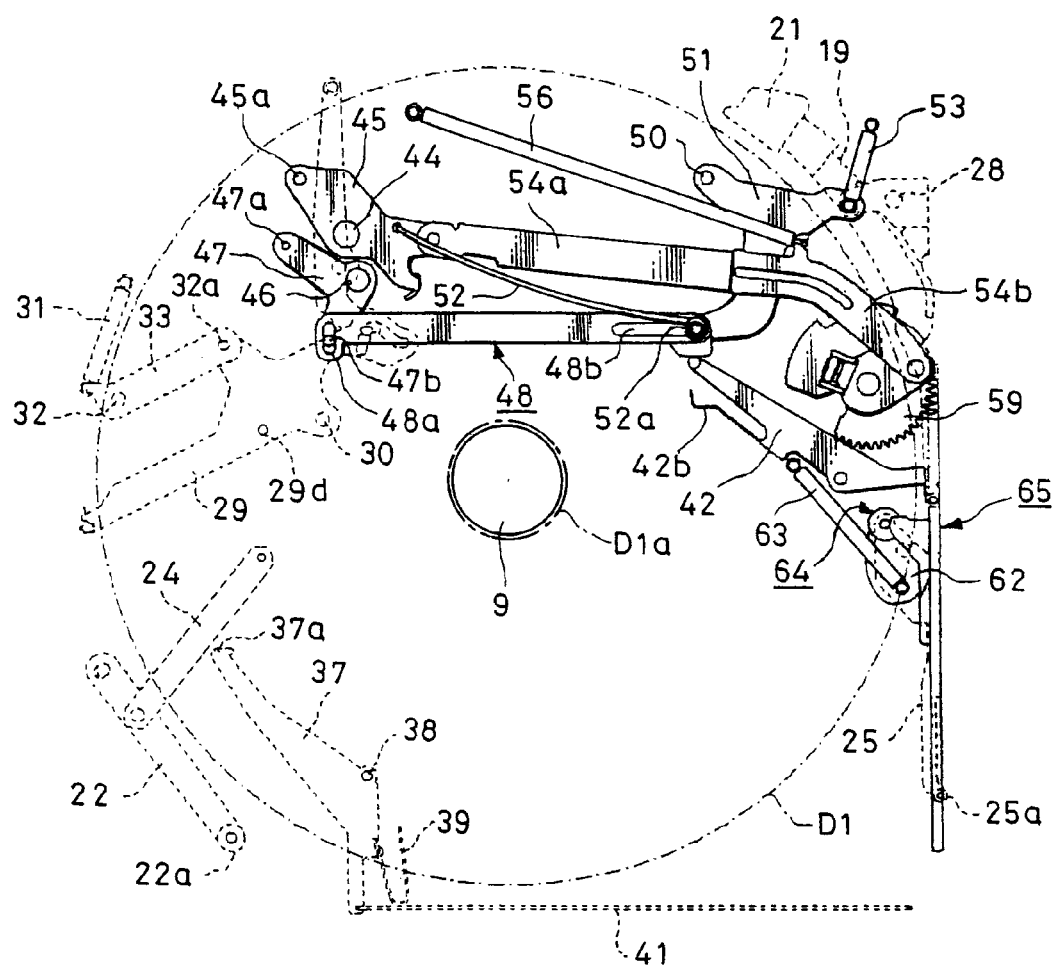
FIG. 24 is a seventh process diagram useful for explaining a state in which a large-diameter disc is being transported.

FIGS. 17 and 24 show states in which the clamping head 9 clamps the central hole D1a of the large-diameter disc D1 so that it becomes possible to drive the large-diameter disc D1. To reach this state, the disc supporting arm 19, the loading arm 22 and the guide arm 27 which support the large-diameter disc D1 should be swung slightly in the centrifugal direction and end supporting the large-diameter disc D1 so as not to disturb rotation of the large-diameter disc D1.

More specifically, at the position in which the loading slider 43 is further moved backward and stopped from the state shown in FIG. 16, since the follower pin 24a of the link lever 24 is fitted into the lateral groove of the rear end of the guide slit 49a at an eccentricity portion of the rear portion of the guiding groove 43d in the vertical direction, as shown in FIG. 43D, the link lever 24 is slightly returned to the direction opposite to the pulled direction and the loading arm 22 is slightly swung in the centrifugal direction. Then, the operation to support the outer peripheral edge of the large-diameter disc D1 by this loading roller 22a is ended.

Also, at the same time, the follower pin 45a of the first swing member 45 is slightly swung by the inclined portion formed in the middle position of the vertical portion 43b-3 of the guide groove 43b so that this swinging is transmitted through the link arm 54 to the gear disc 59. As a result, the disc supporting arm 19 is slightly swung in the centrifugal direction and the operation to support the outer peripheral edge of the large-diameter disc D1 by this disc supporting arm 19 is ended.

On the other hand, the lower end horizontal portion 43b-2 of the guide groove 43b of the loading slider 43 considerably elevates the follower pin 47a of the second swing member 47. Consequently, the action pin 48b is swung in the centrifugal direction to horizontally move the follower slider 48 so that the end through-hole 48b pulls the action pin 51a of the third swing member 51. Thus, this third swing member 51 is slightly swung and at the same time, the action piece 48d elevates the roller 42c of the lever arm 42. As a result, the locking strip piece 42a of the lever arm 42 with which the supporting member 27a of the guide arm 27 contacts is moved in the backward direction so that the guide arm 27 is slightly swung in the centrifugal direction. Then, the operation to support the outer peripheral edge of the large-diameter disc D1 by this guide arm 27 is ended.

At that time, the end portion of the guide groove 43c-1 of the loading slider 43 presses the follower pin 29d of the guide arm 29 to slightly swing the guide arm 29. As a result, the supporting member 29a of the guide arm 29 is swung in the centrifugal direction and the operation to properly position the outer peripheral edge of the large-diameter disc D1 is ended. Also, since the guide arm 35 joined to the guide groove 29c of the guide arm 29 by the follower pin 35b is swung slightly, the supporting member 35a also is swung in the centrifugal direction and the operation to properly position the outer peripheral edge of the large-diameter disc D1 is ended.

It should be noted that, in the process in which the operation mode moved from FIGS. 16 to 17, although the follower slider 48 is moved horizontally in synchronism with the backward movement of the loading slider 43, the follower pin 7a of the elevation frame 7 is moved from the inclined portion 43e-2 of the cam groove 43e of the loading slider 43 to the high position portion 43e-3 and the follower pin 7b is moved from the inclined portion 48c-2 of the follower slider 48 to the high position portion 48c-3.

Figure 39C:
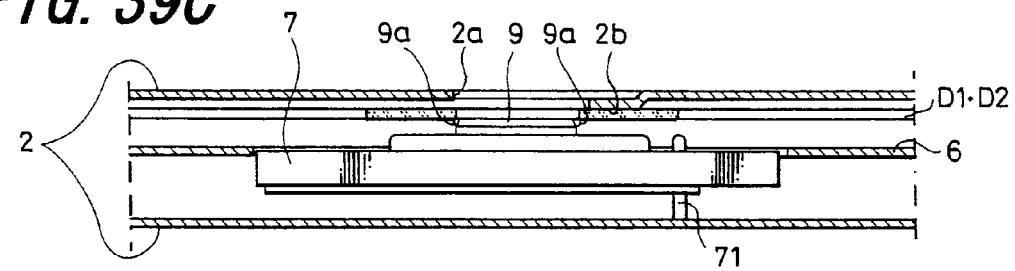

In the behavior of the elevation frame 7 in this process, the elevation frame 7 is ascended by the follower pins 7a and 7b which are elevated by the inclined portions 48e-2 and 48c-2 and as shown in FIG. 39C, the chuck claw 9a of the clamping head 9 contacts with the central hole D1a of the large-diameter disc D1 to elevate this large-diameter disc D1, thereby resulting in the peripheral edge of the central hole D1a being brought in contact with the protruded portion 2b of the chassis case 2.

Figure 39D:
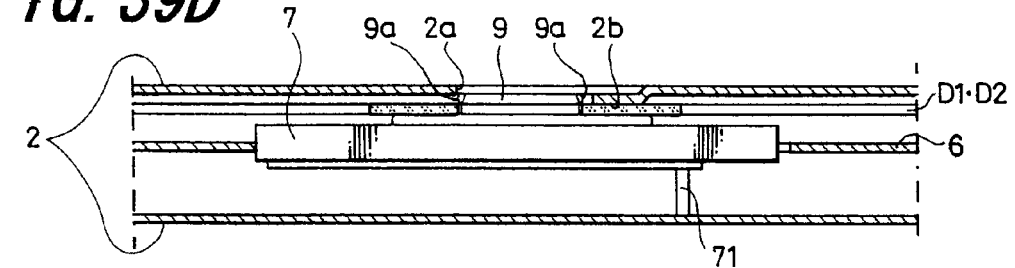
Figure 39E:
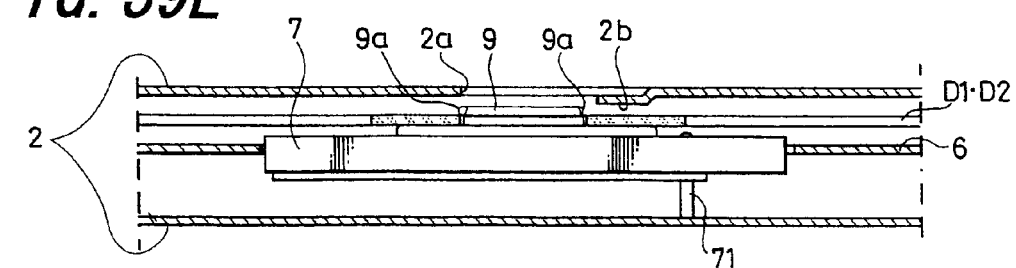

When the follower pins 7a and 7b reach the tops of the inclined portions 43e-2 and 48c-2 from the above-described state, as shown in FIG. 39D, the clamping head 9 is fitted into the central hole D1a of the large-diameter disc D1 and clamping of the large-diameter disc D1 by the chucking claw 9a is completed, whereby the large-diameter disc D1 is fixed to the turntable 10. Then, the follower pins 7a and 7b are moved to the high position portions 43e-3 and 48-3 and the elevation frame 7 is lowered to the position shown in FIG. 39E, thereby making it possible to drive the large-diameter disc D1.

While the modes in which the respective mechanisms are operated when the large-diameter disc D1 is transported by the disc apparatus 1 according to the present invention have been described so far, when the large-diameter disc D1 is transported from the disc apparatus 1, the respective mechanisms are operated in the opposite orders as the loading slider 43 is moved forward. Specifically, when the transport of the large-diameter disc D1 is started and the loading slider 43 starts advancing, the elevation frame 7 is temporarily ascended and then descended to the initial position as shown in FIGS. 40A to 40E. During this period, the large-diameter disc D1 is pushed by the clamp releasing pin 71 and the large-diameter disc D1 is released from being clamped by the clamping head 9.

In the process executed until clamping of the large-diameter disc D1 is released as described above, the disc supporting arm 19, the loading arm 22 and the guide arm 27 start moving in the centripetal direction and the operation mode becomes the state in which the outer peripheral edge of the large-diameter disc D1 is supported as shown in FIG. 16. After that, the large-diameter disc D1 is unloaded from the disc apparatus 1 by force to swing the disc supporting arm 19 in the centripetal direction, its front end portion is exposed to the outside from the slot of the front bezel 3 and then the disc apparatus 1 is stopped.

It should be noted that operation modes in which the follower pins 24a, 29d, 45a and 47a are operated as the loading slider 43 is moved backward will be described with reference to FIGS. 44A to 44F.

Next, operation modes in which the small-diameter disc D2 is transported by the disc apparatus according to the present invention will be described with reference to plan views of FIGS. 25 to 31 and corresponding bottom views of FIGS. 32 to 38. It should be noted that, while the cam grooves 43e, 48c and the follower pins 7a, 7b are inherently not shown in FIGS. 25 to 31, they are shown in FIGS. 25 to 31 in order to facilitate understanding of the present invention.

Figure 25:
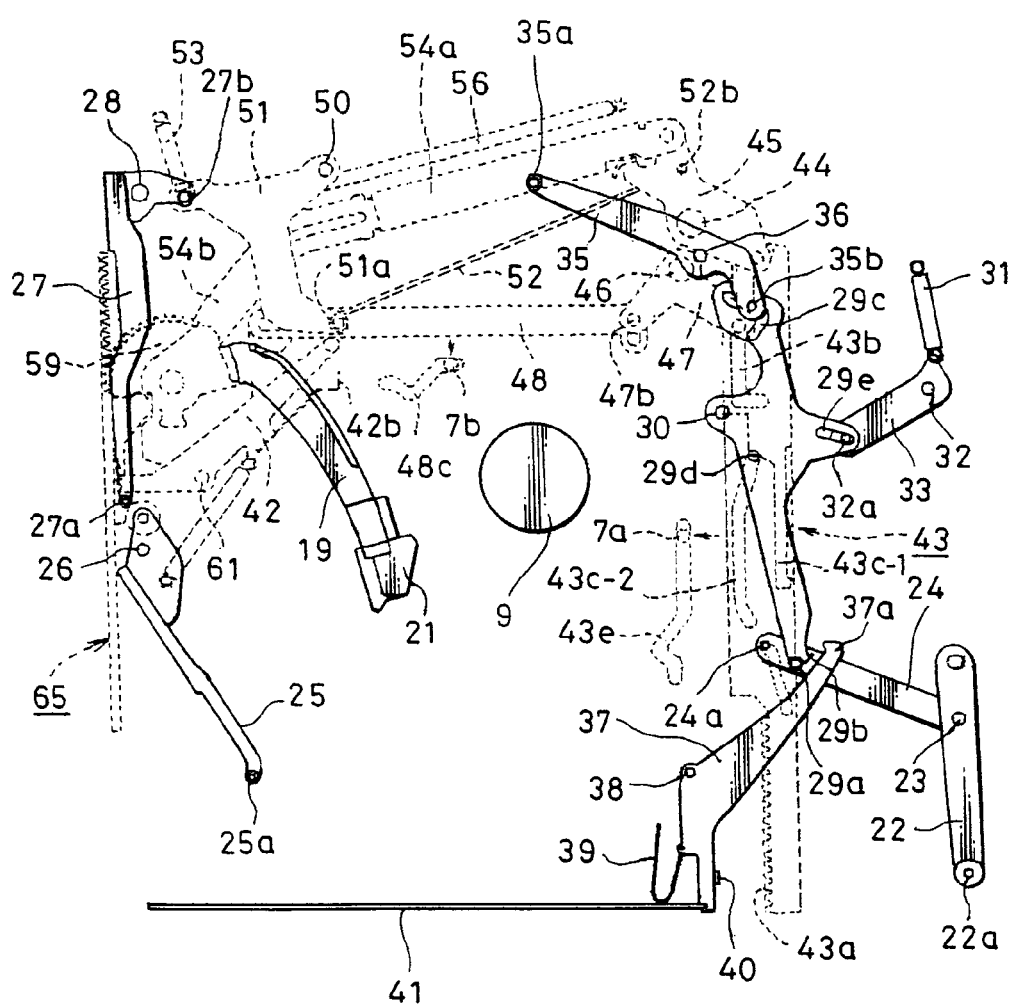
FIG. 25 is a first process diagram useful for explaining a state in which a small-diameter disc is being transported.
Figure 32:
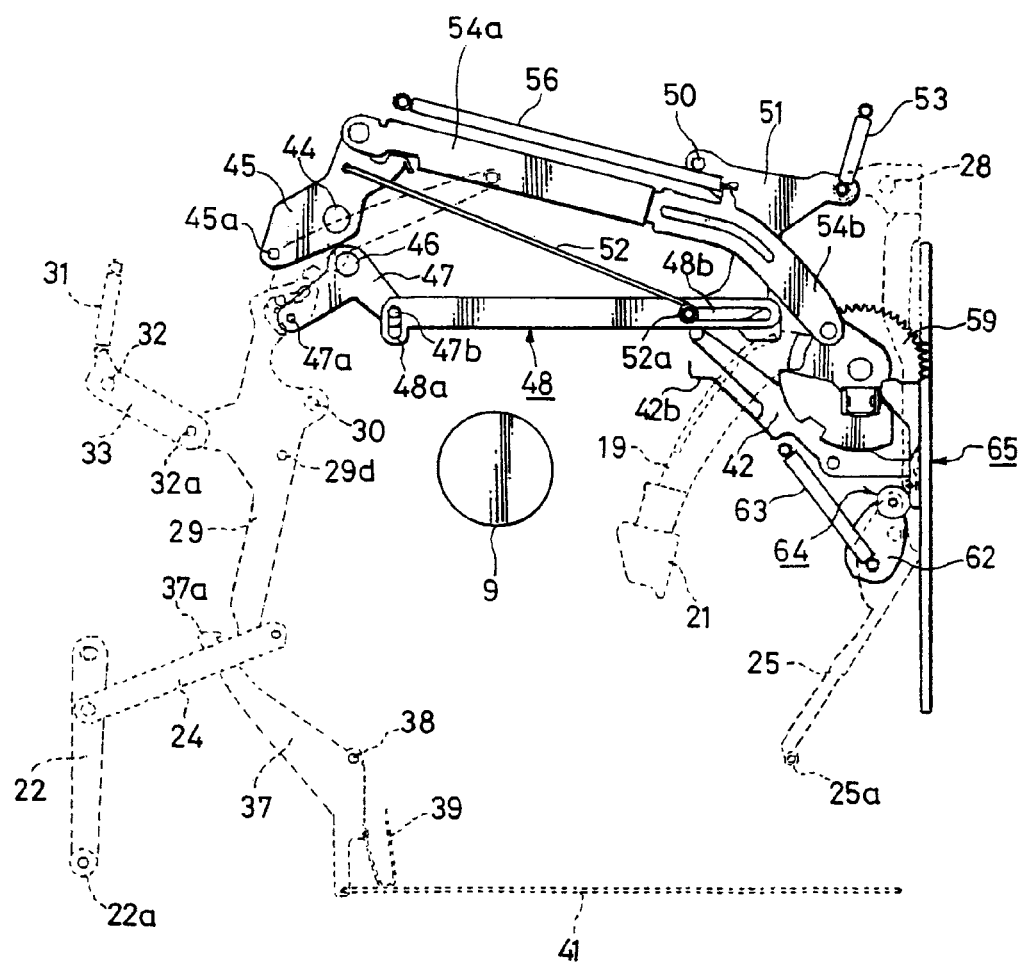
FIG. 32 is a first process diagram useful for explaining a state in which a small-diameter disc is being transported.

FIGS. 25 and 32 are diagrams showing states in which the disc apparatus 1 is placed in the standby state to await insertion of the small-diameter disc D2 from the slot 3a of the front bezel 3 and in which respective arms are placed in the static state in the initial state. At that time, in the guide arm 25, the large-diameter portion 64a of the double roller 64 of the roller supporting plate 62 fixed to the above-described pivot pin 26 at the back surface of the base panel 6 is brought in contact with the low position guide piece 65b of the rack slider 65 as shown in FIGS. 8 and 32 and the guide arm 25 is stopped at the position swung by a predetermined amount in the centrifugal direction from the position at which it is swung most in the centripetal direction.

Figure 30:
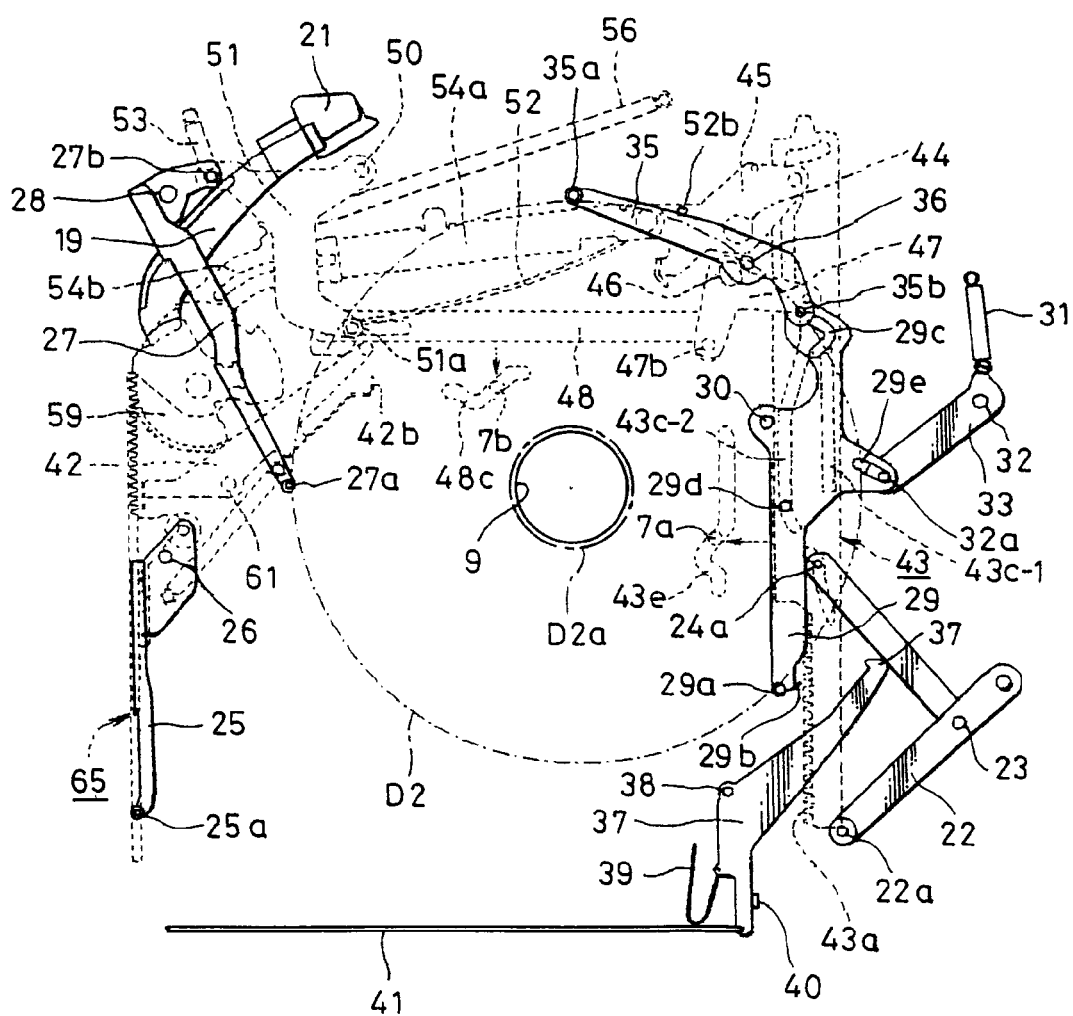
FIG. 30 is a sixth process diagram useful for explaining a state in which a small-diameter disc is being transported.

If the disc apparatus 1 is configured such that the guide arm 25 is stopped at the position in which it is swung most in the centripetal direction to await insertion of the disc, when the small-diameter disc d2 is displaced to the left-hand side of the disc apparatus 1 and inserted into the disc apparatus 1, the small-diameter disc D2 is inserted into the left-hand side of the supporting member 25 so that it becomes impossible to transport the small-diameter disc D2. In order to avoid this risk, the guide arm 25 is stopped at the position in which it is swung by a predetermined amount in the centrifugal direction from the position at which it is swung most in the centripetal direction and the disc apparatus 1 awaits insertion of the disc. It should be noted that the states in which the disc apparatus 1 awaits the small-diameter disc D1 as shown in FIGS. 25 and 30 may agree with the states in which the disc apparatus 1 awaits insertion of the large-diameter disc D1 as shown in FIGS. 11 and 18.

Next, since the guide arm 27 is spring-biased at its base end portion under spring force of the tension coil spring 53, although the supporting member 27a provided at the tip end of the guide arm 27 is constantly spring-biased so as to swing in the centripetal direction, the third swing member 51 joined to the pivot pin 27b is placed in the static state at a predetermined position and this guide arm 27 is placed in the static state in the state shown in FIG. 25. The reason for this is that the lead wire 52 attached between the first swing member 45 in the static state and the action pin 51a of the third swing member can function as the stopper to thereby prevent the third swing member 51 from being swung.

Similarly, the disc supporting arm 19, the guide arm 29, the guide arm 35 and the loading arm 22 also are placed in the static state in the state shown in FIG. 25. Also, the follower pin 7a of the elevation frame 7 guided by the cam grove 43e of the loading slider 43 is placed at the low position portion 43e-1 of this cam groove 43e. On the other hand, since the follower pin 7b of the elevation frame 7 guided by the cam groove 48c of the follower slider 48 is placed at the low position portion 48c-1, the elevation frame 7 is placed in the state in which it is lowered most as shown in FIG. 39A.

Figure 26:
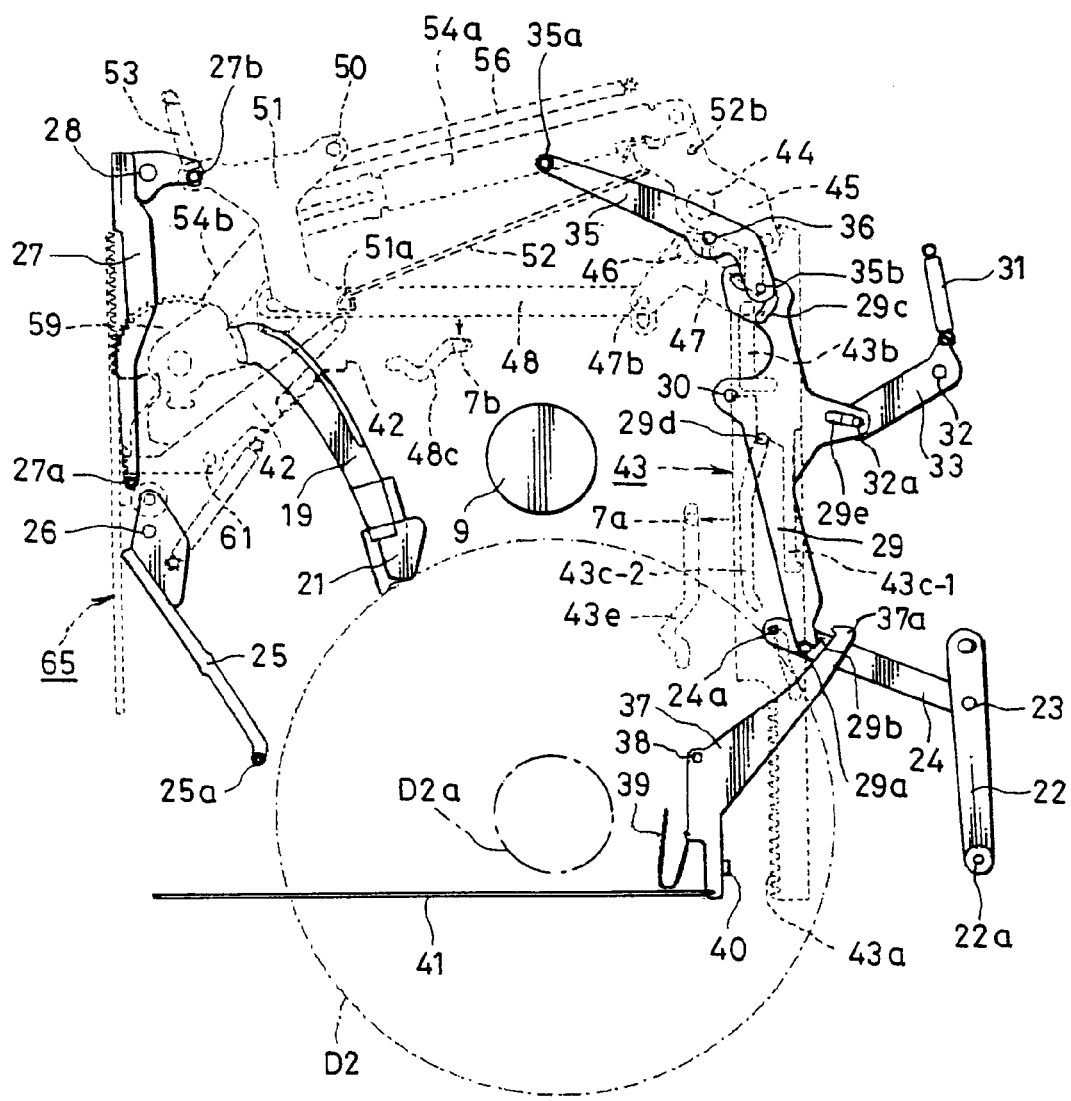
FIG. 26 is a second process diagram useful for explaining a state in which a small-diameter disc is being transported.
Figure 33:
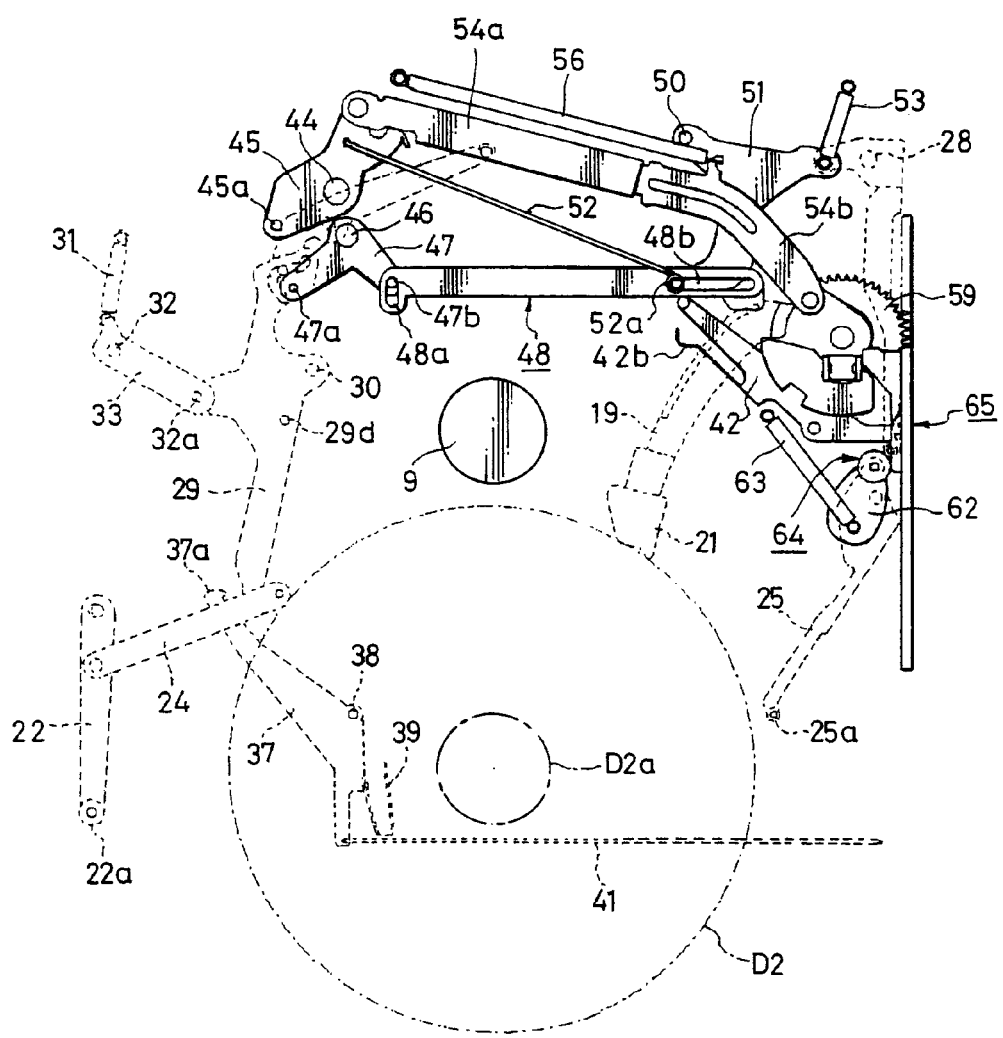
FIG. 33 is a second process diagram useful for explaining a state in which a small-diameter disc is being transported.

FIGS. 26 and 33 show states in which the small-diameter disc D2 is inserted into the disc apparatus 1 from the slot 3a of the front bezel 3 by the operator and in which the rear end side of the small-diameter disc D2 is brought in contact with the holder 21 of the disc supporting arm 19. When this small-diameter disc D2 is inserted into the slot 3a, if the small-diameter disc D2 is displaced to the left-hand side in FIG. 26, then the left side portion of the rear end of the small-diameter disc D2 is brought in contact with the supporting member 25 of the guide arm 25 and pushed back, it is possible to prevent the small-diameter disc D2 from being dropped out of the transport path.

Figures 45A, 45B:
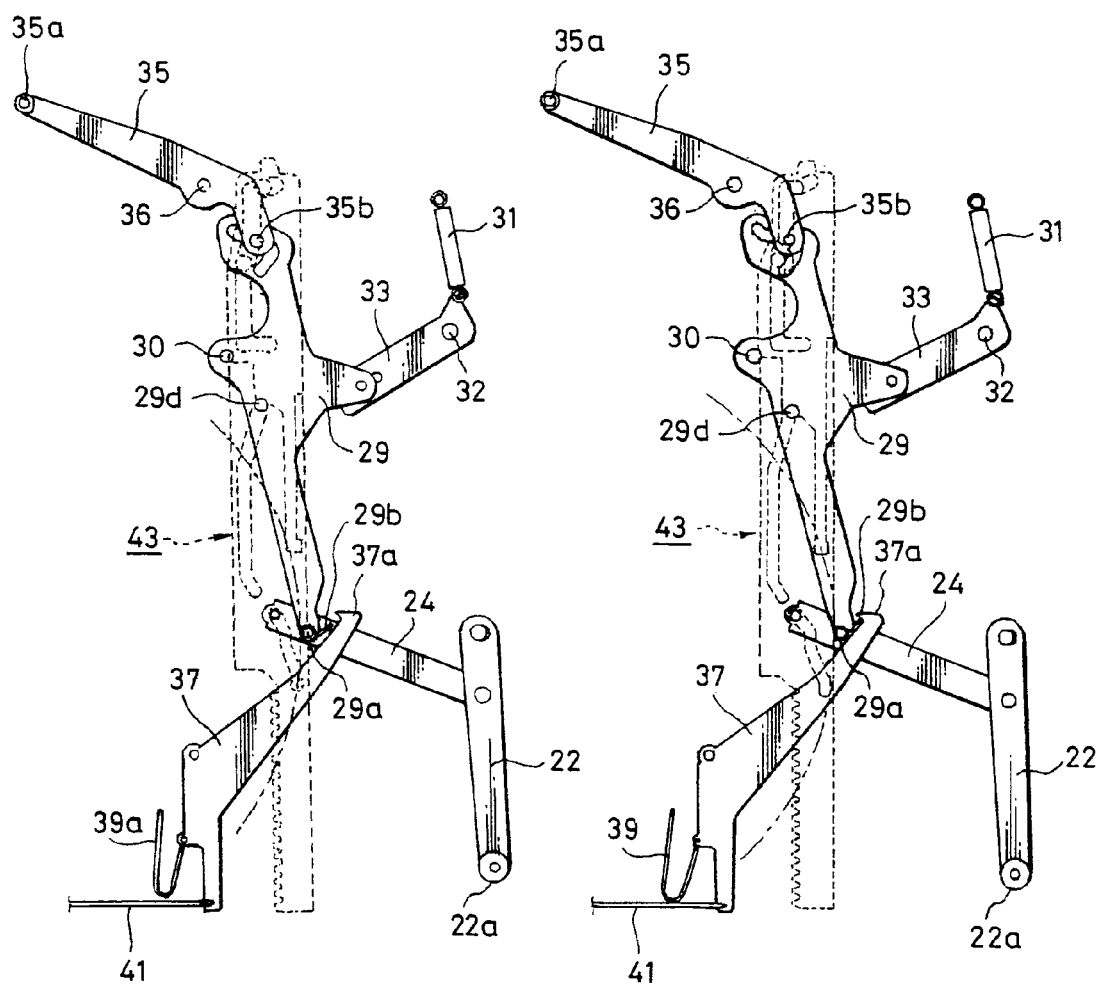
FIGS. 45A and 45B are process diagrams showing a state in which a lock lever functions.

Also, when the small-diameter disc D2 is inserted into the disc apparatus 1 from the slot 3a of the front bezel 3, if the supporting member 29a of the guide arm 29 is pressed and swung in the centrifugal direction as shown in FIG. 45A, the strip piece 29 is engaged with the angle 37a of the lock lever 37 that is placed in the static state at a predetermined position without being swung as shown in FIG. 45B so that, also in this case, it is possible to prevent the small-diameter disc D2 from being dropped out of the transport path. Specifically, the small-diameter disc D2 is guided by the supporting member 25a of the guide arm 25 and the supporting member 29a of the guide arm 29 and thereby guided to the center of the disc apparatus 1.

Figure 27:
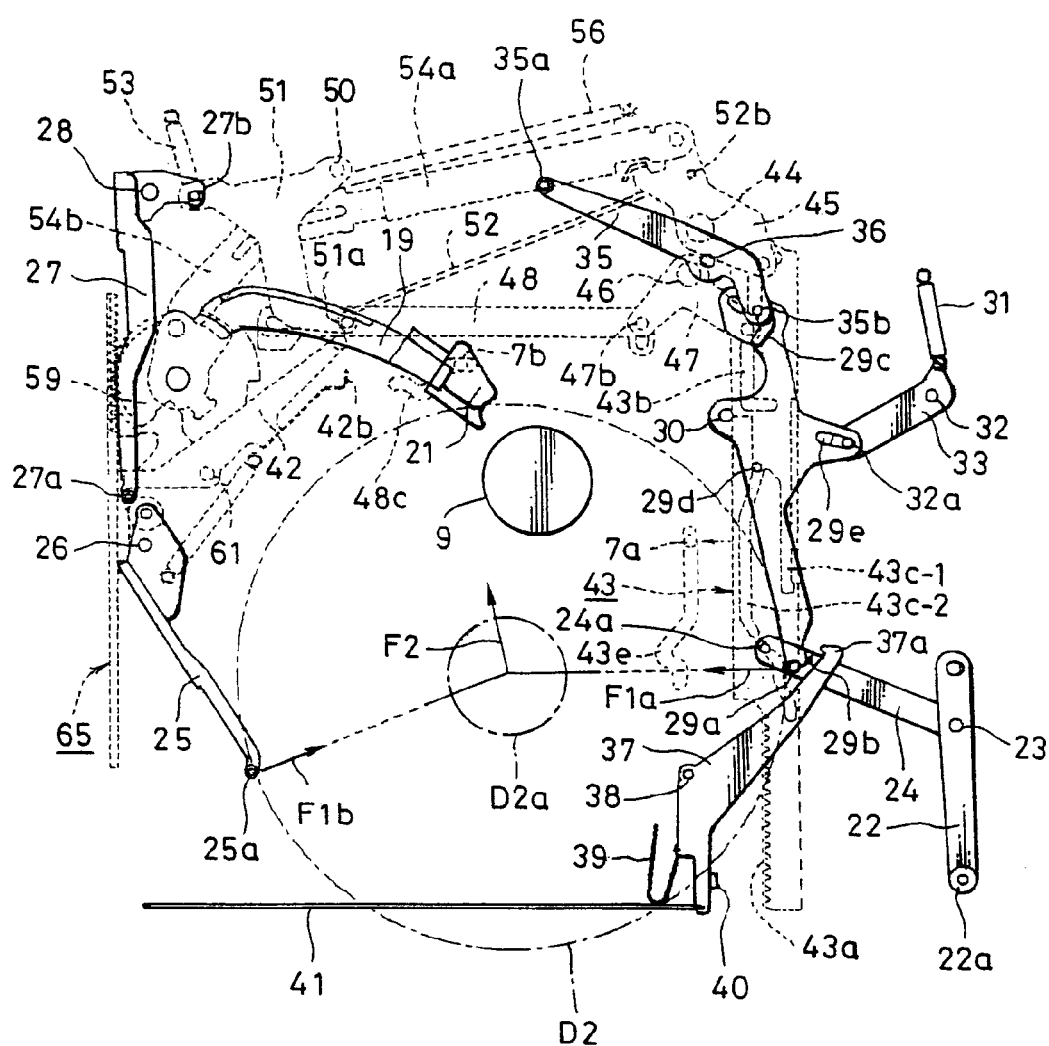
FIG. 27 is a third process diagram useful for explaining a state in which a small-diameter disc is being transported.
Figure 34:
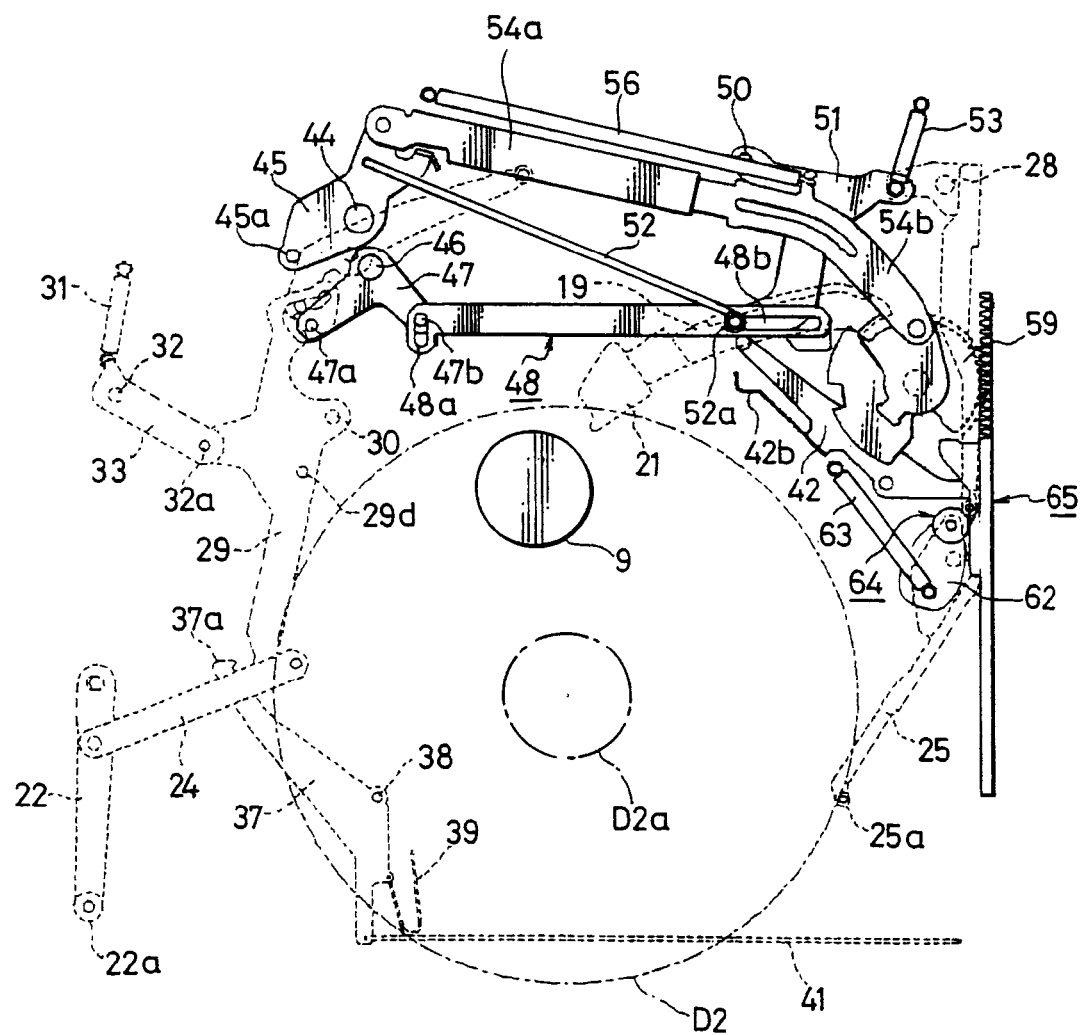
FIG. 34 is a third process diagram useful for explaining a state in which a small-diameter disc is being transported.

FIGS. 27 and 34 show states in which the small-diameter disc D2 is further inserted by the operator from the above-described state. The disc supporting arm 19 is pressed by the small-diameter disc D2 and swung to the centrifugal direction. At the same time, the supporting member 25a of the guide arm 25 and the supporting member 29a of the guide arm 29, both of which are driven in unison with swinging of this disc supporting arm 19, are brought in contact with the side portion of the small-diameter disc D2. As a result, the small-diameter disc D2 is supported by three points of the above-described supporting members 25a, 29a and the holder 21 of the disc supporting arm 19.

Also, the base portion of the disc supporting arm 19 is rotated at the rivet pin 20 from the position shown in FIG. 41A to the position shown in FIG. 41B and the limit switch 60 is energized by the switch actuating stepped portion 59e of the gear disc 59. Based on a signal from the limit switch 60 energized by the above-described switch actuating stepped portion 59e, a current of low potential voltage is supplied to the loading motor 66. At that time, since a component of a force F1a generated by pressing the supporting member 29a of the guide arm 29 and a component of a force F1b generated by pressing of the action of the tension coil spring 63 of the supporting member 25a of the guide arm 25 are caused to act considerably, the resultant force F2 to drive the small-diameter disc D2 in the transport direction is generated and automatic loading of the small diameter disc D2 by the loading motor 66 is started.

Figure 28:
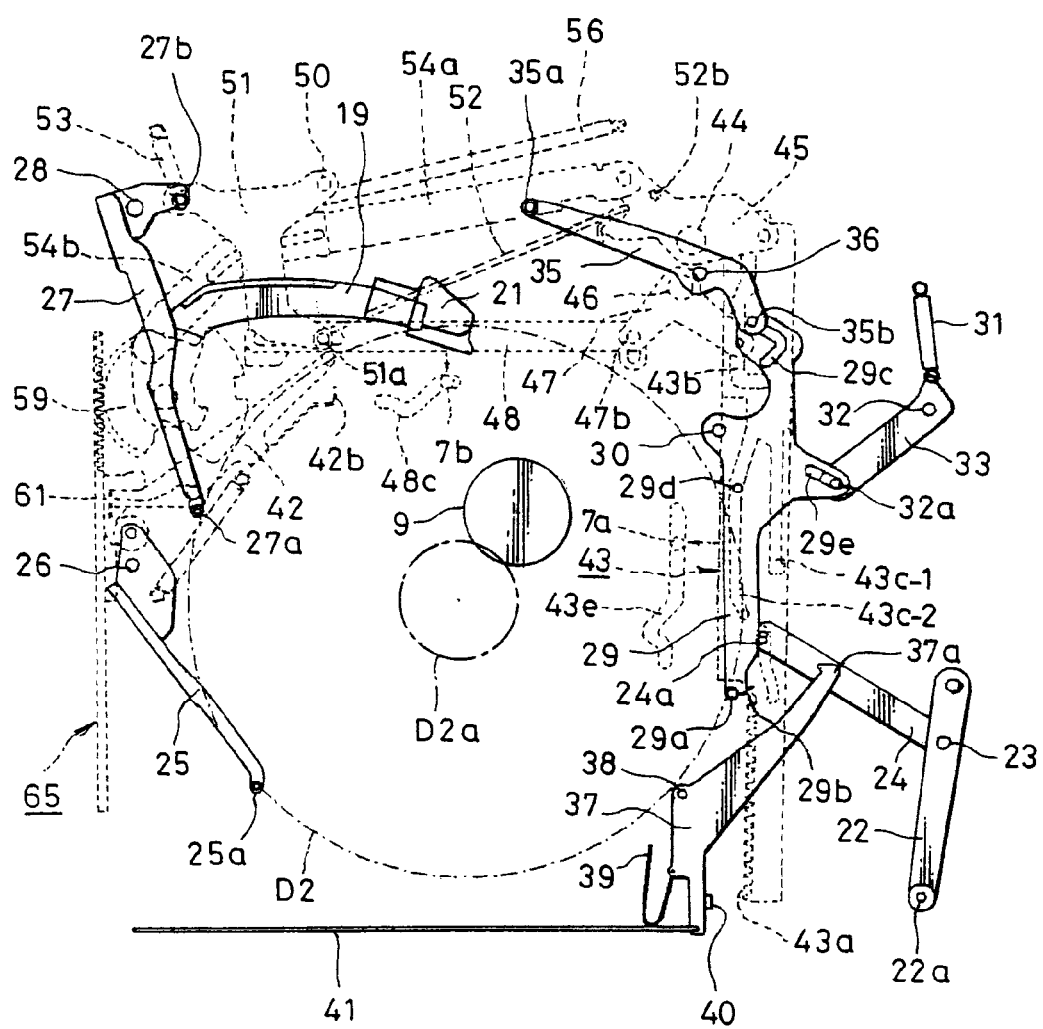
FIG. 28 is a fourth process diagram useful for explaining a state in which a small-diameter disc is being transported.
Figure 35:
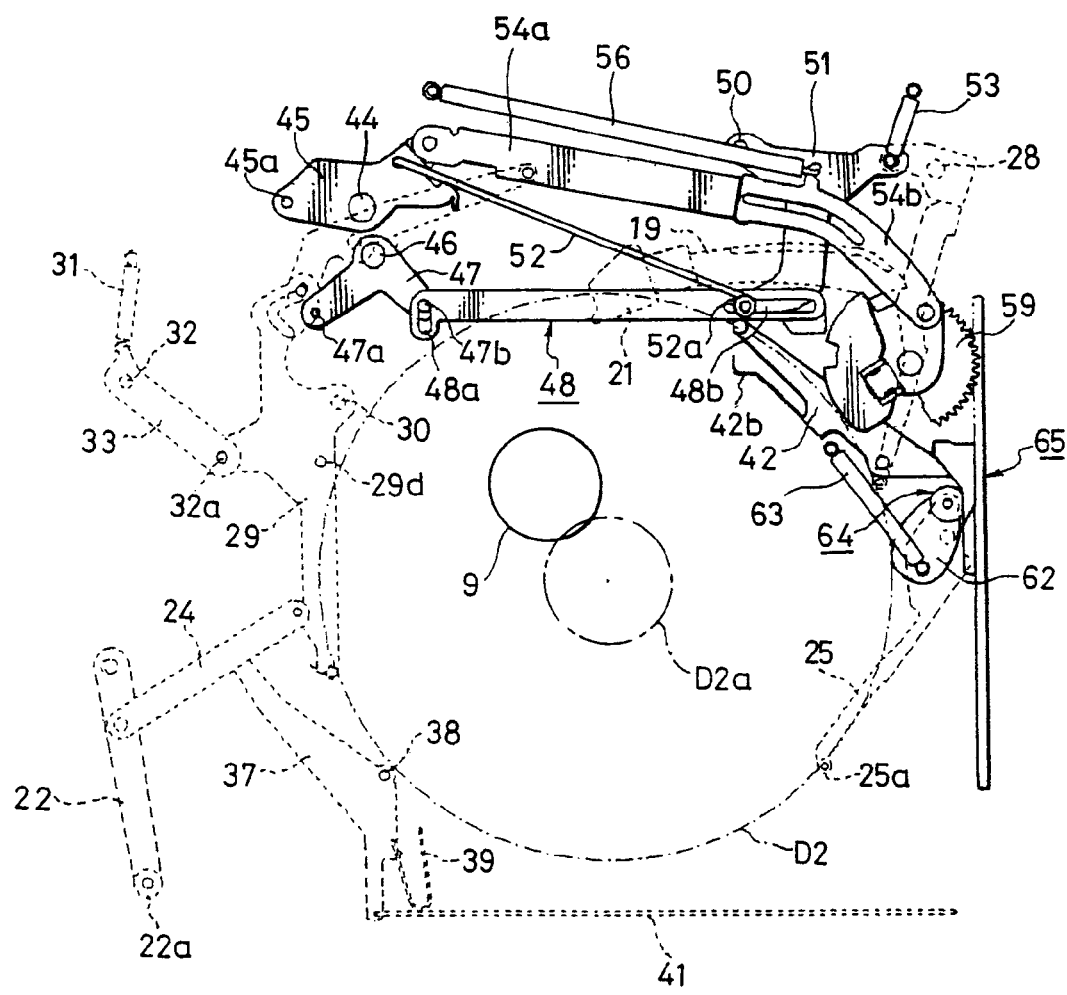
FIG. 35 is a fourth process diagram useful for explaining a state in which a small-diameter disc is being transported.

FIGS. 28 and 35 shows states in which the automatic loading of the small-diameter disc D2 by the loading motor 66 is started and in which the small-diameter disc D2 is being transported. When the loading slider 43 is further moved in the backward direction from the state shown in FIG. 27, the follower pin 29d of the guide arm 29 is entered into the guide groove 43c-2 of the loading slider 43. At that time, the follower pin 29d is guided by the inclined portion of the guide groove 43c-2, it is moved by only the inclined distance and the supporting member 29a is swung up to the position shown in FIG. 35 while the small-diameter disc D2 is being transported. At that time, the guide arm 25 also is swung up to the position shown in FIG. 35 owing to action of the tension coil spring 63 while the guide arm 25 is transporting the small-diameter disc d2.

When the loading slider 43 is moved backward up to the position shown in FIG. 28, concurrently therewith, the upper end horizontal portion 43b-1 of the guide groove 43b elevates the follower pin 45a of the first swing member 45 and the first swing member 45 is swung at the rivet pin 44 so that the gear disc 59 is rotated through the link arm 54. As a result, the disc supporting arm 19 is swung in the centrifugal direction, that is, the holder 21 that supports the rear end side of the small-diameter disc D2 is moved backward in synchronism with the loading of the small-diameter disc D2. It should be noted that, since the follower pin 47a of the second swing member 47 slides the vertical portion of the guide groove 73 at this time point, the second swing member 47 is placed in the static state, the follower slider 48 also being placed in the static state.

Accordingly, since the third swing member 51 is swung owing to the action of the tension coil spring 53 as the first swing member 45 swings, the guide arm 27 is swung at the rivet pin 28 and its supporting member 27a is brought in contact with the small-diameter disc D2. It should be noted that, since the follower pin 7a of the elevation frame 7 is to be moved horizontally in the low position portion 43e-1 of the cam groove 43e and the follower slider 48 is placed in the static state, the elevation frame 8 is suddenly stopped at the position shown in FIG. 39A.

Figure 29:
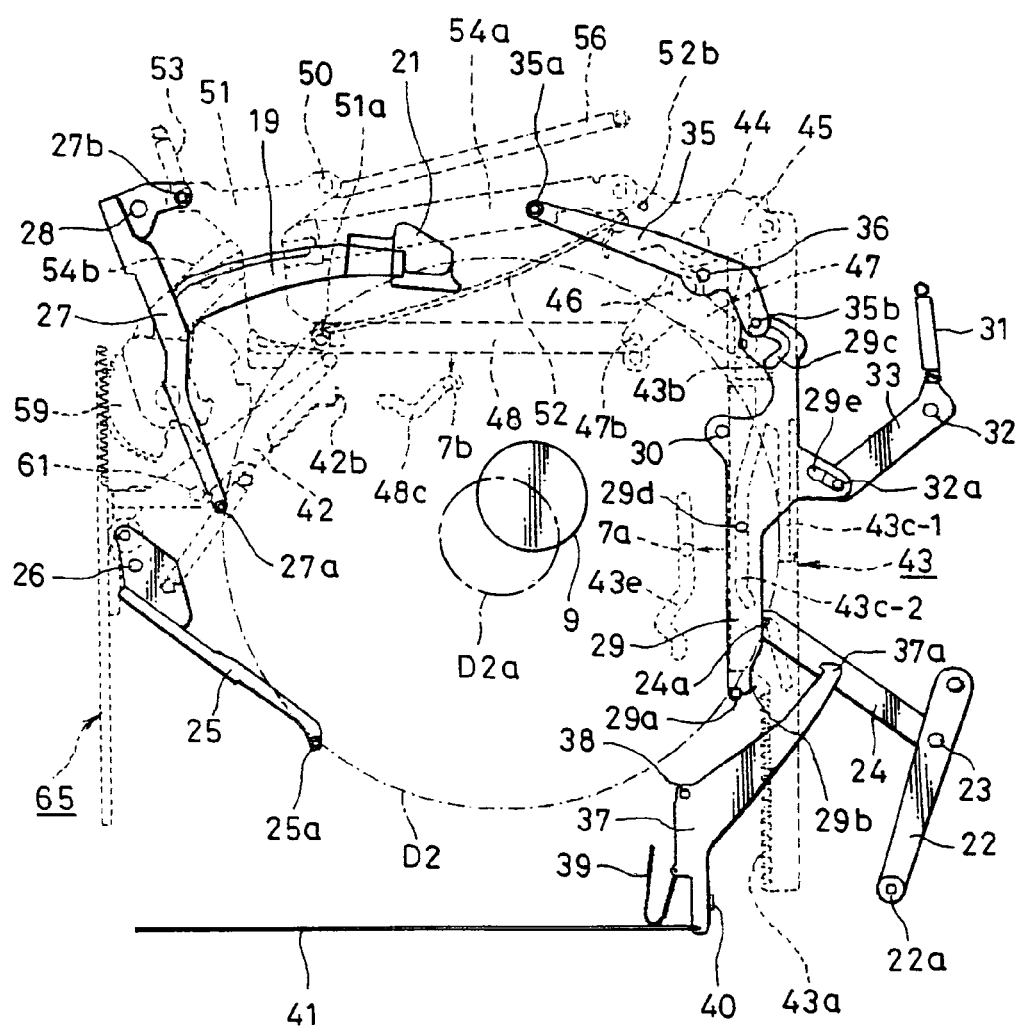
FIG. 29 is a fifth process diagram useful for explaining a state in which a small-diameter disc is being transported.
Figure 36:
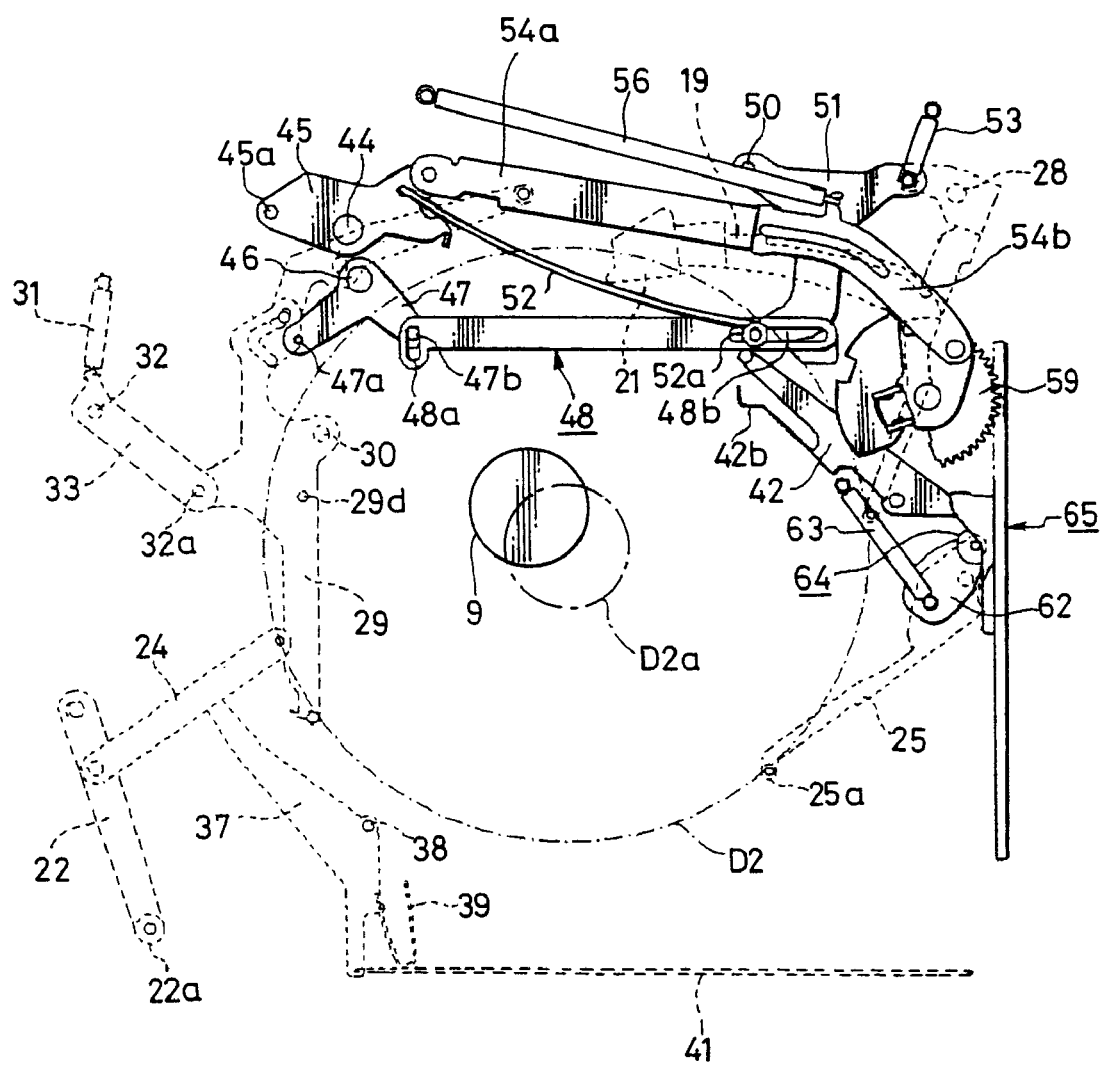
FIG. 36 is a fifth process diagram useful for explaining a state in which a small-diameter disc is being transported.

FIGS. 29 and 36 show states in which the loading slider 43 is further moved in the backward direction from the states shown in FIGS. 28 and 35 and in which the loading of the small-diameter disc D2 is being continued. Although the guide arm 29 is stopped swinging, the disc supporting arm 19 is swung in the centrifugal direction and the guide arms 25 and 27 are swung in the centripetal direction in response to the movement amount of the loading slider 43, thereby supporting the small-diameter disc D2.

Figure 37:
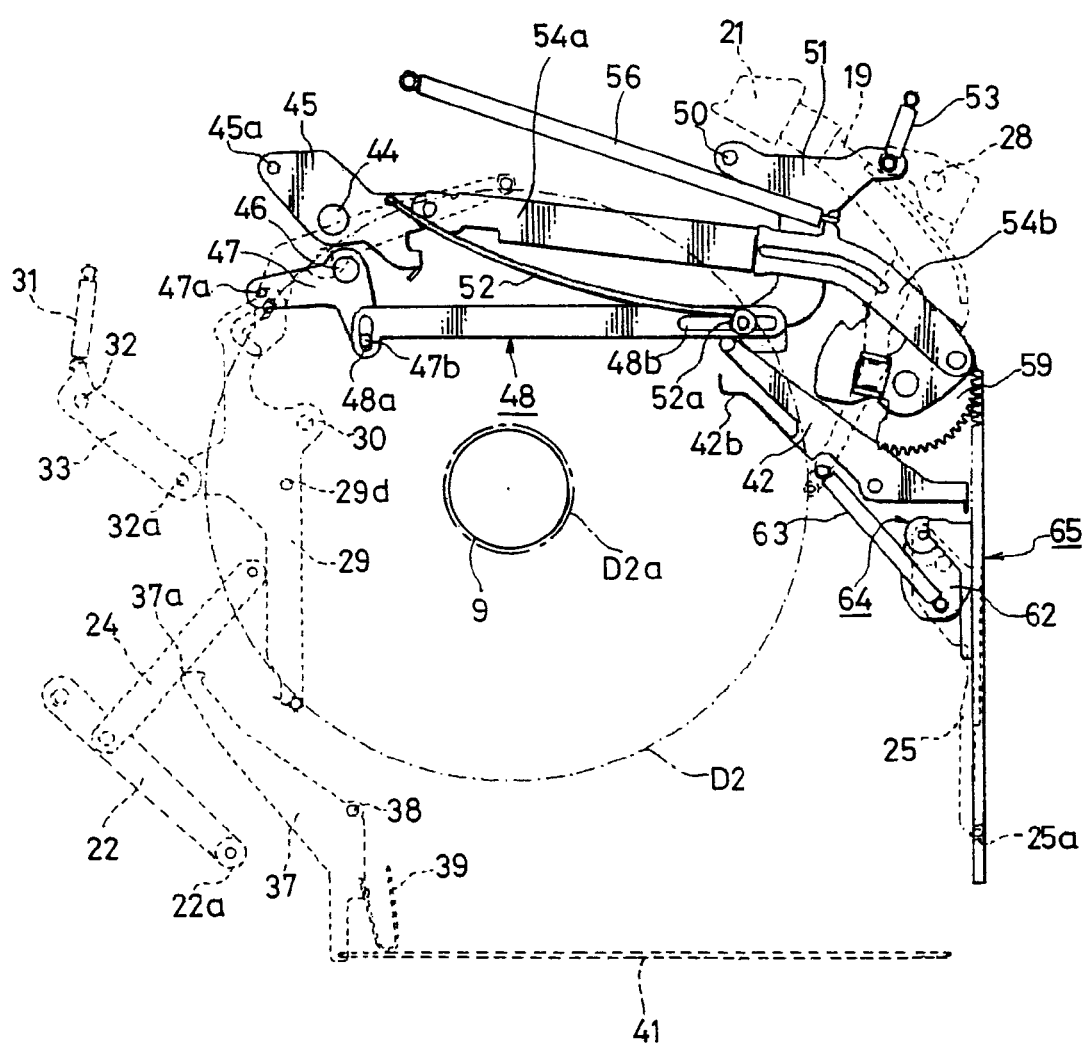
FIG. 37 is a sixth process diagram useful for explaining a state in which a small-diameter disc is being transported.
Figure 38:
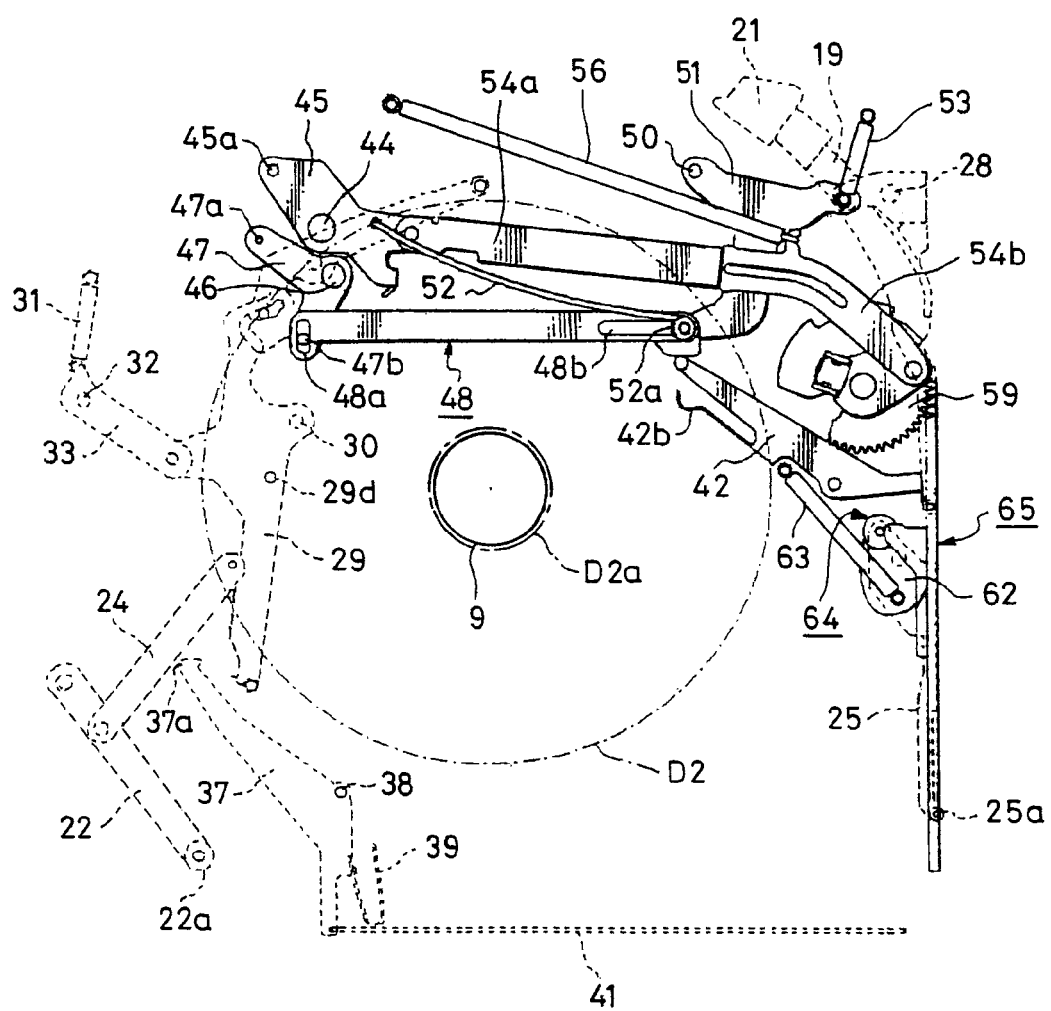
FIG. 38 is a seventh process diagram useful for explaining a state in which a small-diameter disc is being transported.

FIGS. 30 and 37 show states in which the loading slider 43 is further moved backward from the states shown in FIGS. 29 and 36 and in which the center of the central hole D2a of the small-diameter disc D2 and the center of the clamping head 9 are made coincident with each other. In the process reaching the above-described state, as the loading slider 43 is moved in the backward direction, the disc supporting arm 19 is considerably swung in the centrifugal direction to end supporting of the outer peripheral edge of the small-diameter disc D2 and this swinging causes the gear disc 50 to move the rack slider 65. As a result, the small diameter portion 64b of the double roller 64 is urged against the high position guide piece 65c of the rack slider 65 so that the guide arm 25 is considerably swung in the centrifugal direction to end supporting of the outer peripheral edge of the small-diameter disc D2. In consequence, the guide arm 25 is escaped to the lateral side of the elevation frame 7 and it is placed in the state in which it is not extended on the elevation frame 7.

In the above-described state, although the outer peripheral edge of the small-diameter disc D2 is supported by three points of the supporting member 27a of the guide frame 27, the supporting member 29a of the guide arm 29 and the supporting member 35a of the guide arm 35, in the process reaching this state, pressing force generated by action of the tension coil spring 53 of the supporting member 27a of the guide arm 27 is caused to act so that transporting of the small-diameter disc D2 is continued.

Also, in the process from FIGS. 29 to 30, when the cam groove 43e of the loading slider 43 is moved backward, the follower pin 7a of the elevation frame 7 is moved from the low position portion 43e-1 to the inclined portion 43e-2 and it is to be elevated. On the other hand, since the follower pin 47a of the second swing member 47 reaches from the vertical portion 43b-3 of the loading slider 43 to the lower end horizontal portion 43b-2 and this second swing member 47 is swung in the centrifugal direction, the cam groove 48c is moved horizontally as the action pin 48b moves the follower slider 48 in the horizontal direction. As a result, the follower pin 7b of the elevation frame 7 is moved from the low position portion 48c-1 to the inclined portion 48c-2 and it is to be ascended so that the elevation frame 7 starts ascending as shown in FIG. 39B.

Figure 31:
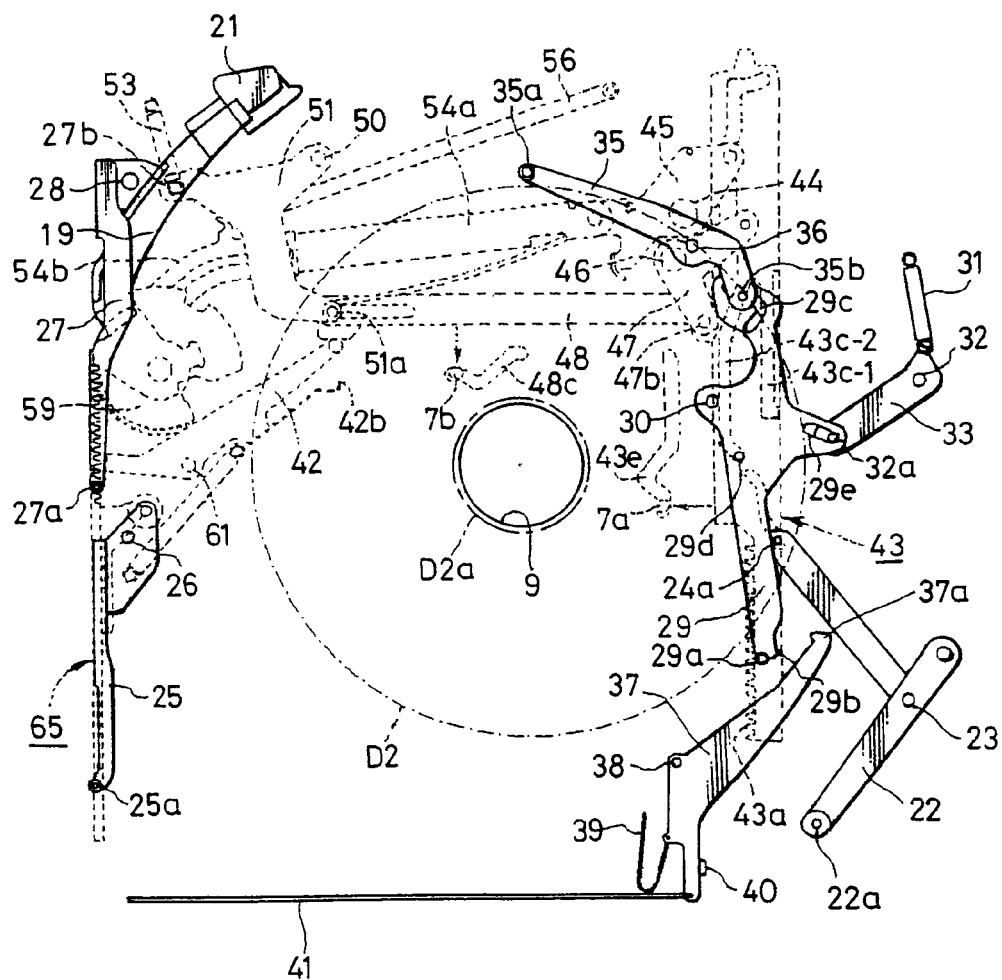
FIG. 31 is a seventh process diagram useful for explaining a state in which a small-diameter disc is being transported.

FIGS. 31 and 37 show final states in which the clamping head 9 clamps the central hole d2a of the small-diameter disc d2 and in which it becomes possible to drive the small-diameter disc D2. In order to reach this state, the guide arms 27, 29 and 35 should be swung and the supporting of the small-diameter disc D2 should be ended so as not to disturb rotation of the small-diameter disc D2.

More specifically, at the position in which loading slider 43 is further moved in the backward direction from the state shown in FIG. 30, the follower pin 47a is pushed upward by the lower end horizontal portion 43b-2 and the second swing member 47 is swung in the centrifugal direction. As a result, the action pin 51a joined to the end portion through-hole 48b of the follower slider 48 is pulled and the third swing member 51 is swung in the centripetal direction, whereby the guide arm 27 is swung in the centrifugal direction and supporting of the small-diameter disc D2 is ended.

On the other hand, since the follower pin 29d is moved to reach the inclined portion of the end of the guide groove 43c-2 of the loading slider 43, the guide arm 29 is swung in the centrifugal direction and supporting of the small-diameter disc D2 by the supporting member 29a is ended. Also, owing to swinging of this guide arm 29, the follower pin 35b joined to the guide groove 29c is operated, the guide arm 35 is slightly swung in the centrifugal direction and supporting of the small-diameter disc D2 is ended.

It should be noted that, while the follower slider 48 is moved horizontally in synchronism with the backward movement of the loading slider 43 in the process from FIGS. 30 to 31, the follower pin 7a of the elevation frame 7 is moved from the inclined portion 43e-2 of the cam groove 43e of the loading slider 43 to the high position portion 43e-3 and that the follower pin 7b is moved from the inclined portion 48c-2 of the cam groove 48c of the follower slider 48 to the high position portion 48c-3.

With respect to the behavior of the elevation frame 7 in this process, the elevation frame 7 is elevated by the follower pins 7a and 7b which are elevated by the inclined portions 43e-2 and 48c-2, as shown in FIG. 39C, the chuck claw 9a of the clamping head 9 is brought in contact with the central hole D2a of the small-diameter disc D2 to push the small-diameter disc d2 upwardly so that the peripheral edge of the central hole D2a is brought in contact with the protruded portion 2b of the chassis case 2.

When the follower pins 7a and 7b reach the tops of the inclined portions 43e-2 and 48c-2 from the above-described state, as shown in FIG. 39D, the clamping head 9 is fitted into the central hole D2a of the small-diameter disc D2 and clamping by the chuck claw 9a is completed so that the small-diameter disc D2 is fixed to the turntable 10. Then, when the follower pins 7a and 7b are moved to the high position portions 43e-3 and 48c-3, the elevation frame 7 is lowered up to the position shown in FIG. 39E and it becomes possible to drive the small-diameter disc D2.

Figure 40A:
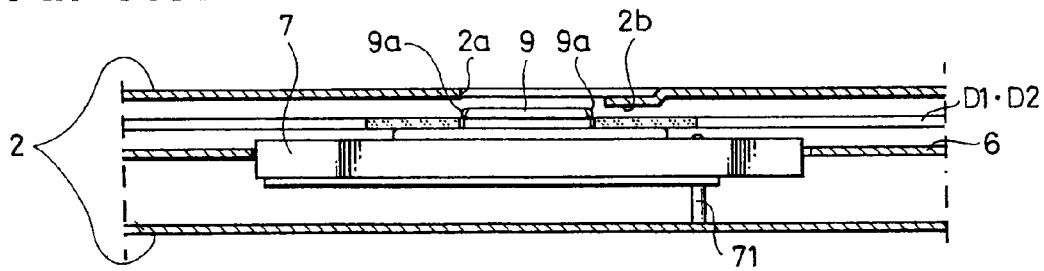
FIGS. 40A to 40E are process diagrams useful for explaining a process in which an elevation-frame is being descended.
Figure 40B:
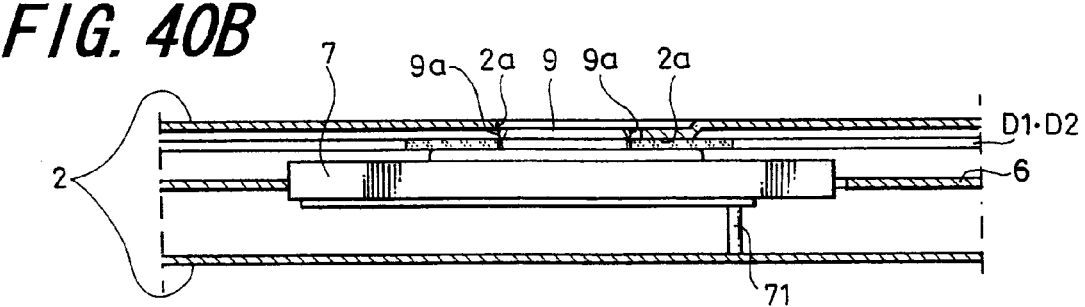
Figure 40C:
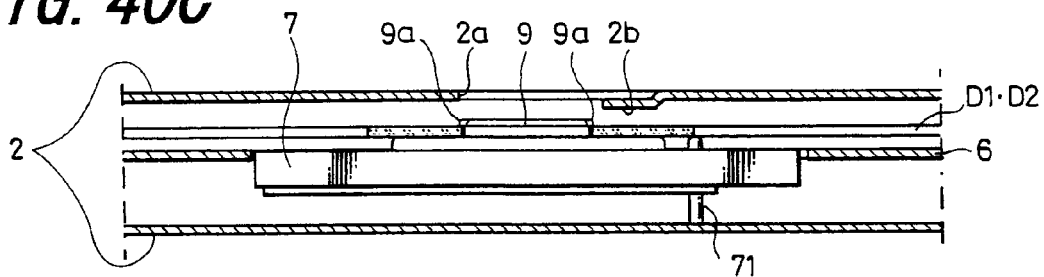
Figure 40D:
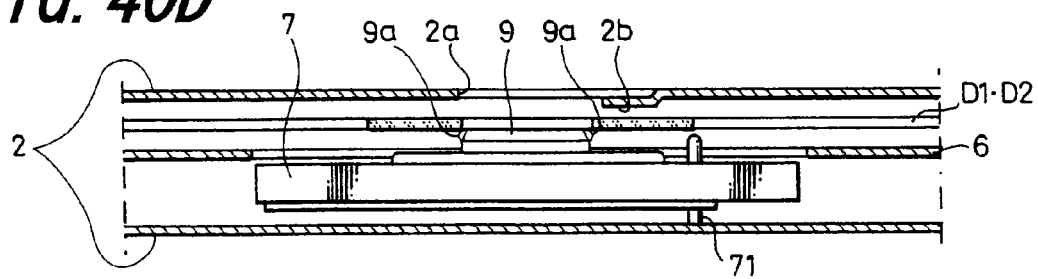
Figure 40E:
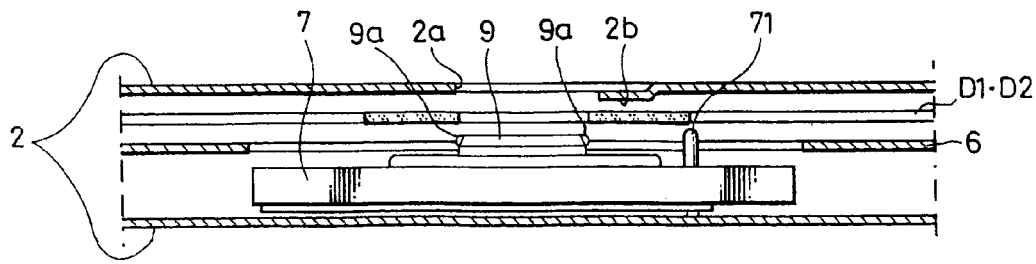

While the operation modes in which the respective mechanisms are operated when the small-diameter disc D2 is transported into the disc apparatus 1 according to the present invention has been described so far, when the small-diameter disc D2 is loaded into the disc apparatus 1, operation modes in which the respective mechanisms are operated in the order opposite to the above-mentioned order in which the small-diameter disc D2 is loaded into the disc apparatus 1 as the loading slider 43 is moved forward. More specifically, when the loading of the small-diameter disc D2 into the disc apparatus 1 is started and the loading slider 43 starts moving in the forward direction, the elevation frame 7 is temporarily ascended and then descended up to the initial position as shown in FIGS. 40A to 40E. During this period, the small-diameter disc D2 is pushed upwardly by the clamp releasing pin 71 as shown in FIG. 40C and the small-diameter disc D2 is released from being clamped by the clamping head 9.

In the process executed until the small-diameter disc D2 is released from being clamped by the clamping head 9 as described above, the state becomes a state shown in FIG. 30 in which the guide arms 25, 27 and 29 are swung in the centripetal direction to support the outer peripheral edge of the small-diameter disc D2. Subsequently, in the operations following the reverse order from FIGS. 29 to 26, the small-diameter disc D2 is unloaded from the disc apparatus 1 by force to swing the disc supporting arm 19 in the centripetal direction, the front end of the small-diameter disc D2 is exposed from the slot 3a of the front bezel 3 and the operation is stopped.

Figure 46:
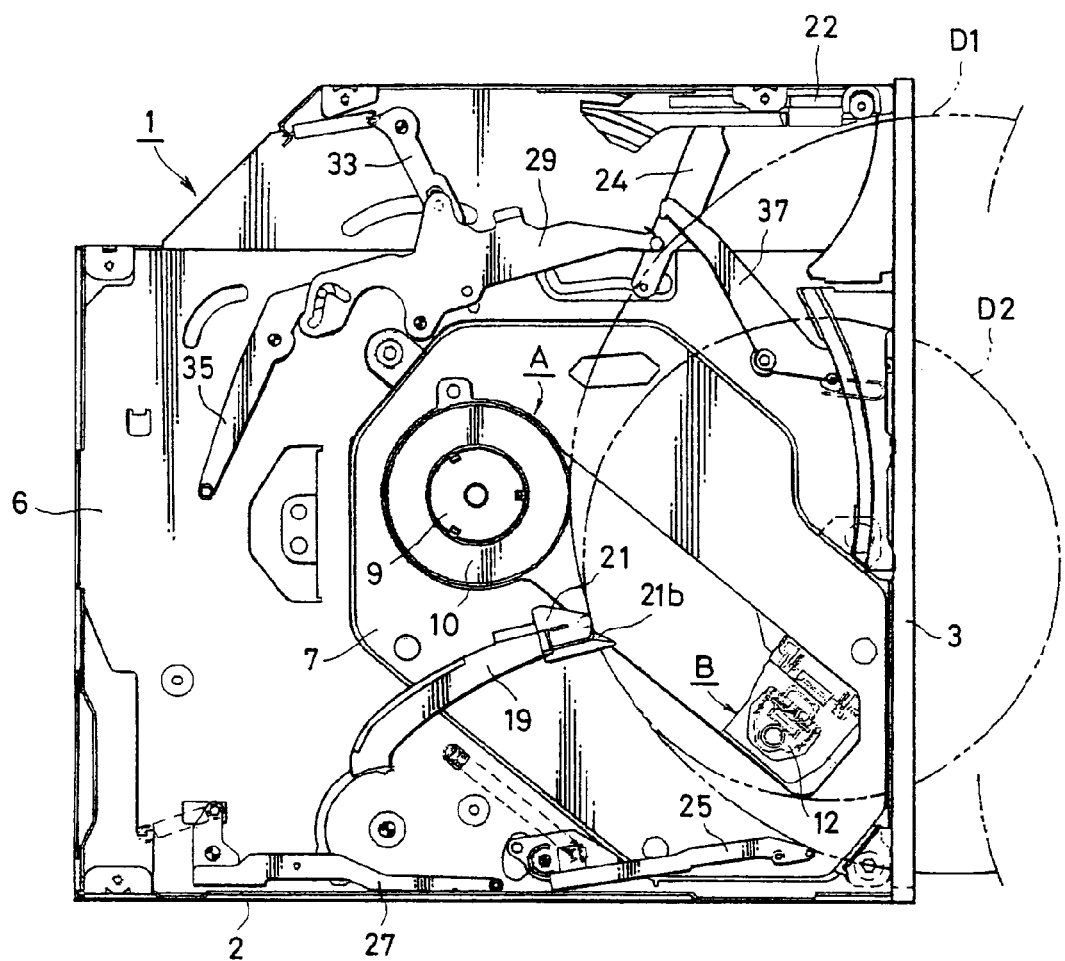
FIG. 46 is a plan view showing a state in which shortcomings are presented before the present invention is carried out.
Figure 47:
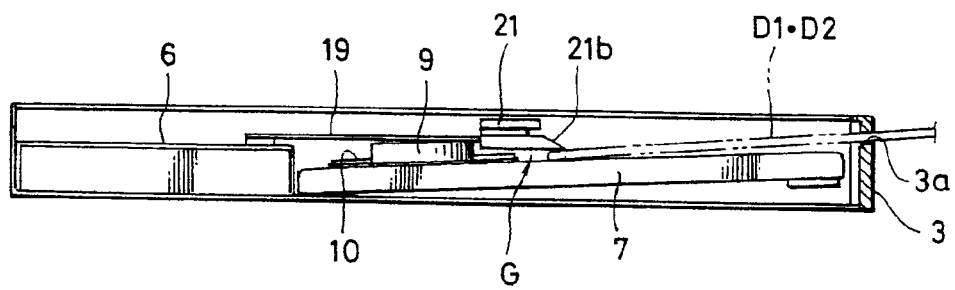
FIG. 47 is a cross-sectional view showing a state in which shortcomings are presented before the present invention is carried out.

Next, an arrangement which becomes the gist of the present invention will be described concretely. FIG. 46 is a diagram showing an arrangement on the flat surface of the disc apparatus 1 according to the above-mentioned arrangement. When the large-diameter disc D1 (or the small-diameter disc D2) is inserted from the slot 3a of the front bezel 3 by the operator in the inclined state as shown in FIG. 47, as shown in FIG. 47, the rear end side of the large-diameter disc D1 (small-diameter disc D2) is entered into a gap G formed between the bottom surface of the holder 21 of the disc supporting arm 19 and the surface of the elevation frame 7 and thereby held therein. At this time point, it becomes possible to transport the large-diameter disc D1 (small-diameter disc D2). Then, if the large-diameter disc D1 (small-diameter disc D2) is forcibly inserted into the disc apparatus 1 from this state, then the mechanism within the disc apparatus 1 will be broken and the recording surface of the large-diameter disc D1 (small-diameter disc D2) will be damaged.

Figure 48:
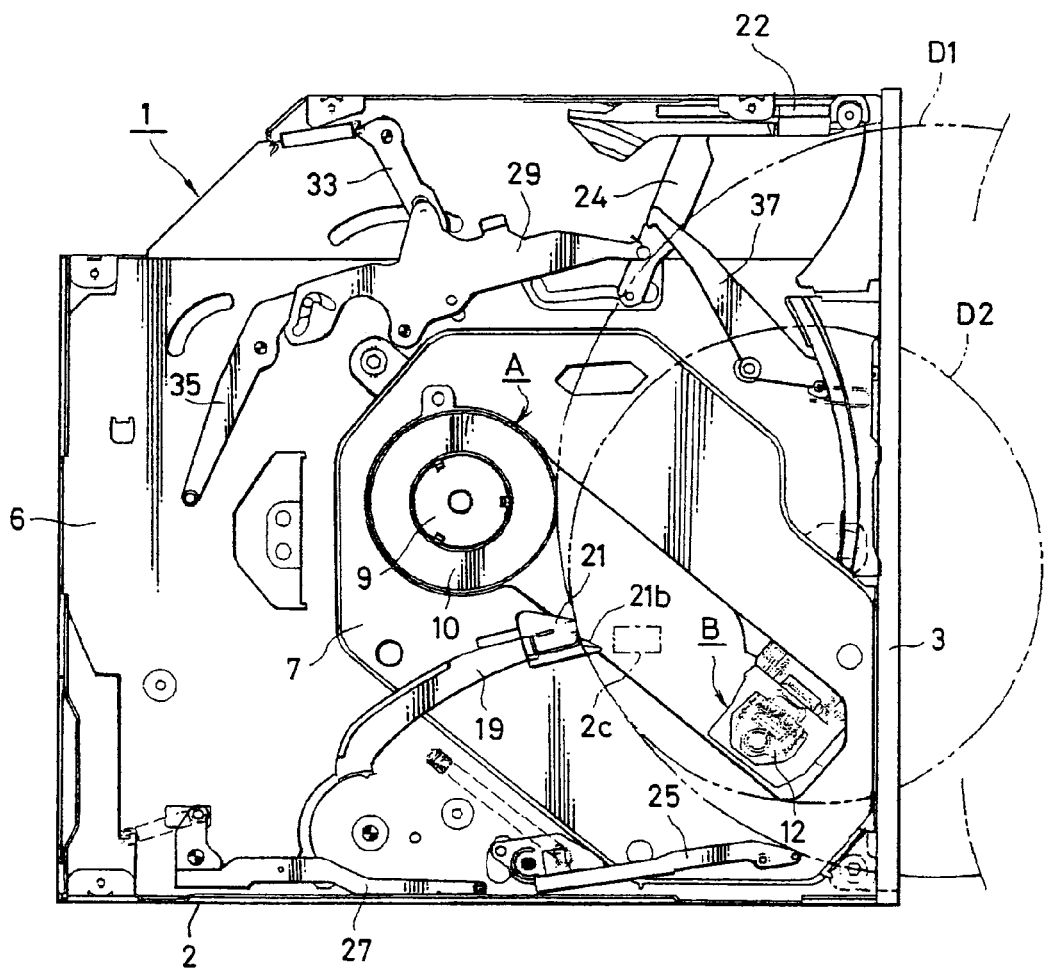
FIG. 48 is a plan view showing a state in which shortcomings could be improved according to the present invention.
Figure 49:
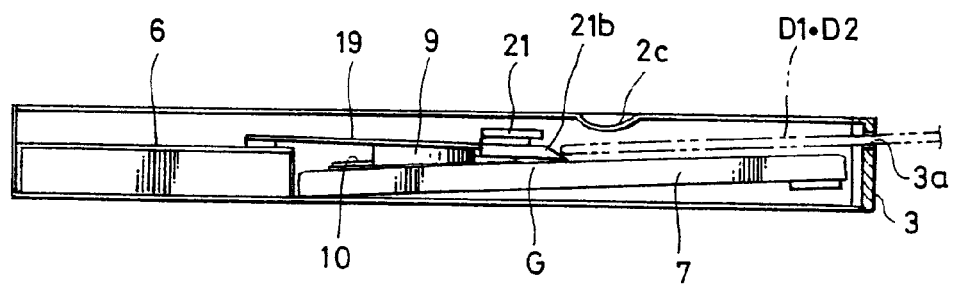
FIG. 49 is a cross-sectional view showing a state in which shortcomings could be improved according to the present invention.

Therefore, according to the present invention, in the initial state in which the elevation frame 7 is lowered, the gap G formed between the bottom surface of the holder 21 and the surface of the elevation frame 7 should be narrowed as much as possible or the bottom surface of the holder 21 should be brought in contact with the surface of the elevation frame 7 so that the rear end side of the large-diameter disc D1 or the small-diameter disc D2 can be prevented from entering into the lower surface of the holder 21 as shown in FIGS. 48 and 49.

Figure 50:
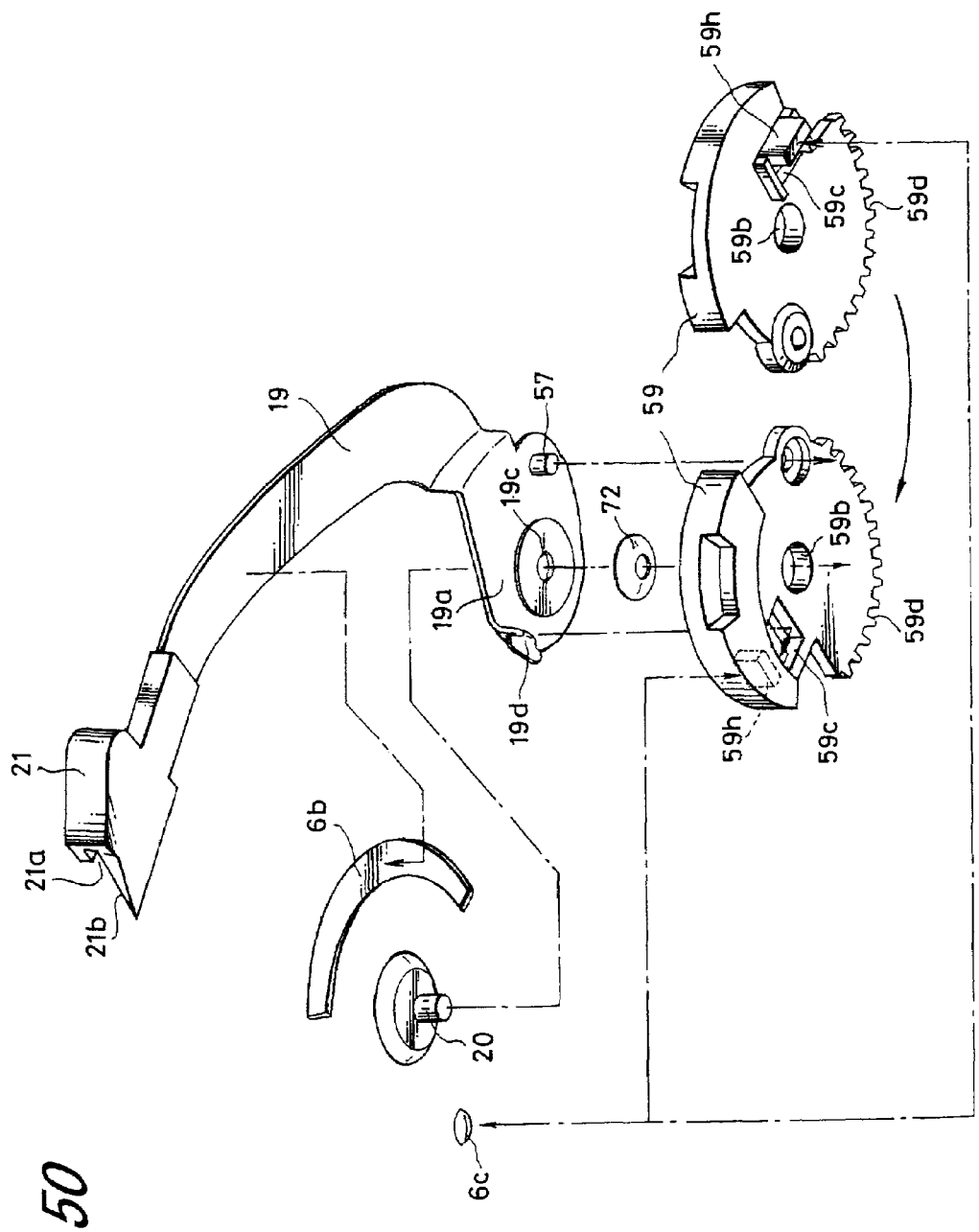
FIG. 50 is an exploded perspective view of a main portion of the present invention.

According to the present invention, in order to realize the above-mentioned function, in the state in which the elevation frame 7 is descended and the disc supporting arm 19 awaits the insertion of the large-diameter disc D1 or the small-diameter disc D2 as shown in FIGS. 11, 18, 25 and 32, the rotary base plate 19a of the base portion of the disc supporting arm 19 is rotated so that the tip end of the holder 21 is forced to descend. FIG. 50 shows an example of a specific arrangement.

Figure 51:
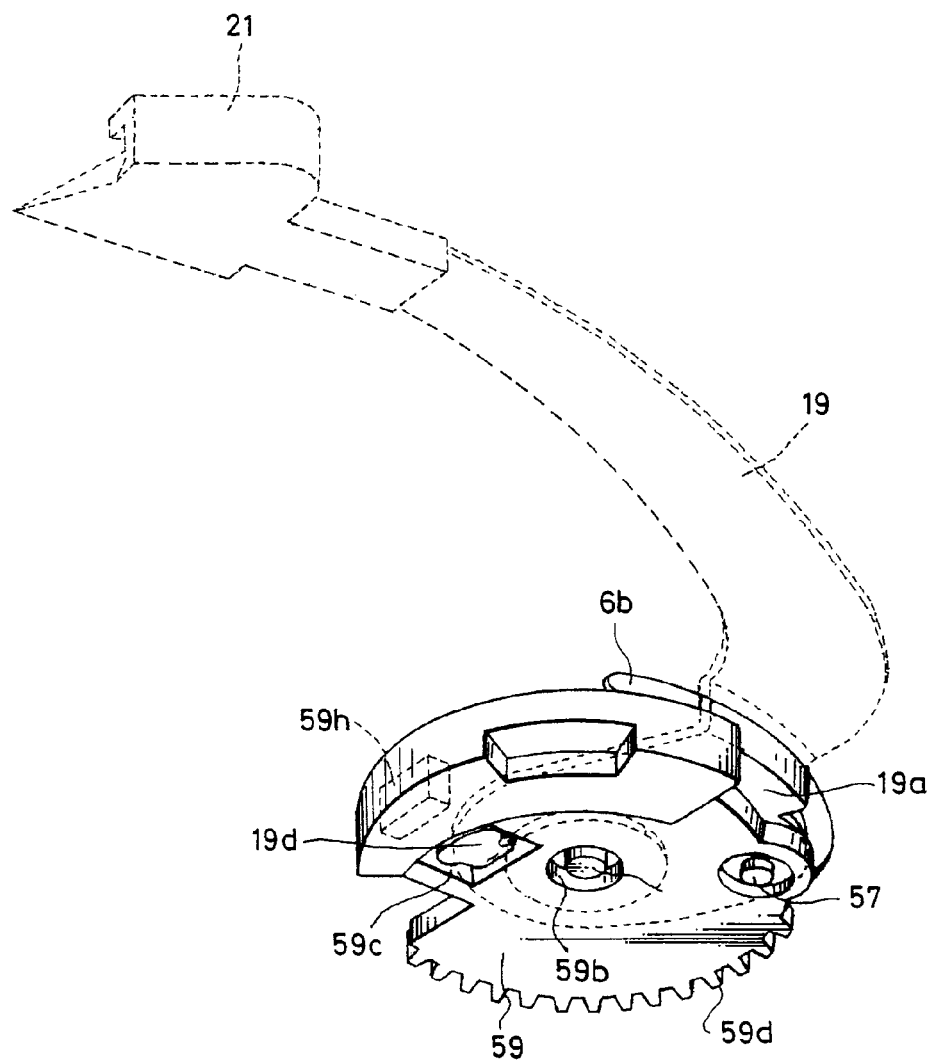
FIG. 51 is an assembly perspective view of a main portion of the present invention.

FIG. 50 shows assembled states of the disc supporting arm 19 and the gear disc 59 in which the gear disc 59 shown in the left lower portion shows its bottom surface, the right lower portion shows the surface of the gear disc 59 and the bottom surface and the surface of the gear disc 59 are shown in the same sheet of drawing. As mentioned hereinbefore, while the arm portion of the disc supporting arm 19 is opposed to the surface of the base panel 6 from the arc-like slit 6b formed on the base panel 6, the engagement piece 19d of the rotary base plate 19a is opposed to the engagement window 59c of the gear disc 59 and the tip end of the above-described engagement piece 19d is engaged with the engagement stepped portion 59g of this engagement window 59c and thereby integrated as shown in FIG. 51.

At that time, while the central hole 19c formed on the above-described rotary base plate 19a and the central hole 59b of the gear disc 59 are pivotally supported by the rivet pin 20 one end of which is fixed to the base panel 6 at the same time, a belleville spring 72 is attached between the rotary base plate 19a and the gear disc 59. In the above-described gear disc 59, a slide piece 59h that slidably contacts with the rear surface of the base panel 6 is formed on the opening portion of the engagement window 59c of the surface of the gear disc 59. The state in which the disc supporting arm 19 is placed in the horizontal state when it is rotated can be kept by this slide piece 59h.

Next, in the state in which the disc supporting arm 19 awaits insertion of the large-diameter disc D1 or the small-diameter disc D2 as shown in FIGS. 11, 18, 25 and 32, the protruded portion 6c that protrudes in the back surface direction of the base panel 6 is formed on the base panel 6 at its portion in which the above-described slide piece 59h is positioned. It should be noted that the above-described protruded portion 6c may be directly formed on the base panel 6 or it may be fixed to another member.

Figure 52:
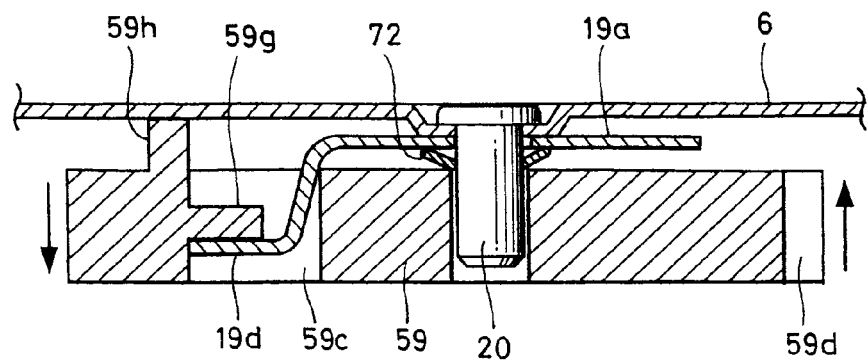
FIG. 52 is a cross-sectional view showing an arrangement of a main portion of the present invention.
Figure 54B:
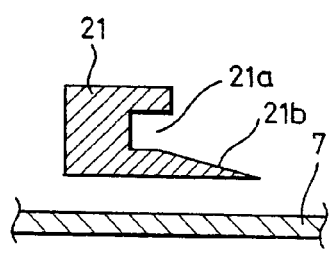
FIGS. 54A and 54B are diagrams to which reference will be made in explaining the function of the present invention.
Figure 54A:
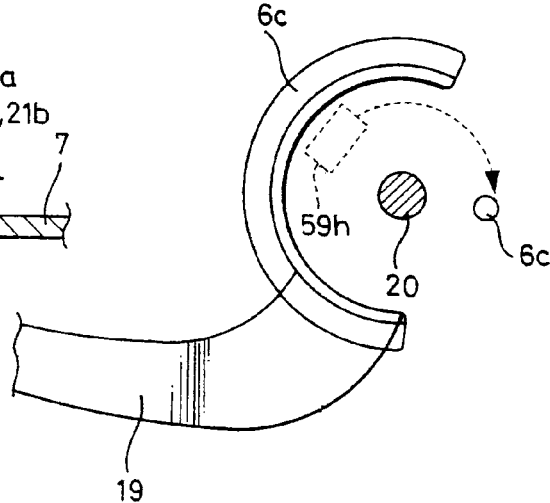

Since the protruded portion 6c is provided on the base panel 6 as described above, in the transported process of the large-diameter disc D1 or the small-diameter disc D2, the slide piece 59h of the gear disc 59 is in slidable contact with the back surface of the base panel 6 as shown in FIG. 52 and the horizontal state of the gear disc 59 can be kept. This state falls within a range of a trace in which the slide piece 59h is moved as shown by a broken line in FIG. 54A. In this range, as shown in FIG. 54B, the lower surface of the holder 21 of the disc supporting arm 19 is spaced apart from the surface of the elevation frame 7.

Figure 53:
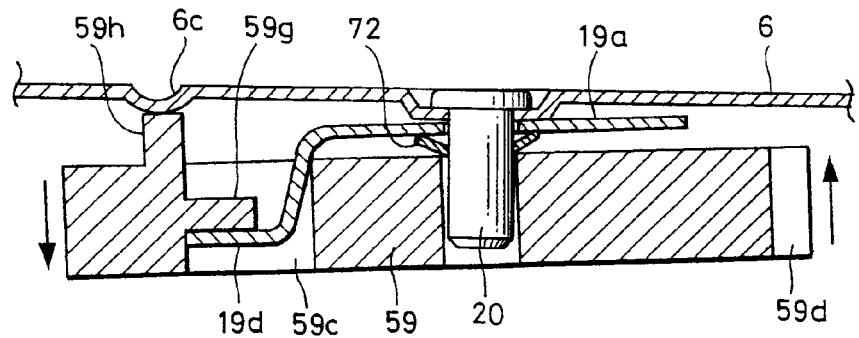
FIG. 53 is a cross-sectional view showing an arrangement of a main portion of the present invention.
Figure 55A:
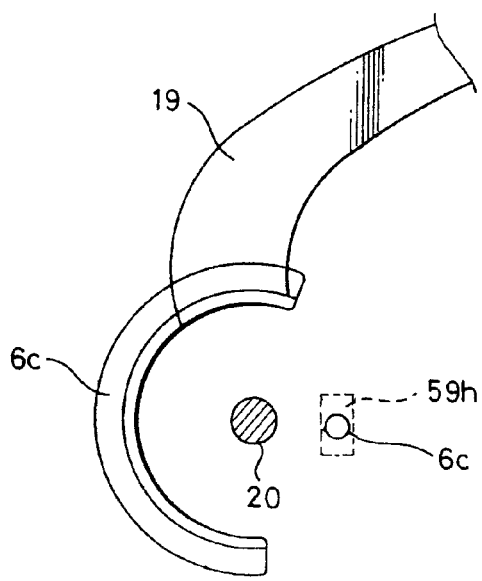
FIGS. 55A and 55B are diagrams to which reference will be made in explaining the function of the present invention.
Figure 55B:
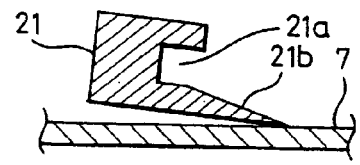
Figure 56:
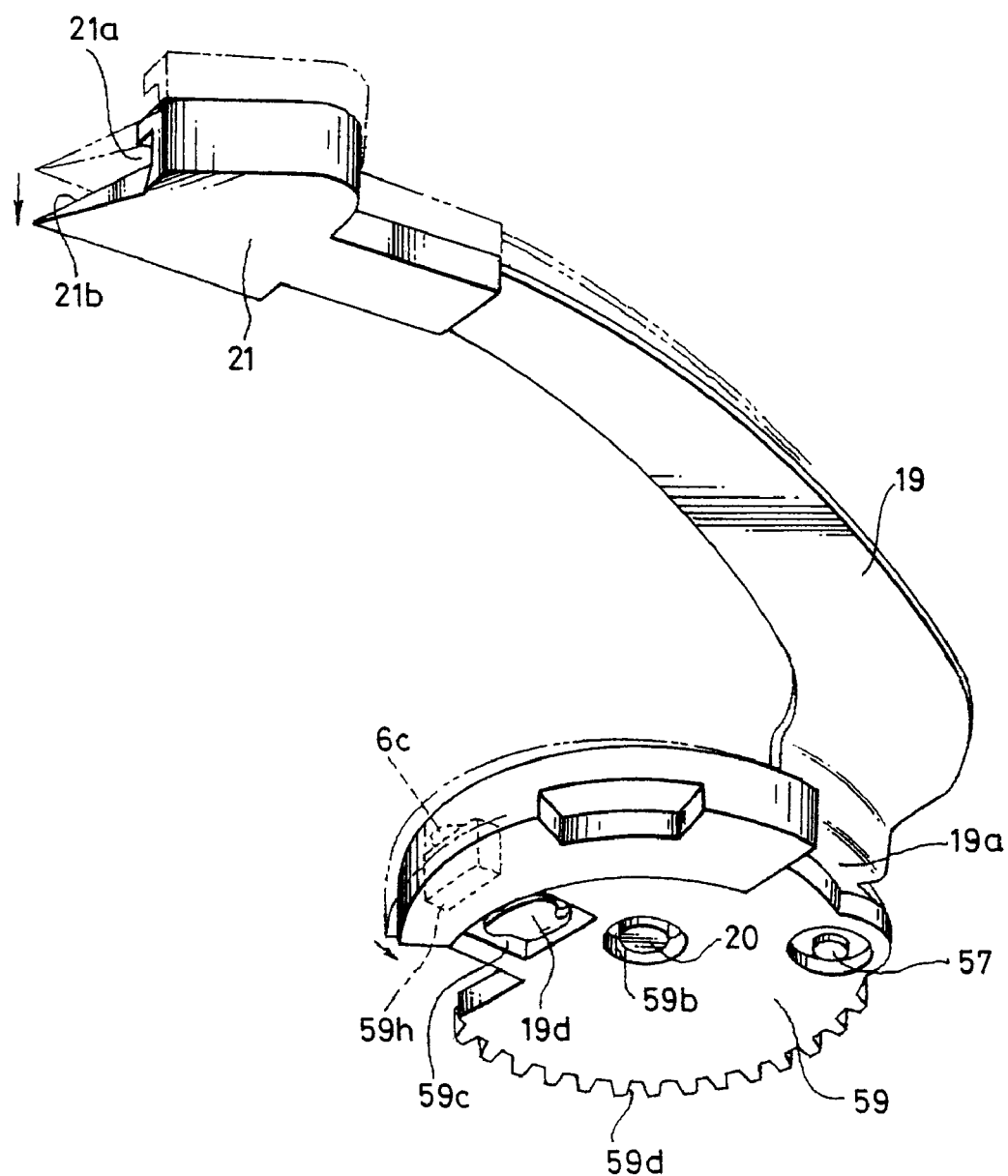
FIG. 56 is a diagram to which reference will be made in explaining the operating state of the main portion of the present invention.

On the other hand, in the state in which the disc supporting arm 19 awaits insertion of the large-diameter disc D1 or the small-diameter disc D2 as shown in FIGS. 11, 18, 25 and 32, as shown in FIG. 55A, the slide piece 59h is urged against the protruded portion 6c of the base panel 6 so that the rotary base plate 19a of the disc supporting arm 19 is distorted together with the gear disc 59 and thereby inclined as shown in FIG. 53. Since this rotary base plate 19a becomes a swing supporting point on the side to suspend the disc supporting arm 19, even when the rotary base plate 19a is distorted very slightly, the holder 21 is considerably lowered from the position shown by an imaginary line in FIG. 56 and its tip end contacts or approaches the elevation frame 7 as shown in FIG. 55B.

Figure 57A:
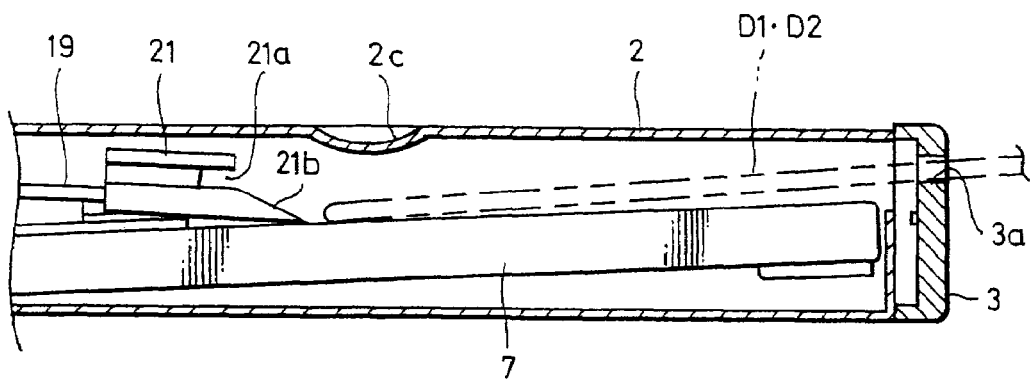
FIGS. 57A to 57C are process diagrams useful for explaining the function of the present invention.
Figure 57B:
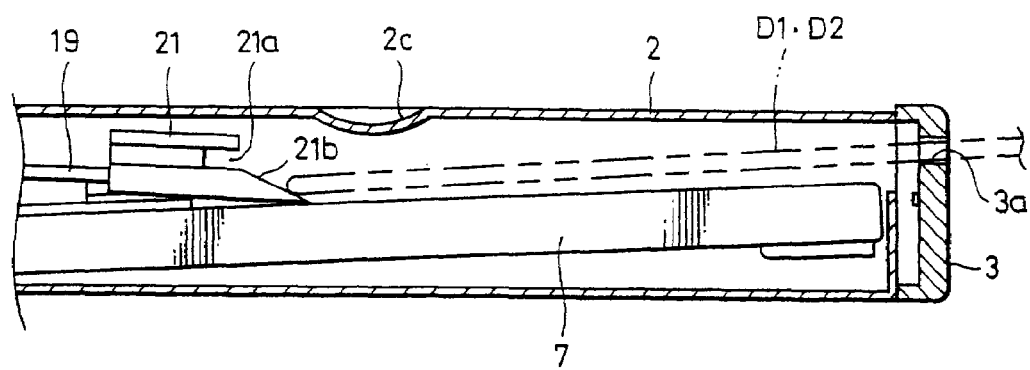
Figure 57C:
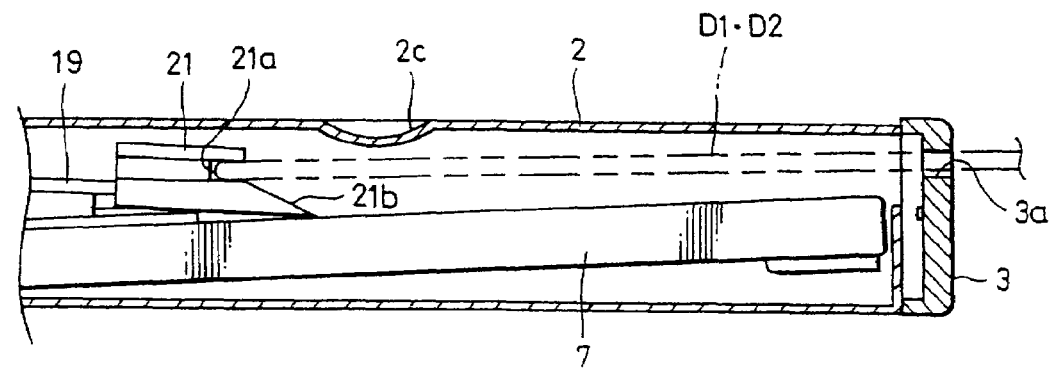

Even when the large-diameter disc D1 or the small-diameter disc D2 is inserted into the disc apparatus 1 from the slot 3a of the front bezel 3 in such a manner that its rear end side is inclined to the lower direction as shown in FIG. 57A, a gap which permits entrance of the large-diameter disc D1 or the small-diameter disc D2 is not formed between the lower surface of the holder 21 and the surface of the elevation frame 7. Therefore, the rear end side of the disc is urged against a cutting face 21b of the holder 21 as shown in FIG. 57B. Further, this rear end side of the disc is guided by the cutting face 21b and then accommodated into the concave groove 21a of the holder 21 as shown in FIG. 57C.

It should be noted that, according to the present invention, there is a risk that a gap formed between the upper surface of the holder 21 and the back surface of the top cover of the chassis case 2 is expanded so that the rear end side of the disc will enter into this gap. To avoid this shortcoming, when the disc is inserted into the disc apparatus 1 in the state in which it is inclined in the upper direction, a salient portion 2c which guides the rear end side of the disc such that the rear end side of the disc is directed to the lower direction is formed on the top cover of the chassis case 2 near the tip end of the holder 21, thereby preventing such disadvantage. The height of this salient portion 2c is selected in such a manner that it may not contact with the surface of the disc even when the disc is clamped and very slight disc warp is produced during the disc is rotated upon recording and reproducing.

As described above, according to the present invention, in the slot-in system disc apparatus 1 in which the large-diameter disc D1 and the small-diameter disc D2 can be driven respectively, since the rear end side of the large-diameter disc D1 and the small-diameter disc D2 inserted from the slot 3a of the front bezel 3 is guided into the holder 21 of the disc supporting arm 19 with high reliability, it is possible to prevent erroneous disc insertion operation, the disc apparatus 1 can be prevented from being broken and the recording surface of the disc can be avoided from being damaged.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A disc apparatus in which a disc inserted by automatic loading by a plurality of arms supporting outer peripheral edges of two kinds of discs with different diameters so that said disc can be loaded into said disc apparatus is loaded into the inside of said disc apparatus or a disc accommodated within said disc apparatus is unloaded from said disc apparatus to the outside, comprising:

an elevation frame for swinging a turntable on which said disc is fixed and rotated in the upper and lower direction, in which a rotary base plate of a disc supporting arm is slightly distorted in the initial state in which said elevation frame is lowered, whereby a tip end of a holder provided at a tip end of said disc supporting arm approaches or contacts the surface of said elevation frame to prevent a rear end side of a large-diameter disc or a small-diameter disc from entering the lower surface of said holder.

2. A disc apparatus according to claim 1, further comprising a slide piece of a gear disc integrated with said rotary base plate of said disc supporting arm and wherein said slide piece is urged against a protruded portion formed on a base panel to cause said rotary base plate to be distorted.

3. A disc apparatus according to claim 1, further comprising a salient portion formed on a top cover of a chassis case near a tip end of the holder of said disc supporting arm and wherein said salient portion causes the rear end side of a disc inserted from a front bezel to be directed in the lower direction.

* * * * *